United States Patent [19]
Nagasawa et al.

[11] Patent Number: 6,144,798
[45] Date of Patent: *Nov. 7, 2000

[54] METHOD OF AND APPARATUS FOR EDITING INFORMATION RECORDED ON MAGNETIC TAPE

[75] Inventors: Fumihiro Nagasawa; Kimio Kokubun, both of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/419,139

[22] Filed: Apr. 10, 1995

[30] Foreign Application Priority Data

Apr. 11, 1994 [JP] Japan ..................... 6-072081
Mar. 22, 1995 [JP] Japan ..................... 7-063051

[51] Int. Cl.[7] ..................................... H04N 5/93
[52] U.S. Cl. .................. 386/52; 386/55; 386/51; 386/47; 348/705
[58] Field of Search ..................... 358/335, 311; 360/13, 14.1, 14.2, 14.3, 32; 348/578, 705, 586, 588, 589; 386/52, 55, 35, 51, 47; H04N 5/93

[56] References Cited

U.S. PATENT DOCUMENTS

| | | | |
|---|---|---|---|
| 4,746,994 | 5/1988 | Ettlinger | 360/13 |
| 4,974,178 | 11/1990 | Izeki et al. | 364/523 |
| 5,051,845 | 9/1991 | Gardener et al. | 360/14.1 |
| 5,218,672 | 6/1993 | Morgan et al. | 395/162 |
| 5,258,747 | 11/1993 | Oda et al. | 345/153 |
| 5,267,092 | 11/1993 | Kizu et al. | 360/14.1 |
| 5,367,341 | 11/1994 | Schnorf | 348/616 |
| 5,377,319 | 12/1994 | Kitahara et al. | 396/161 |
| 5,526,125 | 6/1996 | Mori et al. | 358/311 |
| 5,587,803 | 12/1996 | Inoue et al. | 386/33 |

*Primary Examiner*—Wendy Garber
*Assistant Examiner*—Vincent F. Boccio
*Attorney, Agent, or Firm*—Frommer Lawrence & Haug, LLP.; William S. Frommer; Dennis M. Smid

[57] ABSTRACT

An editing apparatus of relatively small size for editing material information highly efficiently and accurately with simplified processing capabilities has a plurality of tape transports, a selector for selecting input and output paths for the tape transports, a playback device for processing reproduced output signals from the tape transports, a temporary storage device for temporarily storing an output signal from the playback device, a signal processor for processing output signals from the tape transports and the temporary storage device, and a controller for controlling the tape transports, the selector, the playback device, the temporary storage device, and the signal processor, and determining the execution of a re-try playback mode for storing an output signal from the playback device again into the temporary storage device.

14 Claims, 33 Drawing Sheets

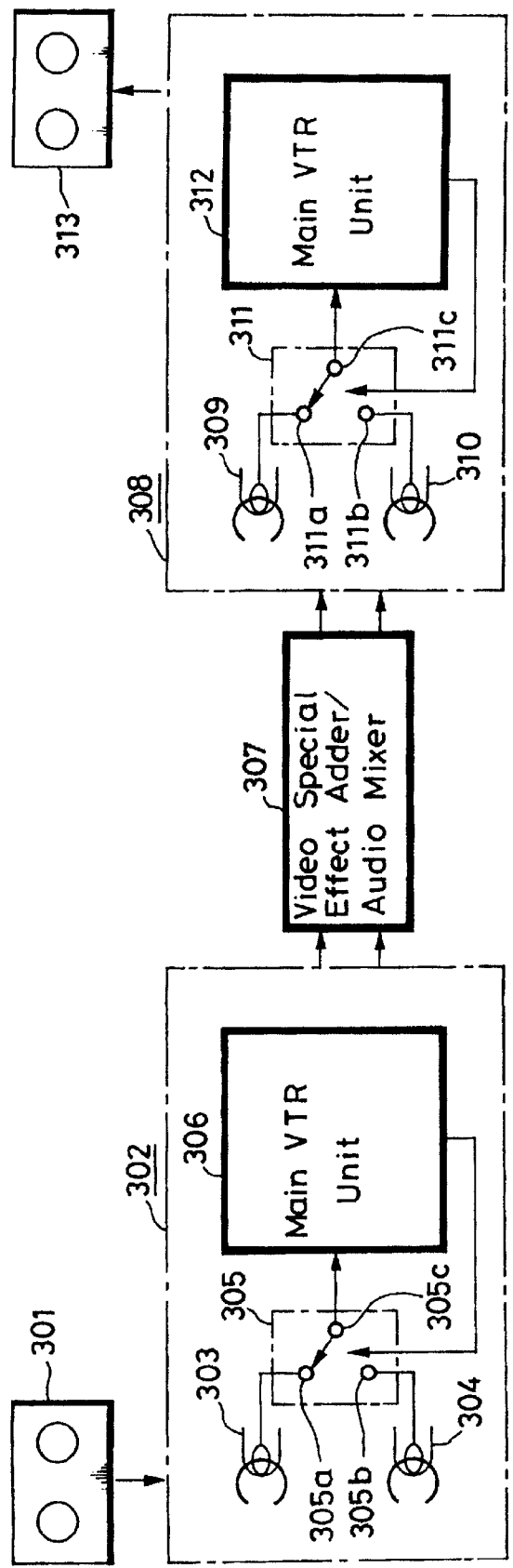
FIG. 1 (CONVENTIONAL)

FIG. 5A

| | | Tape Transport | | | |
|---|---|---|---|---|---|
| | | Tape Transport 20 | Contact | Tape Transport 21 | Contact |
| Temporary Storage Medium | Memory | Switch 22 | a | Switch 22 | b |
| | | Switch 23 | × | Switch 23 | × |
| | | Switches 45, 55 | c | Switches 45, 55 | c |
| | | Switches 51, 59 | × | Switches 51, 59 | × |
| | IC Card | Switch 22 | a | Switch 22 | b |
| | | Switch 23 | × | Switch 23 | × |
| | | Switches 45, 55 | a | Switches 45, 55 | a |
| | | 51, 59 | × | Switches 51, 59 | × |

FIG. 5B

| | | Tape Transport | | | |
|---|---|---|---|---|---|
| | | A-Roll→T·T 20 Recording Tape →T·T 21 | Contact | A-Roll→T·T 21 Recording Tape →T·T 20 | Contact |
| B-Roll | Memory | Switch 22 | a | Switch 22 | b |
| | | Switch 23 | b | Switch 23 | a |
| | | Switches 45, 55 | b | Switches 45, 55 | b |
| | | Switches 51, 59 | a | Switches 51, 59 | a |
| | IC Card | Switch 22 | a | Switch 22 | b |
| | | Switch 23 | b | Switch 23 | a |
| | | Switches 45, 55 | b | Switches 45, 55 | b |
| | | Switches 51, 59 | b | Switches 51, 59 | b |

FIG. 8

| | |
|---|---|
| A-Roll In Point | 00h00m00s00f |
| A-Roll Out Point | 00h00m00s00f |
| B-Roll In Point | 00h00m00s00f |
| B-Roll Out Point | 00h00m00s00f |
| A-Roll Transition Start Point | 00h00m00s00f |
| B-Roll Transition End Point | 00h00m00s00f |
| Memory Readout Start Point Address | 00000000 |
| Memory Out Point Address | 00000000 |
| Memory End Point Address | 00000000 |
| ... | ... |

FIG. 18

| | |
|---|---|
| A-Roll In Point | 00h00m00s00f |
| A-Roll Out Point | 00h00m00s00f |
| B-Roll In Point | 00h00m00s00f |
| B-Roll Out Point | 00h00m00s00f |
| (A-Roll In Point Time)−(ts+ta) | 00h00m00s00f |
| (A-Roll Out Point Time)−(ta−ts) | 00h00m00s00f |
| (B-Roll In Point Time)−(ts+ta) | 00h00m00s00f |
| (B-Roll Out Point Time)−(ta−ts) | 00h00m00s00f |
| Memory Readout Start Point Address | 00000000 |
| Memory Out Point Address | 00000000 |
| Memory Readout End Point Address | 00000000 |

METHOD OF AND APPARATUS FOR EDITING INFORMATION RECORDED ON MAGNETIC TAPE

BACKGROUND OF THE INVENTION

1. Field of the Invention

The present invention relates to a method of and an apparatus for editing information recorded on a magnetic tape in a unitary editing machine or the like.

2. Description of the Related Art

Heretofore, it has been customary in broadcasting stations to edit materials to be broadcast and record the edited materials on video tape cassettes. For example, a plurality of commercials (CMs) are edited and recorded on one video tape cassette, producing a single CM tape. According to an editing process for broadcasting, materials to be used for a program are edited and recorded on a video tape cassette.

Video tape cassettes on which original materials are recorded are usually called material tapes or the like. A video tape cassette as a material tape is played back on a video tape recorder (VTR) to reproduce a signal, and the reproduced signal is processed into a material signal that is recorded on a broadcasting video tape cassette which will be played back for broadcasting.

One conventional editing system will be described below with reference to FIG. 1 of the accompanying drawings.

As shown in FIG. 1, a video tape cassette 301 as a material tape is set in and played back by a playback VTR 302. A broadcasting video tape cassette 313 is set in a recording VTR 308 for recording an output signal from a video special effect adder/audio mixer 307. If a simple broadcasting tape is to be produced, then the video special effect adder/audio mixer 307 may be replaced with an editing machine, and may be dispensed with and the playback VTR 302 and the recording VTR 308 may be directly connected to each other.

The editing system shown in FIG. 1 operates as follows: The video tape cassette 301 as a material tape is played back by the playback VTR 302 to reproduce a signal, and a special effect is added to the reproduced signal. The reproduced signal with the special effect is supplied to the recording VTR 308, and recorded on the broadcasting video tape cassette 313 that is set in the recording VTR 308.

The playback VTR 302 has a playback head 303 connected to a fixed contact 305a of a head selector switch 305 and a playback head 304 connected to another fixed contact 305b of the head selector switch 305. The head selector switch 305 has a movable contact 305c that can selectively be connected to the fixed contacts 305a, 305b by a switching signal supplied from a system controller (not shown) in a main VTR unit 306 of the playback VTR 302.

The video special effect adder/audio mixer 307 adds various special effects including a mosaic effect, a moving effect, a reducing effect, an enlarging effect, a rotating effect, etc. to a video signal from the playback VTR 302, and applies a process such as mixing to an audio signal from the playback VTR 302. An output signal from the video special effect adder/audio mixer 307 is supplied to the recording VTR 308. The supplied signal is subjected to analog or digital signal processing for signal recording in a main VTR unit 312 of the recording VTR 308. The processed signal is then recorded on the video tape cassette 313 that is set in the recording VTR 308.

The recording VTR 308 has a recording head 309 connected to a fixed contact 311a of a head selector switch 311 and a recording head 310 connected to another fixed contact 311b of the head selector switch 311. The head selector switch 311 has a movable contact 311c that can selectively be connected to the fixed contacts 311a, 311b by a switching signal supplied from a system controller (not shown) in a main VTR unit 312 of the recording VTR 303.

There is known an editing technique called an "A/B-roll" in which two images (A-roll and B-roll) reproduced respectively by two playback machines are freely moved therebetween through a two-image combining process such as mixing, wiping or the like. If the editing system shown in FIG. 1 is to carry out such an A/B-roll editing procedure, then another playback VTR in addition to the playback VTR 302 needs to be connected to the video special effect adder/audio mixer 307. Video and audio signals reproduced as an A-roll by the playback VTR 302 and video and audio signals reproduced as a B-roll by the added playback VTR are processed by the video special effect adder/audio mixer 307, and the processed video and audio signals are recorded on a video tape cassette set in the recording VTR 308.

There has been proposed an editing apparatus which has an improved editing efficiency and is made convenient to use by displaying first and second points in a certain unit of image data on a display means, indicating image data of the displayed first and second points with an indicating means, and displaying the time code data of the indicated image data of the first and second image data, and the status and identification number of a related device. For example, an editable unit of image data displayed on a screen can be deleted, copied, moved, or exchanged in position by a pointing device or a keyboard thereby to modify the contents of edit files EDL1~EDLn. Since an editing process can be effected without cumbersome procedures as of playing back video tape cassettes on a plurality of VTRs to recheck the image data and confirming and entering storage addresses with a keyboard, the efficiency of the editing process is improved. For further details, reference should be made to Japanese laid-open patent publication No. 6-302157.

As described above, the A/B-roll editing process to be performed by the conventional editing system requires two playback VTRs, i.e., a VTR for playing back an A-roll and a VTR for playing back a B-roll.

In the editing system shown in FIG. 1, the playback VTR 302 may be used as a VTR for playing back an A-roll, and a newly added playback VTR may be used as a VTR for playing back a B-roll. If a process carried out by the video special effect adder/audio mixer 307 needs to be redone in such a system configuration, then it is necessary to operate the playback VTR 302 again to move the playback position of the magnetic tape in the video tape cassette set in the playback VTR 302 to the beginning of the material as the A-roll, and also to operate the added playback VTR again to move the playback position of the magnetic tape in the video tape cassette set in the added playback VTR to the beginning of the material as the B-roll. Thereafter, the playback VTR 302 and the added playback VTR are operated in a playback mode, and reproduced video and audio signals as the A and B-rolls need to be processed by the video special effect adder/audio mixer 307.

Stated otherwise, if an editing process is to be redone or rehearsed, i.e., practiced prior to a real editing process, in an editing system using VTRs, then it is necessary to operate the VTRs to move the playback positions of magnetic tapes to the beginnings of materials, and to wait until the VTRs move the playback positions of magnetic tapes to the beginnings of materials. Such an operating procedure and a waiting time are necessitated because the playback and recording devices are VTRs. As a result, it is highly difficult to achieve an improved editing efficiency with an editing system using VTRs. There has been a demand in the art for an editing system with an improved editing efficiency.

Another problem with the editing system shown in FIG. 1 is that once cables are connected based on given signal paths, playback and recording VTRs are uniquely determined. Since the playback VTR 302 shown in FIG. 1 is preset as a playback VTR, if the playback and recording VTRs are to be switched around, then it is necessary for the operator to disconnect cords from output terminals of the recording VTR 308 and the playback VTR 302, connect the output terminals of the recording VTR 308 to input terminals of the video special effect adder/audio mixer 307, and connect input terminals of the playback VTR 302 to output terminals of the video special effect adder/audio mixer 307, provided that the playback VTR 302 is capable of recording information and the recording VTR 308 is capable of playing back recorded information.

Therefore, once the devices are connected in the editing system shown in FIG. 1, input and output paths for video and audio data to be edited are uniquely determined, and the determined input and output paths in the editing system or the manner in which the devices are used cannot easily be changed.

If the editing system shown in FIG. 1 is modified in order to alleviate the various shortcomings described above, then it is difficult to attain compatibility with the existing devices, e.g., compatibility such as of timing, data format, etc. between the exiting devices and another device which is to be incorporated in the modified editing system.

OBJECTS AND SUMMARY OF THE INVENTION

It is therefore an object of the present invention to provide a method of and an apparatus for editing information highly accurately in a manner to allow an editing process such as an A/B-roll editing process or the like to be easily carried out at high speed, and also to simply modify input and output paths for video and audio data in an editing system for permitting various editing processes.

According to the present invention, there is provided a method of editing material information, comprising the steps of:

(a) playing back first material information recorded on a tape-like recording medium with a playback tape transport;

(b) processing the first material information which has been played back in the step (a);

(c) temporarily storing the first material information which has been processed in a temporary storage means in the step (b);

(d) reading the first material information from the temporary storage medium;

(e) playing back second material information with the playback tape transport;

(f) processing the second material information which has been played back in the step (e); and (g) editing the first material information read from the temporary storage medium and the second material information which has been processed in the step (f), into edited information.

According to the present invention, there is also provided an editing apparatus comprising a playback tape transport, playback signal processing means for processing information played back from the playback tape transport, temporary storage means for temporarily storing an output signal from the playback signal processing means, editing means for being supplied with an output signal from the temporary storage means and the output signal from the playback signal processing means, and editing the output signal from the temporary storage means and the output signal from the playback signal processing means, and control means for controlling the playback tape transport, the playback signal processing means, the temporary storage means, and the editing means.

According to the present invention, there is also provided an editing apparatus comprising a plurality of tape transports, first selecting means for selecting at least one of the tape transports and outputting information played back by the selected one of the tape transports, playback signal processing means for processing the information which is outputted from the first selecting means, temporary storage means for temporarily storing an output signal from the playback signal processing means, editing means for being supplied with an output signal from the temporary storage means and the output signal from the playback signal processing means, and editing the output signal from the temporary storage means and the output signal from the playback signal processing means, recording signal processing means for processing an output signal from the editing means for recording, second selecting means for selectively supplying an output signal from the recording signal processing means to at least one of the tape transports, and control means for controlling the tape transports, the playback signal processing means, the temporary storage means, the editing means, and the recording signal processing means.

BRIEF DESCRIPTION OF THE DRAWINGS

FIG. 1 is a block diagram of a conventional editing system;

FIGS. 5A and 5B are tables showing patterns of switch connections;

FIG. 8 is an editing table used by the editing apparatus shown in FIG. 3;

FIG. 18 is an editing table used by an editing apparatus according to a second embodiment of the present invention;

DETAILED DESCRIPTION OF THE PREFERRED EMBODIMENTS

The principles and various embodiments of the present invention will be described below successively under the following titles:

A: System arrangement of the invention (see FIG. 2);
* 1st Embodiment (for specifying B-roll storing and for playback of one roll in re-try playback);
B: Structure and operation of an editing apparatus (see FIG. 3);
C: Structure and operation of a playback signal processor shown in FIG. 2 (see FIGS. 4 and 5);
D: Structure and operation of a recording signal processor 35 shown in FIG. 2 (see FIG. 6);
E: Structure of a system controller 24 shown in FIG. 2 (see FIG. 7);
F: Editing table (see FIG. 8);
G: Main routine (see FIG. 9);
H: B-roll storing routine (see FIGS. 10 and 11);
I: A/B-roll editing routine (see FIGS. 12~14);
J: Cut editing routine (see FIGS. 15 and 17);
* 2nd Embodiment (for automatically storing a B-roll);
K: Editing table (see FIG. 18);
L: B-roll storing routine (see FIGS. 19 and 20);
M: Editing mode specifying routine after the B-roll storing routine (see FIG. 21);
N: A/B-roll editing routine (see FIGS. 22~24);
O: Cut editing routine (see FIGS. 25~27);
* 3rd Embodiment (for entering times codes of IN and OUT points with key inputs);
P: B-roll storing routine (see FIGS. 28 and 29);
* 4th Embodiment (for playback from the time of occurrence of an error in re-try playback);
Q: B-roll storing routine (see FIGS. 30~32); and
* 5th Embodiment (a modification of the editing apparatus shown in FIG. 3);
R: Structure and operation of an editing apparatus (see FIG. 33).

Figure 2:
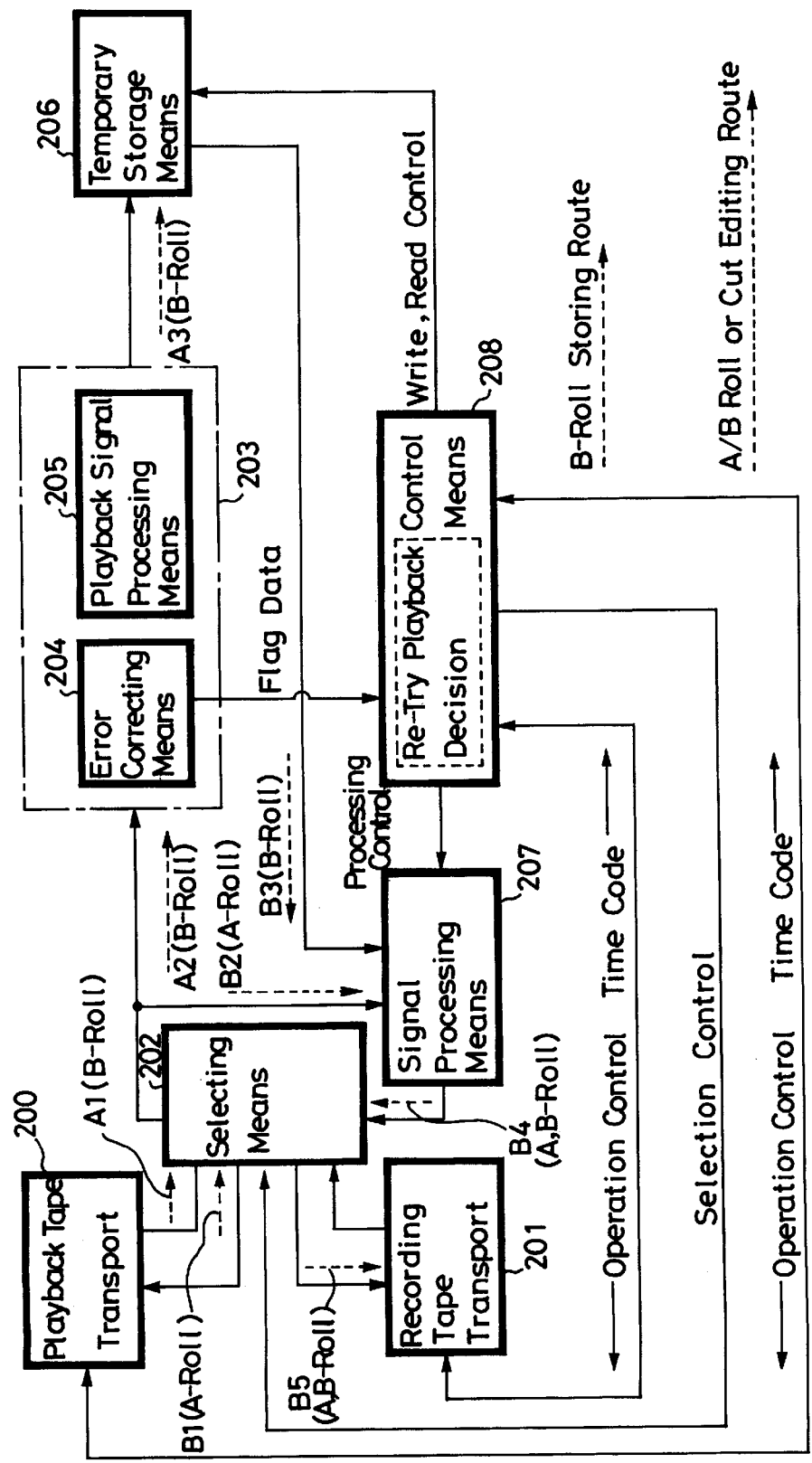
FIG. 2 is a block diagram of a system arrangement illustrative of an editing process according to the present invention.

A: System arrangement of the invention (see FIG. 2);

FIG. 2 shows in block form a system arrangement illustrative of an editing process according to the present invention.

<Connection and structure>

The editing apparatus shown in FIG. 2 generally comprises a playback tape transport 200, a recording tape transport 201, a selecting means 202, a playback means 203 composed of an error correcting means 204 and a playback signal processing means 205, a temporary storage means 206, a signal processing means 207, and a control means 208 for determining re-try playback.

The selecting means 202 is controlled by the control means 208 to determine input and output paths for the playback tape transport 200 and the recording tape transport 201. While the tape transports 200, 201 are shown as playback and recording tape transports, respectively, they may be determined as recording and playback tape transports, respectively, by the selecting means 202.

The error correcting means 204 serves to correct errors in video and audio data that are reproduced by the playback tape transport 200 and supplied through the selecting means 202, and supply flag data indicative of the results of the error correction to the control means 208.

The control means 208 effects operation control on the playback tape transport 200 and the recording tape transport 201, selection control on the selecting means 202, writing and reading control on the temporary storage means 206, and processing control on the signal processing means 207 based on time code data from the playback tape transport 200 and the recording tape transport 201, decides on a "re-try playback mode", and controls the playback tape transport 200 and the temporary storage means 206 based on the result of the decision.

The "re-try playback mode" is a playback mode in which if the content of flag data from the error correcting means 204 indicates an error correction incapability while video and audio data reproduced by the playback tape transport 200 are being stored in the temporary storage means 206, then the control means 208 controls the playback tape transport 200 to play back the same portion on a magnetic tape again for storing video and audio data that are reliably error-corrected in the temporary storage means 206. The re-try playback mode is performed until the content of flag data from the error correcting means 204 no longer indicates an error correction incapability.

The editing apparatus shown in FIG. 2 serves to perform a B-roll storing mode, an A/B-roll editing mode, and a cut editing mode. The term "storing" means storing of video and audio data in the temporary storage means 206. Therefore, the "B-roll storing mode" is a mode in which video and audio data as a B-roll from the playback tape transport 200 are stored in the temporary storage means 206. The re-try playback mode is performed in the B-roll storing mode.

<B-roll storing mode>

In the B-roll storing mode, as indicated by a thin-broken-line arrow accompanied by A1~A3, video and audio data as a B-roll are outputted from the playback tape transport 200 (A1), supplied through the selecting means 202 to the playback means 203 (A2), processed by and then outputted from the playback means 203 (A3), and stored as B-roll video and audio data in the temporary storage means 206. At this time, the re-try playback mode is performed.

The A/B-roll editing mode is an editing mode in which when video and audio data as an A-roll and video and audio data as a B-roll are to be recorded on a magnetic tape in one video tape cassette, an effect such as of dissolve, wipe, fade-in/fade-out, or the like is introduced into a splice between the A- and B-rolls, i.e., a transition period. The cut editing mode is an editing mode in which video and audio data as an A-roll and video and audio data as a B-roll are successively recorded on a magnetic tape in one video tape cassette.

<A/B-roll editing mode and cut editing mode>

In the A/B-roll editing mode or the cut editing mode, as indicated by a thick-broken-line arrow accompanied by B1~B5, video and audio data as an A-roll are outputted from the playback tape transport 200 (B1) and supplied through the selecting means 202 to the playback means 203 (B2), and video and audio data as a B-roll are read from the temporary storage means 206 and supplied to the signal processing means 207 (B3). After the video and audio data are processed by the signal processing means 207, they are outputted therefrom as A-roll video and audio data and B-roll video and audio data (B4), and supplied through the selecting means 202 to the recording tape transport 201 (B5). Then, the A-roll video and audio data and B-roll video and audio data are recorded along oblique tracks on a magnetic tape in a video tape cassette set in the recording tape transport 201.

<Advantages offered by the editing apparatus shown in FIG. 2>

As described above, video and audio data as a B-roll are outputted from the playback tape transport 200 and stored in the temporary storage means 206. Then, in the A/B-roll editing mode or the cut editing mode, video and audio data as an A-roll from the playback tape transport 200 and the video and audio data as a B-roll read from the temporary storage means 206 can be edited. Therefore, the editing apparatus is of a minimum arrangement required. Since the video and audio data as a B-roll stored in the temporary storage means 206 are employed, the editing efficiency is increased as their accessibility is high.

In the B-roll storing mode, the re-try playback mode is carried out for storing reliable video and audio data in the temporary storage means 208 for subsequent reliable editing operation.

Figure 3:
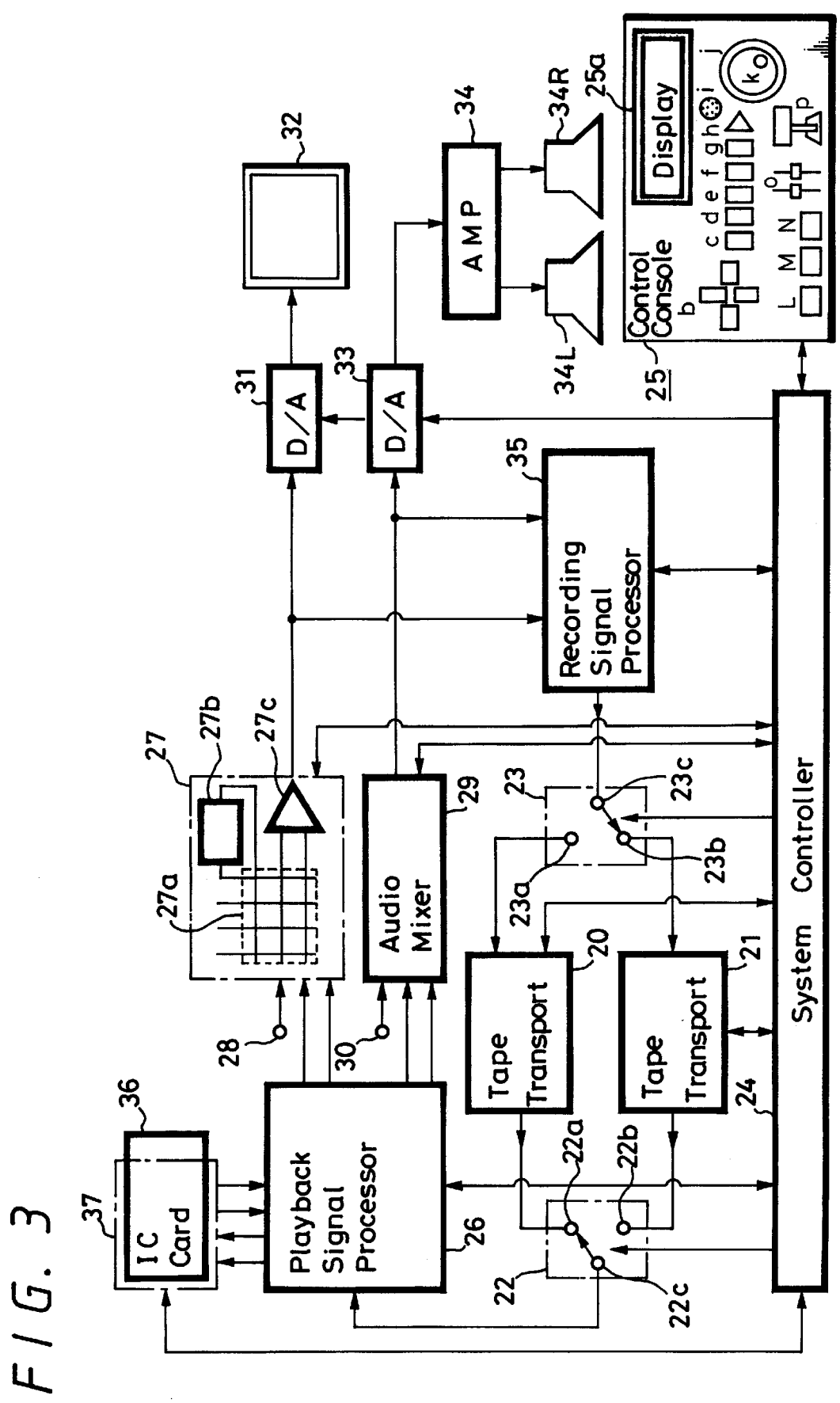
FIG. 3 is a block diagram of an editing apparatus according to a first embodiment of the present invention.

FIG. 3 shows in block form an editing apparatus according to a first embodiment of the present invention.

<Correspondence between the editing apparatus shown in FIGS. 2 and 3>

Figure 4:
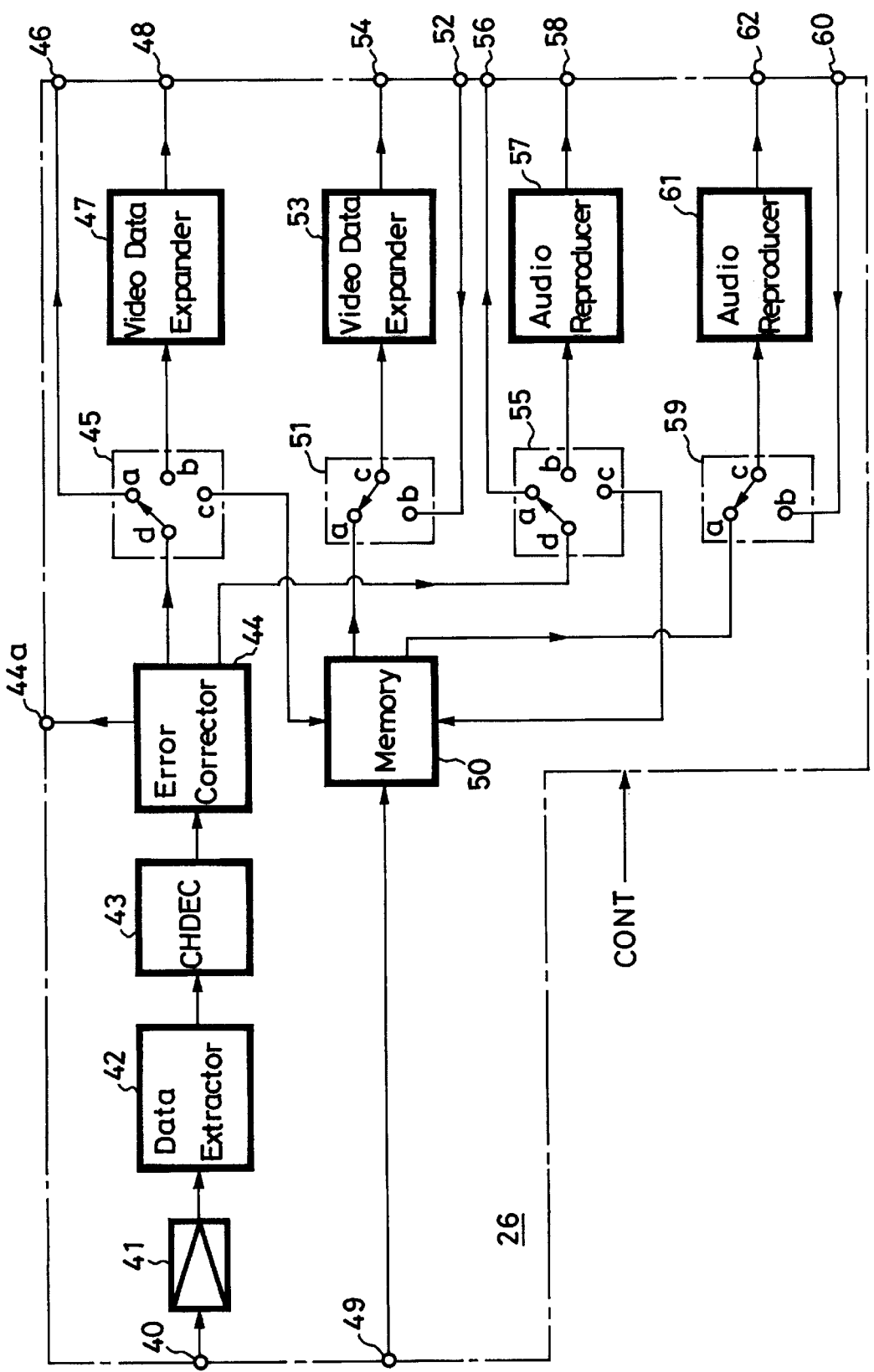
FIG. 4 is a block diagram of a playback signal processor in the editing apparatus shown in FIG. 3.

The playback tape transport 200 and the recording tape transport 201 shown in FIG. 2 correspond respectively to tape transports 20, 21 shown in FIG. 3, the selecting means 202 shown in FIG. 2 to switches 22, 23 shown in FIG. 3, the playback means 203 shown in FIG. 2 to a playback signal processor 26 shown in FIG. 3, the error correcting means 204 shown in FIG. 2 to an error corrector 44 shown in FIG. 3, the playback signal processing means 205 shown in FIG. 2 to the playback signal processor 26 shown in FIG. 3, the temporary storage means 206 shown in FIG. 2 to an IC card 36 shown in FIG. 3 and a memory 50 shown in FIG. 4, the signal processing means 207 shown in FIG. 2 to a video special effect switcher 27 and an audio mixer 29 shown in FIG. 3, and the control means 208 to a system controller 24 shown in FIG. 3.

<Summarized features of 1st~5th embodiments>

In each of first through fifth embodiments, the B-roll storing mode, the A/B-roll editing mode, and the cut editing mode are carried out under the control of the control means 208.

According to the first embodiment, the operator is required to enter key inputs on a real-time basis to specify IN and OUT points of A- and B-rolls, and also indicate, to the control means 208, which of the B-roll storing mode, the A/B-roll editing mode, and the cut editing mode is to be carried out. With respect to the B-roll storing mode, the operator is also required to indicate a playback tape transport and a temporary storage means (the memory 50 or the IC card 36) to the control means 208. After a playback tape transport and a temporary storage means have been specified, the control means 208 starts carrying out the B-roll storing mode. In the re-try playback mode that is effected in the B-roll storing mode, the control means 208 plays back video and audio data as a B-roll again, and stores the video and audio data in the temporary storage means 206.

The second embodiment differs from the first embodiment in that when the operator gives a playback command to the control means 208, the control means 208 immediately starts the B-roll storing mode, determines which of the A/B-roll editing mode and the cut editing mode is to be carried out, and then carries out the A/B-roll editing mode or the cut editing mode based on the decision.

The third embodiment differs from the first embodiment in that the operator is required to put down time codes of IN and OUT points of A- and B-rolls on a sheet of paper or the like, and enter the time codes of IN and OUT points of A- and B-rolls through key inputs.

The fourth embodiment differs from the first embodiment in that, in the re-try playback mode, the control means 208 plays back video and audio data as a B-roll again from a position slightly prior to the position where an error that cannot be corrected has occurred, and stores the video and audio data in the temporary storage means 206.

According to the fifth embodiment, a video switcher and an audio switcher are used in place of a video special effect switcher and an audio mixer which are shown in FIG. 3.

* 1st Embodiment:

B: Structure and operation of an editing apparatus (see FIG. 3):

FIG. 3 shows in block form an editing apparatus according to a first embodiment of the present invention.

<Connection and structure>

Tape transports 20, 21 shown in FIG. 3 comprise respective rotary drums each having a recording/playback head or recording and playback heads, respective rotary transformers, respective loading devices for loading video tape cassettes (housing material tapes or edited tapes), and respective control circuits for controlling respective mechanisms of the tape transports 20, 21. The tape transport 20 has an output terminal connected to a fixed contact 22a of a switch 22, and the tape transport 21 has an output terminal connected to another fixed contact 22b of the switch 22. The switch 22 has a movable contact 22c connected to an input terminal of a playback signal processor 26.

The tape transport 20 has an input terminal connected to a fixed terminal 23a of a switch 23, and the tape transport 21 has an input terminal connected to another fixed terminal 23b of the switch 23. The switch 23 has a movable contact 23c connected to an output terminal of a recording signal processor 35. The switches 22, 23 are controlled by a system controller 24 for changing playback or recording routes or paths.

Specifically, when the movable contact 23c of the switch 23 is connected to the fixed contact 23a, video and audio signals to be recorded from the recording signal processor 35 are supplied through the switch 23 to the tape transport 20. When the movable contact 22c of the switch 22 is connected to the fixed contact 22a, video and audio signals played back by the tape transport 20 are supplied trough the switch 22 to the playback signal processor 26.

When the movable contact 23c of the switch 23 is connected to the fixed contact 23b, video and audio signals to be recorded from the recording signal processor 35 are supplied through the switch 23 to the tape transport 21. When the movable contact 22c of the switch 22 is connected to the fixed contact 22b, video and audio signals played back by the tape transport 21 are supplied through the switch 22 to the playback signal processor 26.

Therefore, if the tape transport 20 is used as a playback tape transport and the tape transport 21 as a recording tape transport, then the movable contact 22c of the switch 22 may be connected to the fixed contact 22a, and the movable contact 23c of the switch 23 may be connected to the fixed contact 23b. If the tape transport 20 is used as a recording tape transport and the tape transport 21 as a playback tape transport, then the movable contact 22c of the switch 22 may be connected to the fixed contact 22b, and the movable contact 23c of the switch 23 may be connected to the fixed contact 23a.

A video special effect switcher 27 comprises a switcher 27a, a video special effect circuit 27b, and a mix effector 27c, and can perform various video special effects including wipe, dissolve, and so on, and switching of video data. Based on a control signal from the system controller 24, the video special effect switcher 27 performs various video special effects and video switching on a video signal as an A-roll and a video signal as a B-roll which are supplied from the playback signal processor 26, and a video signal which is supplied from another playback system (not shown) through an external video input terminal 28.

A video signal produced by the video special effect switcher 27 is converted by a D/A converter 31 into an analog video signal, which is thereafter recorded on a magnetic tape by another analog recording device such as a VTR or the like, or supplied to a television monitor 32 and displayed as a monitor image on its screen. If the tape transports 20, 21, the playback signal processor 26, and the recording signal processor 35 are of digital specifications, then the video special effect switcher 27 is a digital video special effect switcher. If the tape transports 20, 21, the playback signal processor 26, and the recording signal processor 35 are of analog specifications, then the video special effect switcher 27 is an analog video special effect switcher.

Alternatively, if the video special effect switcher 27 has both an analog video signal input terminal and a digital video signal input terminal, then the video special effect switcher 27 is capable of processing both analog and digital signals. That is, an A/D converter may be connected to the output side of the playback signal processor 26, or a D/A converter may be connected to the input side of the video special effect switcher 27. The external video input terminal 28 may be a combination of two input terminals, i.e., an input terminal for receiving an analog video signal and an input terminal for receiving a digital video signal.

An audio mixer 29 has a mixing function, an equalizing function, and an effect function, and is supplied with an audio signal in L and R channels from the playback signal processor 26, or an audio signal through an external audio input terminal 30 from a playback device (not shown) such as a VTR, a DAT, a hard disk drive, an optical disk driver, a silicon disk, or the like. Based on a control signal supplied from the system controller 24, the audio mixer 29 mixes, equalizes, and applies an effect to the supplied audio signal. A signal line for the audio signal is shown as a single line.

An audio signal from the audio mixer 29 is converted by a D/A converter 33 into an analog audio signal, which is thereafter recorded on a magnetic tape by an analog recording device such as a VTR or supplied through an amplifier 34 to loudspeakers 34L, 34R which reproduces the audio signal.

If the tape transports 20, 21, the playback signal processor 26, and the recording signal processor 35 are of digital specifications, then the audio mixer 29 is a digital audio mixer. If the tape transports 20, 21, the playback signal processor 26, and the recording signal processor 35 are of analog specifications, then the audio mixer 29 is an analog audio mixer.

Alternatively, if the audio mixer 29 has both an analog video signal input terminal and a digital video signal input terminal, then the audio mixer 29 is capable of processing both analog and digital signals. That is, an A/D converter may be connected to the output side of the playback signal processor 26, or a D/A converter may be connected to the input side of the audio mixer 29. The external audio input terminal 30 may be a combination of two input terminals, i.e., an input terminal for receiving an analog audio signal and an input terminal for receiving a digital audio signal.

An IC card 36 serves to hold video and audio data as an A- or B-roll. The IC card 36 is used when inserted in an IC card slot 37. The IC card 36 may comprise a RAM backed up by a battery (SRAM or DRAM), an EEPROM, or the like. A control console 25 has a group of various control keys for performing editing functions, and a display 25a. The system controller 24 effects optimum control over the various components of the editing apparatus based on command signals from the control console 25.

In FIG. 3, the control keys on the control console 25 are indicated by "b"~"p" which mean "25b"~"25p", respectively.

The control keys include a cursor key 25b for selecting menu items and incrementing and decrementing numerical values, a stop key 25c, a pause key 25d, an eject key 25e, a rewind key 25*f*, a fast feed key 25*g*, a playback key 25*h*, a record key 25*i*, a variable-speed playback key 25*j*, a frame feed key 25*k*, an IN point specifying key 25L, an OUT point specifying key 25M, a return key 25N for determining actions and starting an editing process, a fader switch 25*o* for controlling audio levels, and an editing lever 25*p* for performing a wipe effect or the like.

The system controller 24 comprises a CPU, a ROM for storing a program and parameter data, a work RAM, and an interface. The system controller 24 is connected to the IC card slot 37 through a bus assembly composed of address, data, and control buses. Based on command signals from the control console 25, the system controller 24 controls the components for the B-roll storing mode (which may be an A- or C-roll storing mode) to store a material cut as a B-roll that has been played back by the tape transport 20 or 21 in a memory (described later on) in the playback signal processor 26 or the IC card 36, and also automatically controls the components for the re-try playback mode in the B-roll storing mode.

<Operation>

Operation of the editing apparatus shown in FIG. 3 will be described below.

First, it is assumed that the operator operates control keys on the control console 25 to specify the tape transport 20 as a playback tape transport and the tape transport 21 as a recording tape transport, and to produce A- and B-rolls. It is also assumed that a material to be produced as an A-roll and a material to be produced as a B-roll have been recorded on a magnetic tape in one video tape cassette.

<Specifying A- and B-rolls>

After having set the video tape cassette in the tape transport 20, the operator operates the control console 25 to place the tape transport 20 in a playback mode. When information indicating that the tape transport 20 is to be placed in a playback mode is supplied from the control console 25 to the system controller 24, the system controller 24 supplies switching control signals to the switches 22, 23 to connect the movable contact 22*c* of the switch 22 to the fixed contact 22*a* and the movable contact 23*c* of the switch 23 to the fixed contact 23*b*. Thereafter, the system controller 24 supplies a control signal to the tape transport 20 to play back the video tape cassette.

When the tape transport 20 plays back the video tape cassette, video and audio signals produced thereby are supplied through the switch 22 to the playback signal processor 26. The supplied video and audio signals are processed by the playback signal processor 26, and then supplied through the video special effect switcher 27 and the audio mixer 29 (in a through mode) to the D/A converters 31, 33, respectively. The D/A converter 31 produces an analog video signal, which is supplied to the television monitor 32 and displayed as an image on its screen. The D/A converter 33 produces an analog audio signal, which is supplied through the amplifier 34 to the loudspeakers 34L, 34R which reproduces the audio signal.

Time code data in the video signal from the tape transport 20 are extracted by the playback signal processor 26, and supplied to the system controller 24. The system controller 24 stores the supplied time code data successively into a memory (not shown in FIG. 3), and also converts the time code data into character data, which are supplied to the display 25*a* on the control console 25. Therefore, the display 25*a* displays time codes as an image on its screen.

The operator now successively determines materials to be produced as A- and B-rolls through a simple process. For example, for determining a material to be produced as an A-roll, the operator is only required to press the IN point specifying key 25L on the control console 25 when a first image of the material as an A-roll is displayed on the television monitor 32, and then press the OUT point specifying key 25M on the control console 25 when a last image of the material as an A-roll is displayed on the television monitor 32. The beginning of the material cut will be referred to as a start point, and the end of the material cut as an end point.

The system controller 24 then stores, in the non-illustrated memory, time code data at the time the IN point specifying key 25L is pressed and time code data at the time the OUT point specifying key 25M is pressed.

Transition start and end points of a transition period, which is a splice between the material cut as an A-roll and the material as a B-roll, can also be specified in the same manner as the IN and OUT points of the material cuts as A- and B-rolls are specified as described above. The transition start point of the transition period may be specified at any desired position in the material cut as an A-roll, and the transition end point of the transition period may be specified at any desired position in the material cut as a B-roll.

In this example, a playback device for playing back A- and B-rolls is the tape transport 20 only. Therefore, when the material cut as an A-roll is played back by the tape transport 20, it is necessary to store the material cut as a B-roll in the memory in the playback signal processor 26. This is because in the A/B-roll editing mode material cuts as A- and B-rolls are played back by individual playback devices.

<B-roll storing mode>

With the time codes of the IN and OUT points of the material cuts as A- and B-rolls being stored in the memory, the system controller 24 supplies a control signal to the tape transport 20 to access the start of the material cut as a B-roll and thereafter play back the material cut as a B-roll. Video and audio signals as a B-roll which are played back by the tape transport 20 are supplied through the playback signal processor 26, the video special effect switcher 27 and the audio mixer 29 to the recording signal processor 35. The recording signal processor 35 processes the supplied video and audio signals for recording, and the processed video and audio signals are supplied to and stored in the memory in the playback signal processor 26 or the IC card 37.

<A/B-roll editing mode>

The material cuts as A- and B-rolls have been prepared in the manner described above. The system controller 24 supplies a control signal to the tape transport 20 to access the start of the material cut as an A-roll and thereafter play back the material cut as an A-roll.

The system controller 24 controls the video special effect switcher 27 and the audio mixer 29 to select video and audio signals as an A-roll from the tape transport 20. The video and audio signals as an A-roll are supplied through the recording signal processor 35 and the switch 23 to the tape transport 21, which records the supplied video and audio signals as an A-roll in oblique tracks on a magnetic tape in a video tape cassette which has been set in the tape transport 21.

The system controller 24 monitors time code data from the tape transport 20. When the system controller 24 recognizes a time slightly prior to a transition start point, the system controller 24 reads the video and audio signals as a B-roll from the memory or the IC card 37. Then, when the time code data from the tape transport 20 represent the transition start point, the system controller 24 controls the video special effect switcher 27 and the audio mixer 29 to select the video and audio signals as a B-roll while maintaining the selection of the video and audio signals as an A-roll. In the transition period, therefore, the video signals as A- and B-rolls are processed by the video special effect switcher 27, and the audio signals as A- and B-rolls are processed by the audio mixer 29.

Specifically, in the transition period, the video special effect switcher 27 performs various video special effects including wipe, dissolve, and so on, and video data switching on the video signals as A- and B-rolls based on a control signal from the system controller 24, and the audio mixer 29 processes and mixes the audio signals as A- and B-rolls based on a control signal from the system controller 24.

The processed video signals from the video special effect switcher 27 and the processed audio signals from the audio mixer 29 are supplied through the recording signal processor 35 and the switch 23 to the tape transport 21, which records the supplied video and audio signals in oblique tracks on the magnetic tape in the video tape cassette set in the tape transport 21. The video signals processed by the video special effect switcher 27 are also supplied to the D/A converter 31 and converted thereby into an analog video signal, which is supplied to the television monitor 32 and displayed as an image on its screen. The audio signals processed by the audio mixer 29 are also supplied to the D/A converter 32 and converted thereby into an analog audio signal, which is supplied through the amplifier 34 to the loudspeakers 34L, 34R which reproduces the audio signal.

When the time code data from the tape transport 20 represent a transition end point, the system controller 24 controls the video special effect switcher 27 and the audio mixer 29 to cancel the selection of the video and audio signals as an A-roll. After elapse of the transition period, therefore, the video and audio signals as a B-roll are supplied through the recording signal processor 35 and the switch 23 to the tape transport 21, which records the supplied video and audio signals in oblique tracks on the magnetic tape in the video tape cassette set in the tape transport 21.

Although not specifically described, video and audio signals which may be supplied through the input terminals 28, 30 from an external device may be processed and recorded in the same manner as described above. While the tape transport 20 has been selected as a playback tape transport and the tape transport 21 as a recording tape transport in the above example, the tape transport 20 may be selected as a recording tape transport and the tape transport 21 as a playback tape transport.

C: Structure and operation of the playback signal processor 26 shown in FIG. 2 (see FIGS. 4 and 5):

FIG. 4 shows in block form the playback signal processor 26 in the editing apparatus shown in FIG. 3, and FIGS. 5A and 5B are tables showing switch connections which are stored in the memory in the system controller 24.

<Connection and structure>

As shown FIG. 4, the playback signal processor 26 comprises an amplifier 41 for amplifying a compressed video signal and an audio signal which are supplied through an input terminal 40 from the tape transport 20 or 21 shown in FIG. 3, a data extractor 42 for reproducing a clock signal from the output signal from the amplifier 41 and extracting digitally modulated compressed video data and audio data based on the clock signal, a channel decoder 43 for decoding the digitally modulated compressed video data and audio data from the data extractor 42 into original compressed video data and audio data, an error corrector 44 for error-correcting the compressed video data and audio data from the channel decoder 43 and, if compressed video data and audio data that cannot be error-corrected are produced, supplying flag data indicative of such compressed video data and audio data that cannot be error-corrected through an output terminal 44a to the system controller 24 shown in FIG. 3, a memory 50 for storing the error-corrected compressed video data and audio data from the error corrector 44 in response to a read/write control signal that is supplied from the system controller 24 through an input terminal 49, a video data expander 47 for expanding the compressed video data from the error corrector 44, a video data expander 53 for expanding the compressed video data from the memory 50, an audio reproducer 57 for reproducing, e.g., deinterleaving, the audio data from the error corrector 44, an audio reproducer 61 for reproducing, e.g., deinterleaving, the audio data from the memory 50, a switch 45 for supplying the compressed video data from the error corrector 44 selectively to the memory 50, the IC card 36, and the video data expander 47, a switch 55 for supplying the audio data from the error corrector 44 selectively to the memory 50, the IC card 36, and the audio reproducer 57, a switch 51 for supplying the compressed video data from the memory 50 or the IC card 36 to the video data expander 53, and a switch 59 for supplying the audio data from the memory 50 or the IC card 36 to the audio reproducer 61.

Control signals CONT from the system controller 24 are supplied to all the components, shown in FIG. 4 and described above, of the playback signal processor 26.

<Switch connection patterns>

Connection patterns of the switches 22, 23, 45, 51, 55, 59 shown in FIGS. 3 and 4 will be described below with reference to FIGS. 5A and 5B. In FIGS. 5A and 5B, the numerals following the term "switch" correspond to the reference numerals of the switches shown in FIGS. 3 and 4, the letter "a" in the columns "CONTACT" represents the fixed contacts of the switches shown in FIGS. 3 and 4, the letters "b", "c" in the columns "CONTACT" represent the movable contacts of the switches shown in FIGS. 3 and 4, and the mark "×" indicates that the movable contacts of the switches shown in FIGS. 3 and 4 are not connected to any of the fixed contacts or those switches are not used.

FIG. 5A is a table showing patterns of switch connections for the B-roll storing mode. For the B-roll storing mode, there are four patterns of switch connections as described below.

P1: For playing back a material cut as a B-roll with the tape transport 20 and storing the reproduced data in the memory 50;

P2: For playing back a material cut as a B-roll with the tape transport 20 and storing the reproduced data in the IC card 36;

P3: For playing back a material cut as a B-roll with the tape transport 21 and storing the reproduced data in the memory 50; and P4: For playing back a material cut as a B-roll with the tape transport 21 and storing the reproduced data in the IC card 36.

FIG. 5B is a table showing patterns of switch connections for the A/B-roll editing mode and the cut editing mode. For the A/B-roll editing mode and the cut editing mode, there are four patterns of switch connections as described below.

P5: For playing back a material cut as an A-roll with the tape transport 20, reading a material cut as a B-roll from the memory 50, and recording these two reproduced data on a magnetic tape in a video tape cassette that has been set in the tape transport 21;

P6: For playing back a material cut as an A-roll with the tape transport 20, reading a material cut as a B-roll from the IC card 36, and recording these two reproduced data on a magnetic tape in a video tape cassette that has been set in the tape transport 21;

P7: For playing back a material cut as an A-roll with the tape transport 21, reading a material cut as a B-roll from the memory 50, and recording these two reproduced data on a magnetic tape in a video tape cassette that has been set in the tape transport 20; and P8: For playing back a material cut as an A-roll with the tape transport 20, reading a material cut as a B-roll from the IC card 36, and recording these two reproduced data on a magnetic tape in a video tape cassette that has been set in the tape transport 20.

Data of the switch connection patterns described above with reference to FIGS. 5A and 5B are stored as switch connection tables in the memory in the system controller 24 shown in FIG. 3.

Operation of the playback signal processor 26 shown in FIG. 4 in the above switch connection patterns will be described below.

<Operation in the pattern P1>

Compressed video data and audio data as a B-roll from the tape transport 20 are supplied through the switch 22 (FIG. 3), the input terminal 40, the amplifier 41, the data extractor 42, and the channel decoder 43 to the error corrector 44. Video data outputted from the error corrector 44 are supplied through the switch 45 to the memory 50 and stored in the memory 50. Audio data outputted from the error corrector 44 are supplied through the switch 55 to the memory 50 and stored in the memory 50.

<Operation in the pattern P2>

Compressed video data and audio data as a B-roll from the tape transport 20 are supplied through the switch 22 (FIG. 3), the input terminal 40, the amplifier 41, the data extractor 42, and the channel decoder 43 to the error corrector 44. Video data outputted from the error corrector 44 are supplied through the switch 45 to the IC card 36 and stored in the IC card 36. Audio data outputted from the error corrector 44 are supplied through the switch 55 to the IC card 36 and stored in the IC card 36.

<Operation in the pattern P3>

Compressed video data and audio data as a B-roll from the tape transport 21 are supplied through the switch 22 (FIG. 3), the input terminal 40, the amplifier 41, the data extractor 42, and the channel decoder 43 to the error corrector 44. Video data outputted from the error corrector 44 are supplied through the switch 45 to the memory 50 and stored in the memory 50. Audio data outputted from the error corrector 44 are supplied through the switch 55 to the memory 50 and stored in the memory 50.

<Operation in the pattern P4>

Compressed video data and audio data as a B-roll from the tape transport 21 are supplied through the switch 22 (FIG. 3), the input terminal 40, the amplifier 41, the data extractor 42, and the channel decoder 43 to the error corrector 44. Video data outputted from the error corrector 44 are supplied through the switch 45 to the IC card 36 and stored in the IC card 36. Audio data outputted from the error corrector 44 are supplied through the switch 55 to the IC card 36 and stored in the IC card 36.

<Operation in the pattern P5>

Compressed video data and audio data as an A-roll from the tape transport 20 are supplied through the switch 22 (FIG. 3), the input terminal 40, the amplifier 41, the data extractor 42, and the channel decoder 43 to the error corrector 44. Video data outputted from the error corrector 44 are supplied through the switch 45, the video data expander 47, the video special effect switcher 27 shown in FIG. 3, the recording signal processor 35, and the switch 23 to the tape transport 21. Audio data outputted from the error corrector 44 are supplied through the switch 55, the audio reproducer 57, the audio mixer 29 shown in FIG. 3, the recording signal processor 35, and the switch 23 to the tape transport 21.

The compressed video data as a B roll read from the memory 50 are supplied through the switch 51, the video data expander 53, the video special effect switcher 27 shown in FIG. 3, the recording signal processor 35, and the switch 23 to the tape transport 21. The audio data as a B-roll read from the memory 50 are supplied through the switch 59, the audio reproducer 61, the audio mixer 29 shown in FIG. 3, the recording signal processor 35, and the switch 23 to the tape transport 21.

<Operation in the pattern P6>

Compressed video data and audio data as an A-roll from the tape transport 20 are supplied in the same manner as in the pattern P5. The compressed video data as a B roll read from the IC card 36 are supplied through the switch 51, the video data expander 53, the video special effect switcher 27 shown in FIG. 3, the recording signal processor 35, and the switch 23 to the tape transport 21. The audio data as a B-roll read from the IC card 36 are supplied through the switch 59, the audio reproducer 61, the audio mixer 29 shown in FIG. 3, the recording signal processor 35, and the switch 23 to the tape transport 21.

<Operation in the pattern P7>

Compressed video data and audio data as an A-roll from the tape transport 21 are supplied through the switch 22 (FIG. 3), the input terminal 40, the amplifier 41, the data extractor 42, and the channel decoder 43 to the error corrector 44. Video data outputted from the error corrector 44 are supplied through the switch 45, the video data expander 47, the video special effect switcher 27 shown in FIG. 3, the recording signal processor 35, and the switch 23 to the tape transport 20. Audio data outputted from the error corrector 44 are supplied through the switch 55, the audio reproducer 57, the audio mixer 29 shown in FIG. 3, the recording signal processor 35, and the switch 23 to the tape transport 20.

The compressed video data as a B roll read from the memory 50 are supplied through the switch 51, the video data expander 53, the video special effect switcher 27 shown in FIG. 3, the recording signal processor 35, and the switch 23 to the tape transport 20. The audio data as a B-roll read from the memory 50 are supplied through the switch 59, the audio reproducer 61, the audio mixer 29 shown in FIG. 3, the recording signal processor 35, and the switch 23 to the tape transport 20.

<Operation in the pattern P8>

Compressed video data and audio data as an A-roll from the tape transport 21 are supplied in the same manner as in the pattern P7. The compressed video data as a B roll read from the IC card 36 are supplied through the switch 51, the video data expander 53, the video special effect switcher 27 shown in FIG. 3, the recording signal processor 35, and the switch 23 to the tape transport 20. The audio data as a B-roll read from the IC card 36 are supplied through the switch 59, the audio reproducer 61, the audio mixer 29 shown in FIG. 3, the recording signal processor 35, and the switch 23 to the tape transport 20.

Figure 6:
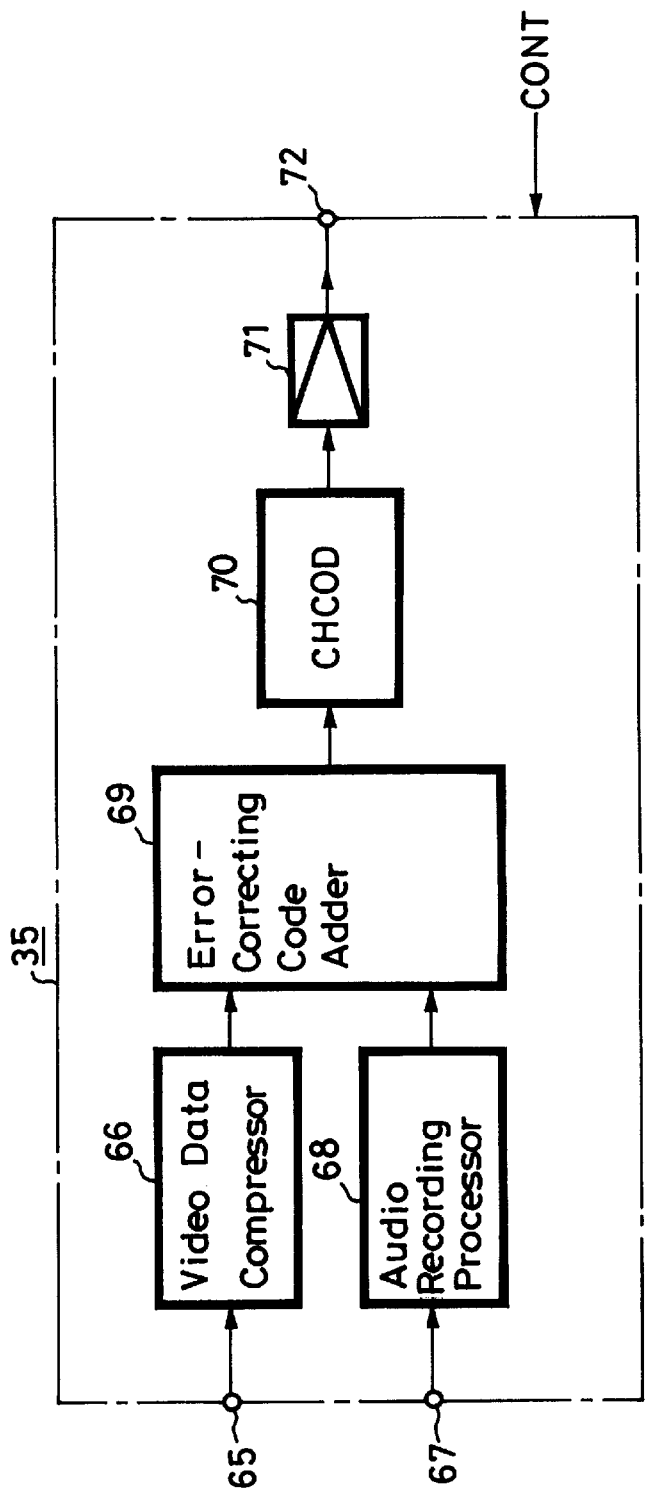
FIG. 6 is a block diagram of a recording signal processor in the editing apparatus shown in FIG. 3.

D: Structure and operation of the recording signal processor 35 shown in FIG. 2 (see FIG, 6):

FIG. 6 shows in block form the recording signal processor 35 in the editing apparatus shown in FIG. 3.

<Connection and structure>

As shown in FIG. 6, the recording signal processor 35 comprises a video data compressor 66 for compressing a video signal that is supplied through an input terminal 65 from the video special effect switcher 27 shown in FIG. 3, an audio recording processor 68 for processing, e.g., interleaving, an audio signal that is supplied through an input terminal 67 from the audio mixer 29 shown in FIG. 3, an error-correcting code adder 69 for adding inner- and outer-code error-correcting codes to the compressed video data from the video data compressor 66 and the audio data from the audio recording processor 68, a channel coder 70 for digitally modulating the data from the error-correcting code adder 69, and a recording amplifier 71 for amplifying the output data from the channel coder 70 for recording.

The video data compressor 66 compresses the video signal by way of DCT (Discrete Cosine Transform), ADRC (Adaptive Dynamic Range Coding), or a transformation process such as wavelet transformation or the like, and then effects variable-length encoding such as run-length encoding or Huffman encoding on the compressed data.

Control signals CONT from the system controller 24 are supplied to all the components, shown in FIG. 6 and described above, of the recording signal processor 35.

<Operation>

Operation of the recording signal processor 35 will be described below.

A video signal from the video special effect switcher 27 shown in FIG. 3 is supplied through the input terminal 65 to the video data compressor 66. After the supplied video signal is compressed by the video data compressor 66, it is supplied to the error-correcting code adder 69.

An audio signal from the audio mixer 29 shown in FIG. 3 is supplied through the input terminal 67 to the audio recording processor 68. After the supplied audio signal is processed, e.g., interleaved, by the audio recording processor 68, it is supplied to the error-correcting code adder 69. The error-correcting code adder 69 adds inner and outer codes to the compressed video data and audio data, converting them into data in the format of a product code. The data in the format of a product code are supplied to the channel coder 70, which digitally modulates the supplied data. The digitally modulated data are then supplied through the amplifier 71 and an output terminal 72 to the tape transport 20 or 21 shown in FIG. 3.

E: Structure of the system controller 24 shown in FIG. 2 (see FIG. 7);

<Connection and structure>

Figure 7:
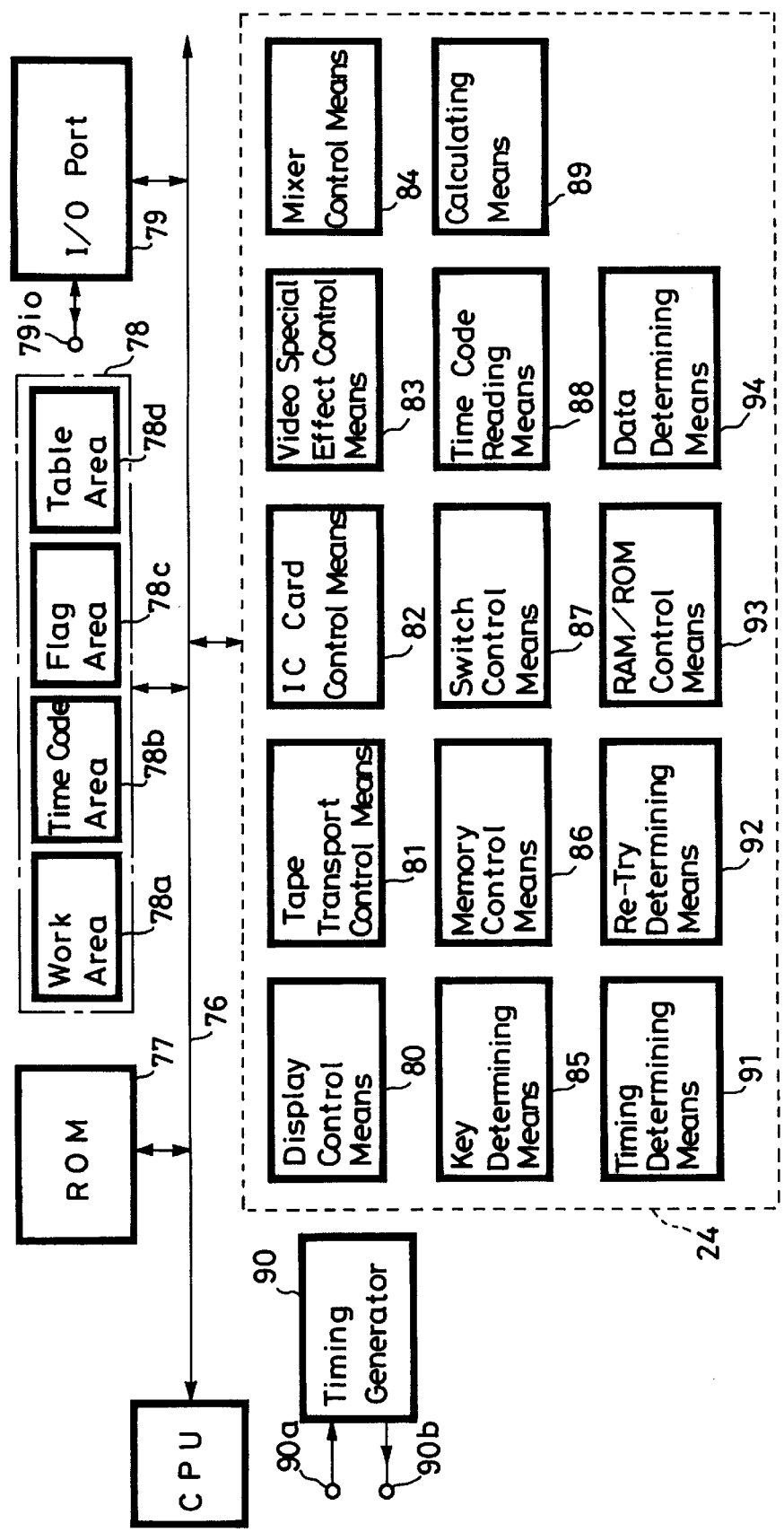
FIG. 7 is a block diagram of a system controller in the editing apparatus shown in FIG. 3.

As shown in FIG. 7, the system controller 24 comprises a CPU 75, a bus assembly 76 composed of address, data, and control buses, and connected to the CPU 75, a ROM 77 connected to the bus assembly 76 and storing program data and parameter data for executing various processing sequences shown in FIGS. 9 through 17, a work RAM 78 connected to the bus assembly 76, an input/output port 79 connected to the bus assembly 76, and a timing generator 90 connected to the bus assembly 76.

The parameter data stored in the ROM 77 include time data indicative of a common time representing several seconds prior to the IN points of material cuts as A- and B-rolls, several seconds prior to the OUT points of material cuts as A- and B-rolls, and several seconds prior to the IN point of a transition period, and time code/address data indicative of a proportion of a unit address in the storage space in the memory 50 or the IC card 36 to unit time code data.

The time data representing "several seconds" referred to above are used as each of a marginal time prior to the IN points of A- and B-rolls, a marginal time subsequent to the OUT points of A- and B-rolls, a marginal time prior to an A-roll transition start point, and a marginal time subsequent to a B-roll transition end point. While these time data are indicative of the same time, they have different meanings as described below.

If the above time data are used as a marginal time prior to the IN points in reproducing material cuts as A- and B-rolls from a magnetic tape, then the time data represent the sum of a time that is consumed from the supply of a control signal indicating a start of playback until the tape transport 20 actually plays back the material cuts from the IN points of the A- and B-rolls, and a time that is consumed as an allowance. The term "allowance" signifies a margin to permit the IN points of the A- and B-rolls to be displaced subsequently or accommodate for a pre-roll.

If the above time data are used as a marginal time subsequent to the OUT points in stopping to reproduce material cuts as A- and B-rolls from a magnetic tape, then the time data represent a time that is consumed as an allowance. The term "allowance" signifies a margin to permit the IN points of the A- and B-rolls to be displaced subsequently or accommodate for a pre-roll, and also signifies that the reproduction of the material cuts may not immediately be stopped even when the OUT points are reached.

If the above time data are used as a marginal time prior to a transition start point in playing back a material cut as an A-roll from a magnetic tape, playing back a material cut as a B-roll from the memory 50 or the IC card 36, and editing the material cuts as A- and B-rolls, then the time data represent a pre-roll time for allowing video data as the B-roll to be read from the memory 50 or the IC card 36 and supplied to and recorded by the tape transport 21 when the position of a magnetic tape in a video tape cassette set in the tape transport 20 or 21 reaches a position where the time code of the transition start point is recorded.

If the above time data are used as a marginal time subsequent to a transition end point in playing back a material cut as an A-roll from a magnetic tape, playing back a material cut as a B-roll from the memory 50 or the IC card 36, and editing the material cuts as A- and B-rolls, then the time data substantially represent a marginal time subsequent to the OUT points in reproducing the A- and B-rolls as described above.

If one pixel corresponds to one address and one frame corresponds to 640×400 pixels, for example, then the "proportion" indicated by the time code/address data represents "256000" addresses with respect to one time code data.

The timing generator 90 has an input terminal 90a for receiving a reproduced synchronizing signal from the tape transport 20 or 21 shown in FIG. 3 or an external synchronizing signal such as a gen-lock signal or the like. The timing generator 90 serves to lock a clock signal generated by an internal reference clock generating circuit in phase with a synchronizing signal from the input terminal 90a with a PLL circuit (not shown), generate a reference synchronizing signal and various timing signals based on the phase-locked clock signal, and supply the generated signals through an output terminal 90b to the various components shown in FIG. 3.

The RAM 78 has a storage space composed of a work area 78a, a time code area 78b for temporarily storing time code data or the like from the tape transport 20 or 21 shown in FIG. 3, a flag area 78c for storing flag data from the error corrector 44 shown in FIG. 4, and a table area 78d for storing the switch connection tables shown in FIGS. 5A and 5B and editing table data (described later on).

The input/output port 79 serves to receive time code data from the tape transport 20 or 21 shown in FIG. 3 and supply control signals to the various components shown in FIG. 3, through an input/output terminal 79io.

When the editing apparatus shown in FIG. 3 is turned on, the program data stored in the ROM 77 are loaded into a main memory of the CPU 75, which then performs the functions of a display control means 80, a tape transport control means 81, an IC card control means 82, a video special effect control means 83, a mixer control means 84, a key determining means 85, a memory control means 86, a switch control means 87, a time code reading means 88, a calculating means 89, a timing determining means 91, a re-try determining means 92, a RAM/ROM control means 93, and a data determining means 94. The functions of these means will be described below.

<Display control means 80>

The display control means 80 controls the display 25a shown in FIG. 3 through the input/output port 79, converts information to be displayed on the display 25a into character data, and supplies the character data through the input/output port 79 to the display 25a.

<Tape transport control means 81>

The tape transport control means 81 supplies control signals for stopping, pausing, rewinding, and fast-feeding magnetic tapes through the input/output port 79 to the tape transports 20, 21 shown in FIG. 3 to cause the tape transports 20, 21 to stop, pause, rewind, and fast-feed the magnetic tapes.

<IC card control means 82>

The IC card control means 82 supplies a read/write control signal through the input port 79 to the IC card 36 shown in FIG. 3 to enable the IC card 36 to write input data and read stored data.

<Video special effect control means 83>

The video special effect control means 83 supplies a control signal indicative of the content of a video special effect, the selection of an input signal, or the cancel of the selection of an input signal through the input/output port 79 to the video special effect switcher 27 shown in FIG. 3 to enable the video special effect switcher 27 to select a video special effect or an input signal or cancel the selection of an input signal.

<Mixer control means 84>

The mixer control means 84 supplies a control signal indicative of the content of audio mixing or the like through the input/output port 79 to the audio mixer 29 shown in FIG. 3 to enable the audio mixer 29 to mix audio data.

<Key determining means 85>

The key determining means 85 determines which key of the control keys on the control console 25 shown in FIG. 3 and how that key is pressed based on control information that is supplied from the control console 25 through the input/output port 79, and indicates the result of determination to corresponding means.

<Memory control means 86>

The memory control means 86 supplies a read/write control signal through the input port 79 to the memory 50 shown in FIG. 4 to enable the memory 50 to write input data and read stored data.

<Switch control means 87>

The switch control means 87 supplies a switching control signal through the input/output port 79 to the switches 22, 23 shown in FIG. 3 and the switches 45, 51, 55, 59 shown in FIG. 4 to enable these switches 22, 23, 45, 51, 55, 59 to change data input/output paths or routes.

<Time code reading means 88>

The time code reading means 88 extracts time code data from the data which are supplied from the tape transports 20, 21 shown in FIG. 3 through the input/output port 79.

<Calculating means 89>

The calculating means 89 calculates the difference between time code data that are read by the time code reading means 88 and stored in the time code area 78c of the RAM 78 and time code data in the editing table stored in the table area 78d of the RAM 78, calculates the difference between address data in read/write control signals outputted from the IC card control means 82 and the memory control means 86 and address data in the editing table stored in the table area 78d of the RAM 78, and converts a value indicated by a time code obtained by the time code reading means 88 into an address value in the storage space of the memory 50 or the IC card 36 based on the time code/address data stored in the ROM 77.

For determining whether the present time is prior to a reference time code (e.g., the time code of an IN point), the calculating means 89 subtracts a time code read by the time code reading means 88 from the reference time code. If the result of subtraction, e.g., the difference, is a positive value, then the position of the magnetic tape is prior to a reference position in time, and if it is a negative value, then the position of the magnetic tape is ahead of a reference position in time.

For determining whether the present time is subsequent to a reference time code (e.g., the time code of an OUT point), the calculating means 89 subtracts a time code read by the time code reading means 88 from the reference time code. If the result of subtraction, e.g., the difference, is a positive value, then the position of the magnetic tape is prior to a reference position in time, and if it is a negative value, then the position of the magnetic tape is ahead of a reference position in time.

<Timing determining means 91>

The timing determining means 91 compares differential data calculated by the calculating means 89 with time data stored in the ROM 77, and detects timing to be controlled based on the result of comparison.

<Re-try determining means 92>

The re-try determining means 92 determines whether a re-try playback mode is to be performed or not based on the content of flag data supplied from the error corrector 44 shown in FIG. 4 through the input/output port 79.

<RAM/ROM control means 93>

The RAM/ROM control means 93 writes various data into the RAM 78 and reads various data stored in the ROM 77 and the RAM 78.

<Data determining means 94>

The data determining means 94 searches data of the editing table that is stored in the table area 78d of the RAM 78 to detect the presence of data, etc.

Operation of the various components and functions of the system controller 24 shown in FIG. 7 will be described later on under the titles G~J with reference to FIGS. 9 through 17.

F: Editing table (see FIG. 8):

FIG. 8 shows the editing table that is stored in the table area 78d of the RAM 78.

As shown in FIG. 8, the editing table is composed of time code data of an A-roll IN point, time code data of an A-roll OUT point, time code data of a B-roll IN point, time code data of a B-roll OUT point, time code data of an A-roll transition start point, time code data of a B-roll transition end point, data of a memory readout start point address, data of a memory OUT point address, and data of a memory readout end point address.

As shown in FIG. 8, the time code data comprise data indicative of h (hour), m (minute), s (second), and f (frame). The address data comprise data indicative of addresses in the storage space of the memory 50 or the IC card 36.

An A-roll IN point, a B-roll IN point, an A-roll transition start point, and a B-roll transition end point are specified by the operator. If a material cut stored in the memory 50 or the IC card 36 is a B-roll, then a memory readout start point address, a memory OUT point address, and a memory readout end point address are obtained as follows:

<Memory readout start point address>

The data of a memory readout start point address represent an address corresponding to a first address in the storable storage space of the memory 50 or the IC card 36. The memory readout start point address data are registered in the editing table by the memory control means 86 in the B-roll storing mode or the editing apparatus is energized.

<Memory OUT point address>

The calculating means 89 determines the data of a memory OUT point address are determined by determining time code data several seconds prior to the IN point of a B-roll based on the time code data of a B-roll IN point and the time data stored in the ROM 77, calculating the difference between the determined time code data and the time code data of a B-roll OUT point, converts the calculated differential time data into address data based on the time code/address data stored in the ROM 77, and adding the address data to the memory readout start point address data. The data of a memory OUT point address are registered in the editing table by the calculating means 89.

<Memory readout end point address>

The calculating means 89 determines the data of a memory readout end point address by converting the time data stored in the ROM 77 into address data and adding the address data to the memory OUT point address data. The data of a memory readout end point address are registered in the editing table by the calculating means 89.

For playing back a material cut as an A-roll from a magnetic tape and playing back a material cut as a B-roll from the memory 50 or the IC card 36, all the data in the editing table are used in the A/B-roll editing mode, and the data except the time code data of an A-roll transition start point and a B-roll transition end point and the data of a memory OUT point address are used in the cut editing mode.

G: Main routine (see FIG. 9):

<Operation sequence of a main routine>

Figure 9:
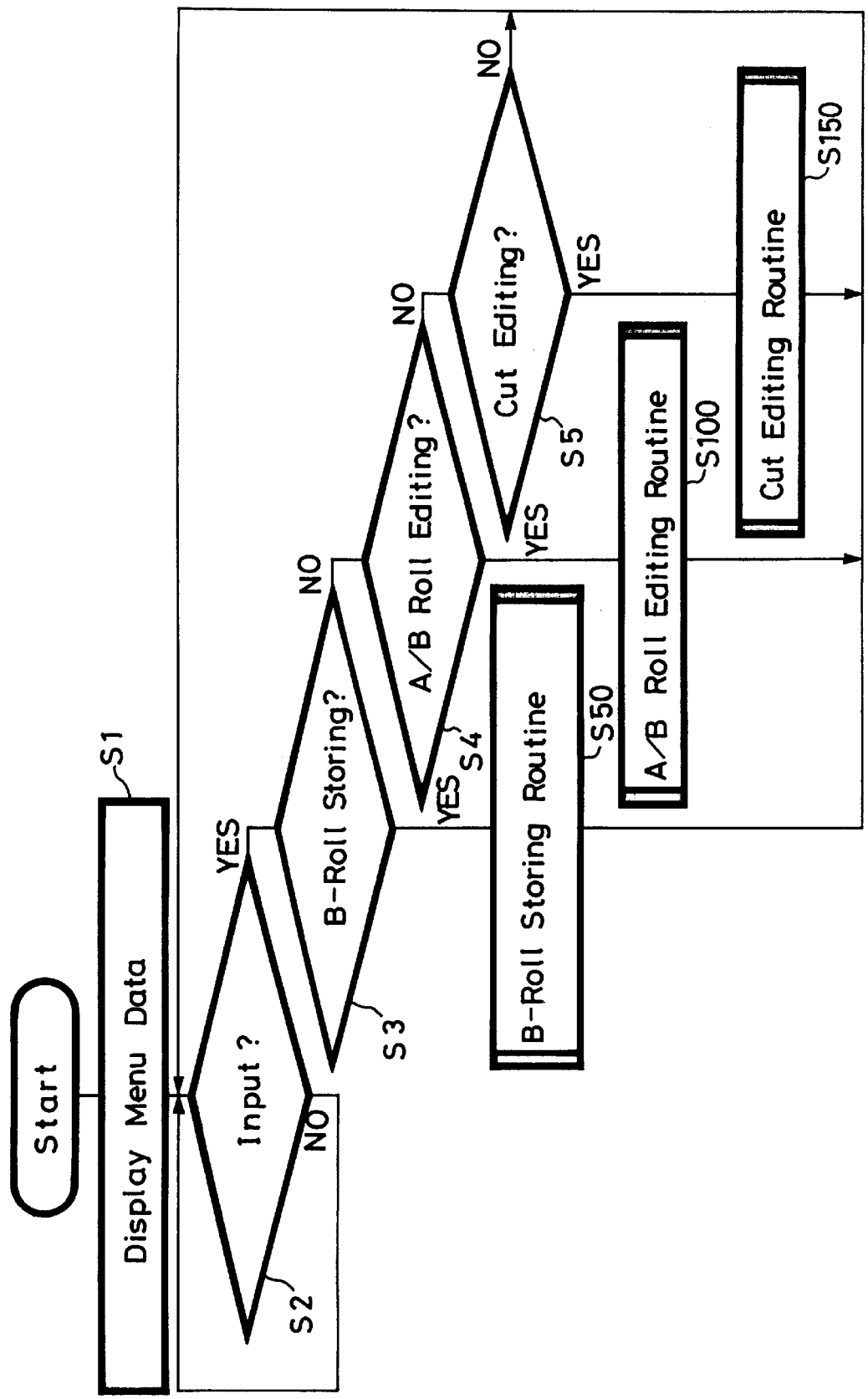
FIG. 9 is a flowchart of a main routine of operation of the editing apparatus shown in FIG. 3.

FIG. 9 shows a main routine of operation of the editing apparatus shown in FIG. 3. In the main routine, one of processing sequences that is to be carried out is specified by the operator. In the flowcharts shown in FIGS. 9 through 32, it is assumed that the memory 50 is selected as a temporary storage means, and the tape transport 20 is selected as a playback tape transport.

In a step S1, the RAM/ROM control means 93 shown in FIG. 7 reads menu data, and the display control means 80 supplies the menu data read by the RAM/ROM control means 93 through the input/output port 79 to the display 25a shown in FIG. 3 to display the menu data. Then, control proceeds to a step S2.

In the step S2, the key determining means 85 shown in FIG. 7 determines whether the return key 25N on the control console 25 shown in FIG. 3 has been pressed or not. If "YES", then control proceeds to a step S3. One example of the menu data displayed on the display 25a is given as follows:

1. B-ROLL STORING MODE
2. A/B-ROLL EDITING MODE
3. CUT EDITING MODE

* PRESS RETURN KEY AFTER HAVING SELECTED WITH CURSOR KEY.

In the step S3, the key determining means 85 determines whether the B-roll storing mode has been selected or not based on positional information produced at the time the return key 25N is pressed. If "YES", then control goes to a step S50 for a B-roll storing routine. If "NO", then control goes to a step S4. The B-roll storing routine will be described in detail later on with reference to FIGS. 10 and 11. A process is selected when the cursor key 25b on the control console 25 is pressed, and determined when the return key 25N on the control console 25 is pressed.

In the step S4, the key determining means 85 determines whether the A/B-roll editing mode has been selected or not based on positional information produced at the time the return key 25N is pressed. If "YES", then control goes to a step S100 for an A/B-roll editing routine. If "NO", then control goes to a step S5. The A/B-roll editing routine will be described in detail later on with reference to FIGS. 12 through 14. The A/B-roll editing mode can also be specified when the operator specifies a special effect of dissolve, wipe, or fade-in/fade-out.

In the step S5, the key determining means 85 determines whether the cut editing mode has been selected or not based on positional information produced at the time the return key 25N is pressed. If "YES", then control goes to a step S150 for a cut editing routine. If "NO", then control goes back to the step S2. The cut editing routine will be described in detail later on with reference to FIGS. 15 through 17.

H: B-roll storing routine (see FIGS. 10 and 11):

<Operation sequence of a B-roll storing routine>

Figure 10:
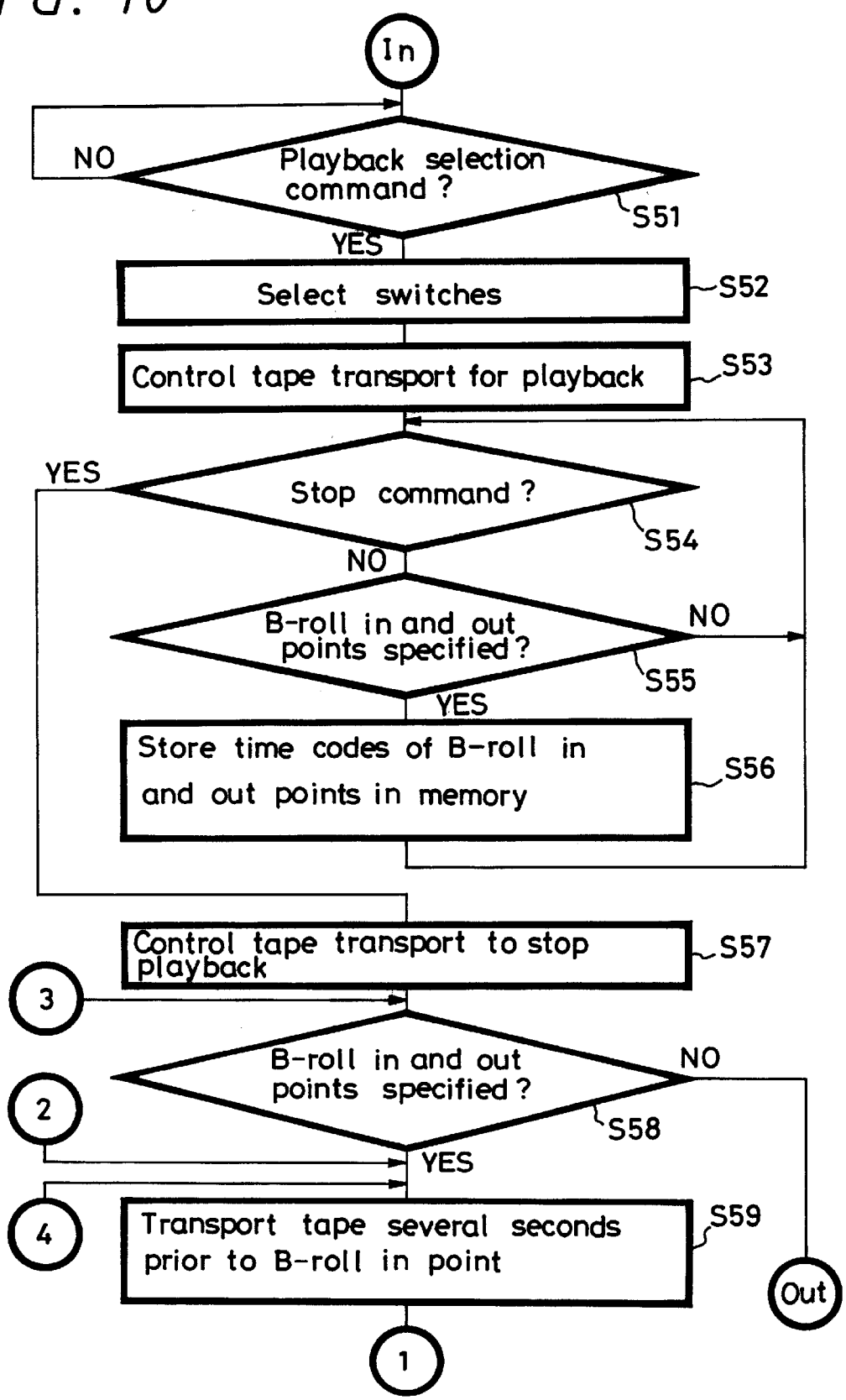
FIG. 10 is a flowchart of a B-roll storing routine in the main routine shown in FIG. 9.
Figure 11:
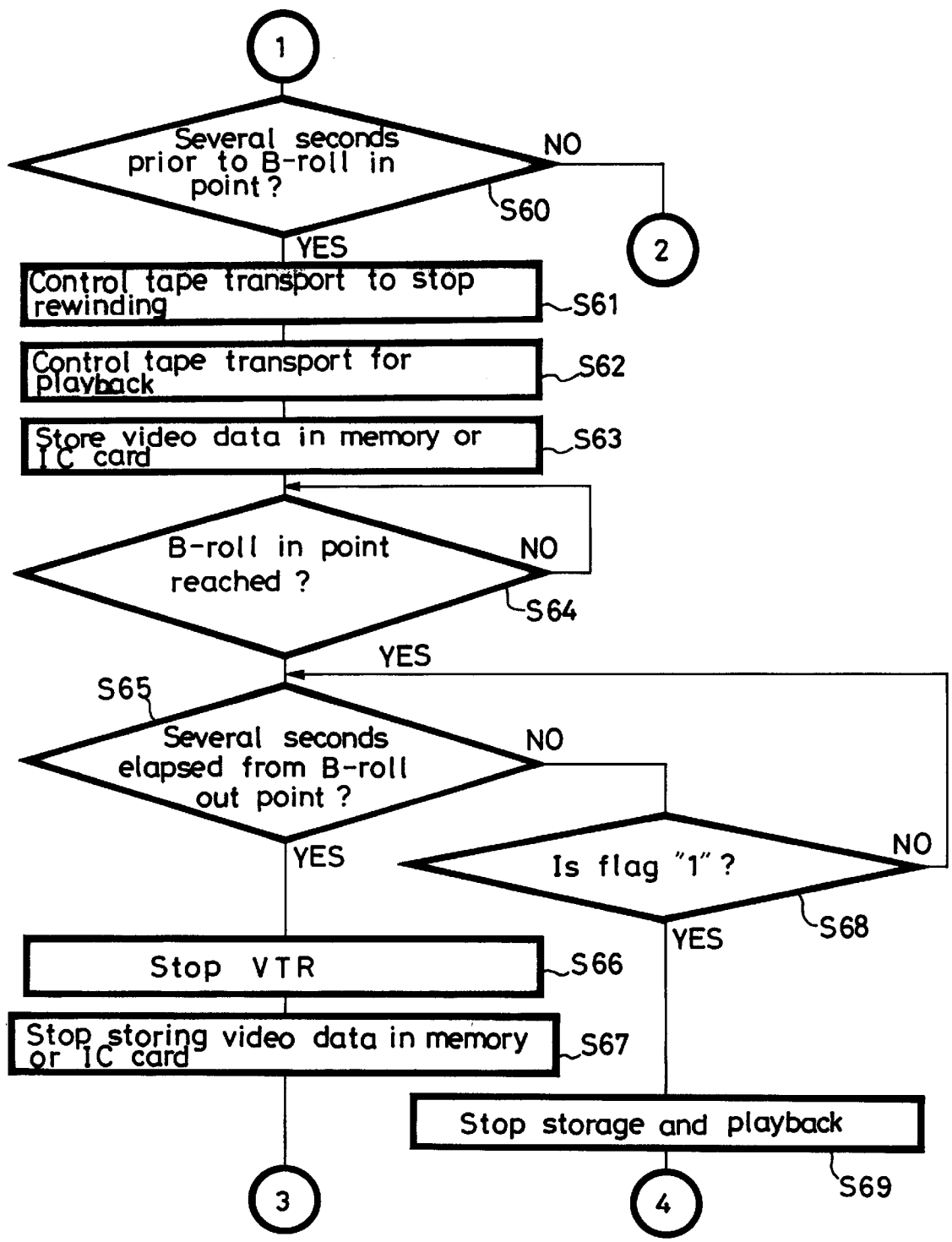
FIG. 11 is a flowchart of the B-roll storing routine in the main routine shown in FIG. 9.

FIGS. 10 and 11 show details of the step S50 shown in FIG. 9, i.e., the content of a B-roll storing routine.

In a step S51 shown in FIG. 10, the key determining means 85 determines which of the tape transports 20, 21 is to be used as a playback tape transport and which of the memory 50 and the IC card 36 is to be used as a medium for storing image data as a B-roll, based on positional information produced at the time the return key 25N is pressed. Then, control proceeds to a step S52. The determined data are stored as data of the switch connection tables shown in FIGS. 5A and 5B in the table area 78d of the RAM 78 by the RAM/ROM control means 93. The data are selected when the cursor key 25b is pressed, and determined when the return key 25N is pressed. One example of a menu displayed when the above data are to be selected and determined is given as follows:

<SELECTION OF TAPE TRANSPORT>
1. TAPE TRANSPORT A
2. TAPE TRANSPORT B
<SELECTION OF TEMPORARY STORAGE MEDIUM>
1. INTERNAL MEMORY
2. IC CARD

* PRESS RETURN KEY AFTER HAVING SELECTED WITH CURSOR KEY.

In the step S52, the switch control means 87 supplies switching control signals to the switches 22, 23 through the input/output port 79 to control connections of the switches 22, 23 based on the contents of the switch connection tables stored in the table area 78d of the RAM 78. Thereafter, control proceeds to a step S53.

It is assumed for illustrative purpose that the tape transport 20 is specified as a playback tape transport, the tape transport 21 as a recording tape transport, and the internal memory (the memory 50) as a storage medium for storing image data as a B-roll.

In the step S53, the tape transport control means 81 supplies a control signal indicative of playback through the input/output port 79 to the tape transport 20. Then, control proceeds to a step S54.

In the step s54, the key determining means 85 determines whether the stop key 25c on the control console 25 has been pressed or not. If "YES", then control jumps to a step S57, and if "NO", then control goes to a step S55.

In the step S55, the key determining means 85 determines whether the IN point specifying key 25L and the OUT point specifying key 25M on the control console 25 have been pressed or not. If "YES", then control goes to a step S56, and if "NO", then control goes back to the step S54.

In the step S56, the RAM/ROM control means 93 registers time codes read by the time code reading means 88 as time codes of B-roll IN and OUT points into the editing table stored in the table area 78d of the RAM 78 when the IN point specifying key 25L and the OUT point specifying key 25M are pressed by the operator. Then, control proceeds to the step S57.

In the step S57, the tape transport control means 81 supplies a control signal indicative of a playback stop through the input/output port 79 to the tape transport 20 to enable the tape transport 20 to stop the playback operation. Then, control proceeds to a step S58.

In the step S58, the data determining means 94 refers to the editing table stored in the table area 78d of the RAM 78 to determine whether B-roll IN and OUT points have been specified or not. If "YES", then control proceeds to a step S59. If "NO", then control leaves the B-roll storing routine, and goes back to the step S2 of the main routine shown in FIG. 9.

In the step S59, the tape transport control means 81 supplies a control signal indicative of a tape rewinding through the input/output port 79 to the tape transport 20 to enable the tape transport 20 to rewind the magnetic tape. Then, control proceeds to a step S60 shown in FIG. 11.

While the tape transport 20 is rewinding the magnetic tape, the time code reading means 88 reads time code data in reproduced data from the tape transport 20. The time code data read by the time code reading means 88 are successively stored into the time code area 78b of the RAM 78 by the RAM/ROM control means 93. The calculating means 89 determines the difference between the time code data read by the time code reading means 88 and the time code data of the B-roll IN point in the editing table stored in the table area 78d of the RAM 78, and supplies the differential data to the timing determining means 91.

In the step S60, the timing determining means 91 determines whether the differential data from the calculating means 89 are representative of several seconds indicated by the time data stored in the ROM 77 or not. If "YES", then control proceeds to a step S61, and if "NO", then control goes back to the step S59 shown in FIG. 10.

In the step S61, the tape transport control means 81 supplies a control signal indicative of a rewinding stop through the input/output port 79 to the tape transport 20 to enable the tape transport 20 to stop the rewinding operation. Then, control proceeds to a step S62.

In the step S62, the tape transport control means 81 supplies a control signal indicative of a playback through the input/output port 79 to the tape transport 20 to enable the tape transport 20 to carry out playback operation. Then, control proceeds to a step S63. Data for allowing the tape transport 20 (equally the tape transport 21) to carry out playback operation again, i.e., flag data from the error corrector 44 which are indicative of whether an error can be corrected or not, are supplied through the input/output port 79 to the system controller 24. The flag data are successively stored into the flag area 78c of the RAM 78 by the memory control means 94.

In the step S63, the memory control means 86 supplies a write control signal through the input/output port 79 to the memory 50 to enable the memory 50 to store image data as a B-roll which are played back by the tape transport 20 and supplied to the memory 50 through the switch 22 and the input terminal 49. Then, control proceeds to a step S64.

In the step S64, the timing determining means 91 determines whether the differential data from the calculating means 89 are representative of several seconds indicated by the time data stored in the ROM 77 or not. If "YES", then control proceeds to a step S65.

In the step S65, the timing determining means 91 determines whether the differential data from the calculating means 89, i.e., the difference between the time code data read by the time code reading means 88 and stored in the time code area 78b of the RAM 78 and the time code data of the B-roll OUT point registered in the editing table in the table area 78d of the RAM 78, are representative of several seconds indicated by the time data stored in the ROM 77 or not, thereby determining whether the position of the magnetic tape set in the tape transport 20 has reached a position which is ahead in time by several seconds of the position where the time code data of the B-roll OUT point are recorded. If "YES", then control proceeds to a step S66, and if "NO", then control goes to a step S68.

In the step S66, the tape transport control means 81 supplies a control signal indicative of a playback stop through the input/output port 79 to the tape transport 20 to enable the tape transport 20 to stop the playback operation. Then, control goes back to the step S58 shown in FIG. 10.

In a next step S67, the memory control means 86 supplies a write control signal through the input/output port 79 to the memory 50 to enable the memory 50 to stop storing the image data as a B-roll which are played back by the tape transport 20 and supplied to the memory 50 through the switch 22 and the input terminal 49.

At this time, the calculating means 89 calculates the address of an OUT point in the memory 50, i.e., memory OUT point address data, and also calculates final address data of the image data as a B-roll in the memory 50, i.e., memory readout end point address data. The RAM/ROM control means 93 registers the memory OUT point address data and the memory readout end point address data, which have been calculated by the calculating means 89, into the editing table stored in the table area 78d of the RAM 78. Then, control goes back to the step S58 shown in FIG. 10.

If the timing determining means 91 determines that several seconds have not elapsed from the B-roll OUT point in the step S65, then control goes to the step S68. In the step S68, the re-try determining means 92 reads the flag data stored in the flag area 78c of the RAM 78, and determines whether the flag data have a value of "1" or not. If "YES", then control proceeds to a step S69, and if "NO", then control returns to the step S65. The flag data "1" represent that an error cannot be corrected, i.e., the re-try playback mode is to be executed.

In the step S69, the tape transport control means 81 supplies a control signal indicative of a playback stop through the input/output port 79 to the tape transport 20 to enable the tape transport 20 to stop the playback operation. Then, control goes back to the step S59 shown in FIG. 10.

I: A/B-roll editing routine (see FIGS. 12~14):
<Operation sequence of an A/B-roll editing routine>

Figure 12:
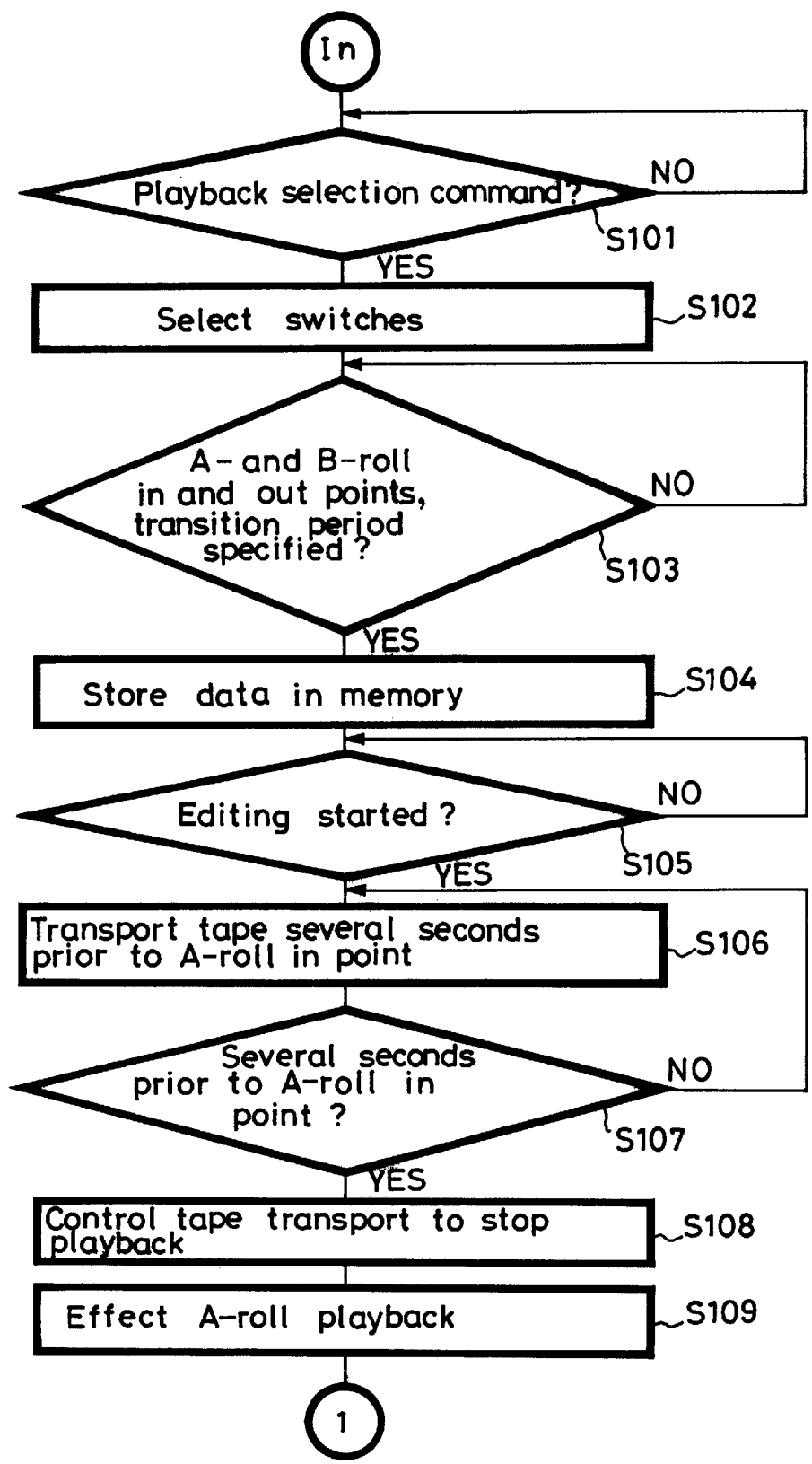
FIG. 12 is a flowchart of an A/B-roll editing routine in the main routine shown in FIG. 9.
Figure 13:
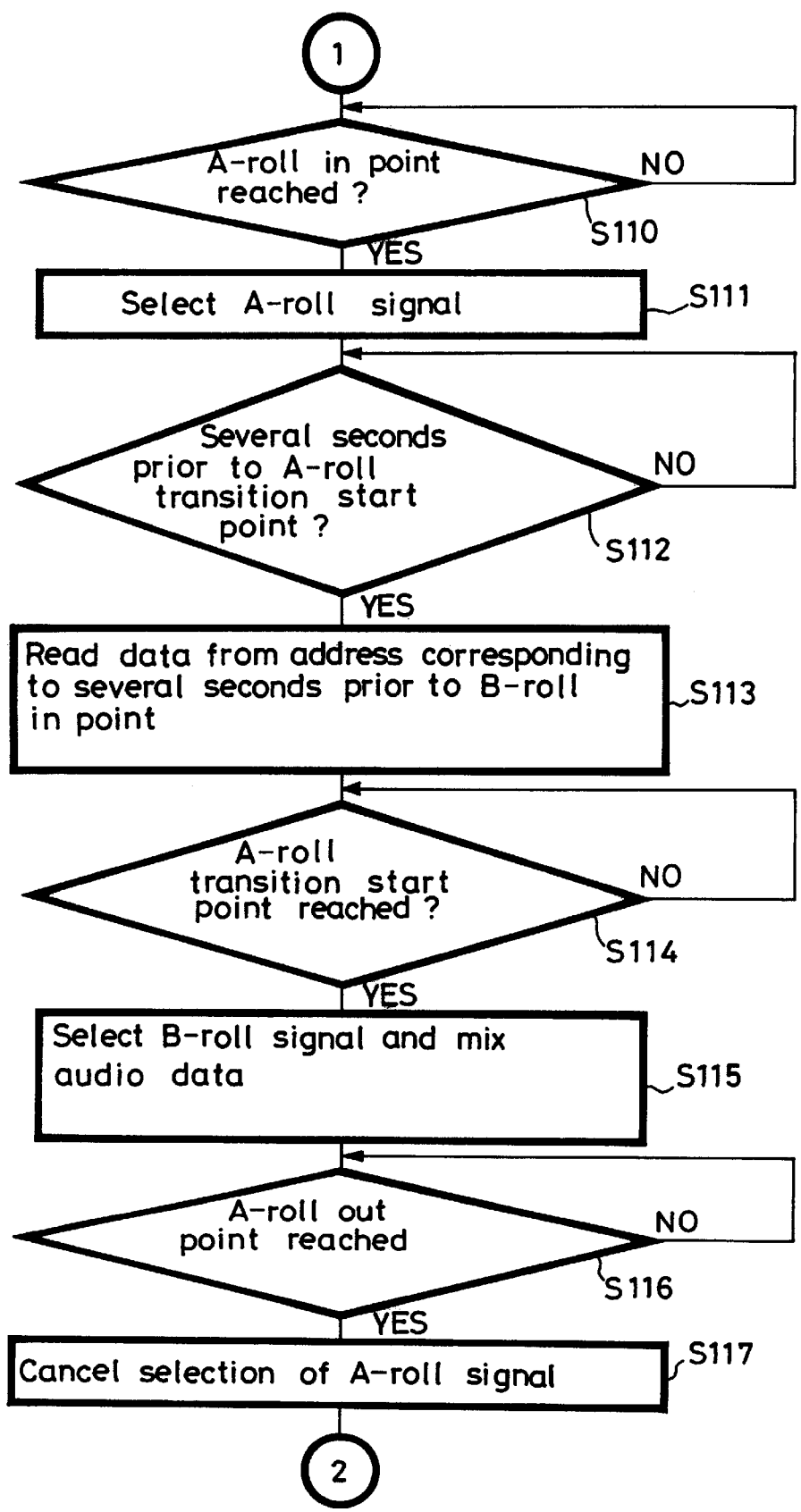
FIG. 13 is a flowchart of the A/B-roll editing routine in the main routine shown in FIG. 9.
Figure 14:
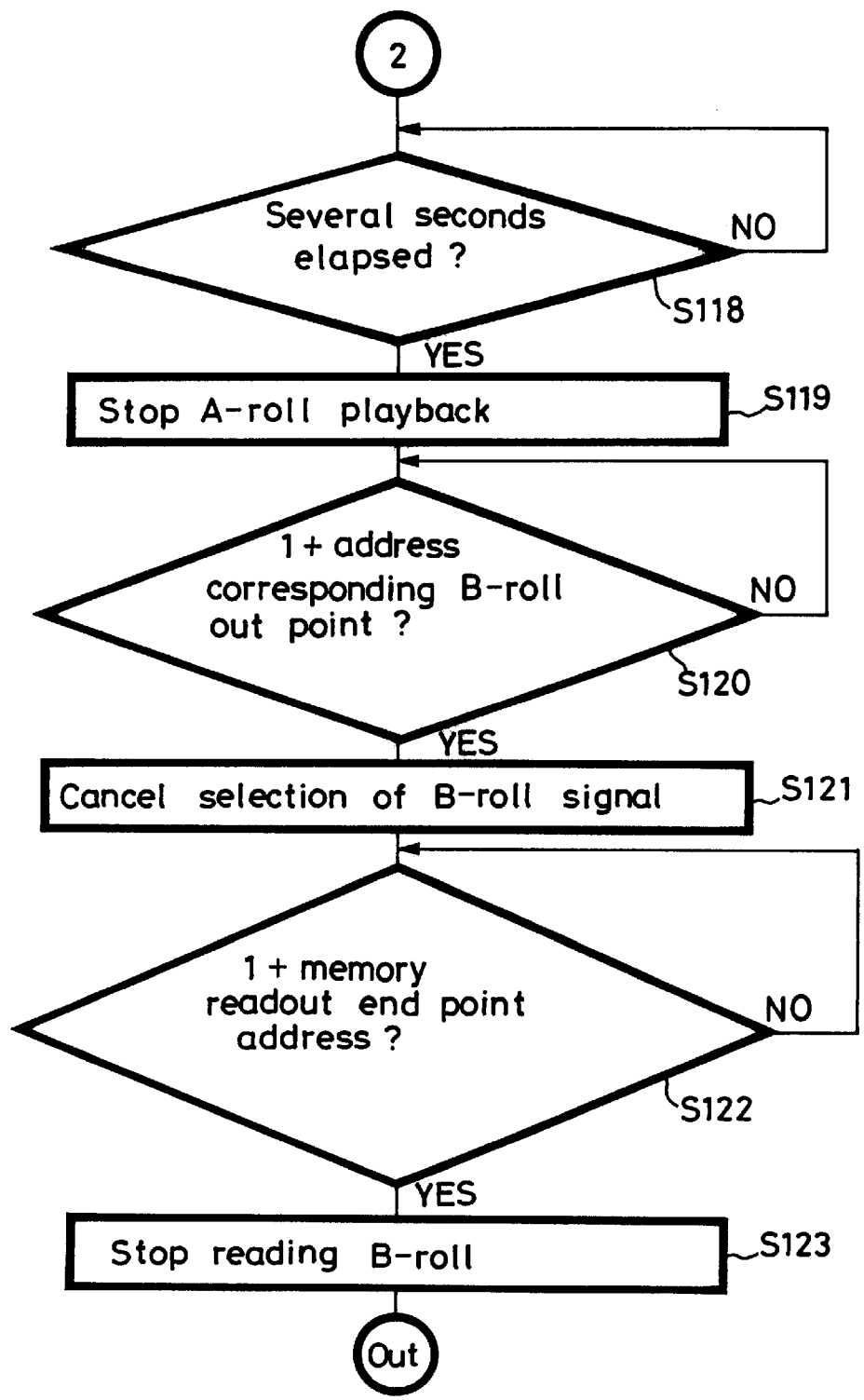
FIG. 14 is a flowchart of the A/B-roll editing routine in the main routine shown in FIG. 9.

FIGS. 12 through 14 show details of the step S100 shown in FIG. 9, i.e., the content of an A/B-roll editing routine.

In a step S101 shown in FIG. 12, the key determining means 85 determines which of the tape transports 20, 21 is to be used as a playback tape transport based on positional information produced at the time the return key 25N is pressed, and sets one of the tape transports 20, 21 as a playback tape transport and the other, not selected by the operator, as a recording tape transport, based on the result of determination. Then, control proceeds to a step S102.

The determined data are stored as data of the switch connection tables shown in FIGS. 5A and 5B in the table area 78d of the RAM 78 by the RAM/ROM control means 93. The data are selected when the cursor key 25b is pressed, and determined when the return key 25N is pressed. One example of a menu displayed when the above data are to be selected and determined is given as follows:

<SELECTION OF TAPE TRANSPORT>
1. TAPE TRANSPORT A
2. TAPE TRANSPORT B
* PRESS RETURN KEY AFTER HAVING SELECTED WITH CURSOR KEY.

TAPE TRANSPORT SELECTED BY KEY WILL BE PLAYBACK TAPE TRANSPORT AND TAPE TRANSPORT NOT SELECTED WILL BE RECORDING TAPE TRANSPORT.

In the step S102, the switch control means 87 supplies switching control signals to the switches 22, 23 through the input/output port 79 to control connections of the switches 22, 23 based on the contents of the switch connection tables stored in the table area 78d of the RAM 78. Thereafter, control proceeds to a step S103.

In this embodiment, the memory 50 has been selected in the step S51 for the B-roll storing routine, and it has been assumed for illustrative purpose that the tape transport 20 is specified as a playback tape transport, the tape transport 21 as a recording tape transport. Therefore, the switches 22, 23 shown in FIG. 3 and the switches 45, 51, 55, 59 shown in FIG. 4 are connected as shown in FIG. 5B such that the tape transport 20 is selected as a playback tape transport, the tape transport 21 as a recording tape transport, and the memory 50 is selected.

In the step S103, an input mode for generating an editing table is carried out. During this input mode, the key determining means 85 determines whether the return key 25N and the cursor key 25b on the control console 25 have been pressed or not, and the data determining means 94 refers to the editing table stored in the table area 78d of the RAM 78 to determine whether all the IN and OUT points of A- and B-rolls and a transition period have been specified or not. If "YES", then control proceeds to a step S104.

If the A/B-roll editing routine follows the B-roll storing routine, then the time code data of B-roll IN and OUT points, the memory readout start point address data, the memory OUT point address data, and the memory readout end point address data have already been registered in the editing table stored in the table area 78d of the RAM 78. Therefore, unless the operator intentionally modifies the time code data of B-roll IN and OUT points, the memory readout start point address data, and the memory readout end point address data, the data stored in the B-roll storing routine are effective. The memory readout start point address and the memory readout end point address of the image data as a B-roll stored in the memory 50 can be changed in the step S103.

An example displayed on the display 25a for entering the above data, and a process of entering the data on the displayed image will briefly be described below. A menu is displayed as follows (numerical values are given by way of example only):

| A/B-ROLL EDITING | |
|---|---|
| [A-ROLL IN POINT] | --h--m--s--f |
| [A-ROLL OUT POINT] | --h--m--s--f |
| [B-ROLL IN POINT] | 01h01m01s01f |
| [B-ROLL OUT POINT] | 01h02m01s01f |
| [A-ROLL TRANSITION START POINT] | --h--m--s--f |
| [B-ROLL TRANSITION END POINT] | --h--m--s--f |
| [MEMORY READOUT START POINT ADDRESS] | 000000000000 |
| [MEMORY OUT POINT ADDRESS] | 000000001111 |
| [MEMORY READOUT END POINT ADDRESS] | 000000009999 |

* AFTER HAVING SELECTED WITH CURSOR KEY, PRESS RETURN KEY TO SELECT A PARAMETER TO BE SET, AND AFTER HAVING CHANGED THE PARAMETER WITH CURSOR KEY, PRESS RETURN KEY.

For example, when the operator presses the return key 25N after having brought the cursor into the position of the A-roll IN point with the cursor key 25b, a mode is established for setting any of the parameters (h, m, s, f) for the "A-ROLL IN POINT". After operating the cursor key 25b to move the cursor to the data to be entered or modified, the operator continuously presses the cursor key 25b to automatically increment or decrement the value of the data in the position of the cursor. For selecting a parameter, UP and DOWN cursor keys, and LEFT and RIGHT cursor keys are used. For incrementing the value of a parameter, the UP cursor key is used, and for decrementing the value of a parameter, the DOWN cursor key is used.

When a parameter value desired by the operator is reached, the operator releases the cursor key 25b, and then presses the return key 25N, thereby securing the parameter value. The above operator-depending process is carried out by the RAM/ROM control means 93, the data determining means 94, the key determining means 85, and the display control means 80. The mark "-" in the above menu represents that no data are registered in the editing table stored in the table area 78d of the RAM 78.

In the step S104, the RAM/ROM control means 93 registers various data set in the step S103 into corresponding locations in the storage space of the editing table stored in the table area 78d of the RAM 78. Thereafter, control goes to a step S105.

In the step S105, the key determining means 85 determines whether the return key 25N on the control console 25 has been pressed or not. If "YES", then control proceeds to a step S106.

In the step S106, the tape transport control means 81 supplies a control signal indicative of a tape rewinding through the input/output port 79 to the tape transport 20 to enable the tape transport 20 to rewind the magnetic tape. Then, control proceeds to a step S107.

While the tape transport 20 is rewinding the magnetic tape, the time code reading means 88 reads time code data in reproduced data from the tape transport 20. The time code data read by the time code reading means 88 are successively stored into the time code area 78b of the RAM 78 by the RAM/ROM control means 93. The calculating means 89 determines the difference between the time code data read by the time code reading means 88 and the time code data of the A-roll IN point in the editing table stored in the table area 78*d* of the RAM 78, and supplies the differential data to the timing determining means 91.

In the step S107, the timing determining means 91 determines whether the differential data from the calculating means 89 are representative of several seconds indicated by the time data stored in the ROM 77 or not. If "YES", then control proceeds to a step S108, and if "NO", then control goes back to the step S106.

In the step S108, the tape transport control means 81 supplies a control signal indicative of a playback stop through the input/output port 79 to the tape transport 20 to enable the tape transport 20 to stop the playback operation. Then, control proceeds to a step S109.

In the step S109, the tape transport control means 81 supplies a control signal indicative of a playback start through the input/output port 79 to the tape transport 20 to enable the tape transport 20 to start playback operation. Then, control proceeds to a step S110 shown in FIG. 13.

While the tape transport 20 is in the playback operation, the time code reading means 88 reads time code data in reproduced data from the tape transport 20. The time code data read by the time code reading means 88 are successively stored into the time code area 78*b* of the RAM 78 by the RAM/ROM control means 93. The calculating means 89 determines the difference between the time code data read by the time code reading means 88 and the time code data of the A-roll IN point in the editing table stored in the table area 78*d* of the RAM 78, and supplies the differential data to the timing determining means 91.

In the step S110, the timing determining means 91 determines whether the differential data from the calculating means 89 indicate "0" or not. If "YES", then control proceeds to a step S111.

In the step S111, the video special effect control means 83 supplies a control signal indicative of the selection of video data as an A-roll to the video special effect switcher 27 to enable the video special effect switcher 27 to select the video data as an A-roll. The mixer control means 84 supplies a control signal indicative of the selection of audio data as an A-roll to the audio mixer 29 to enable the audio mixer 29 to select the audio data as an A-roll. Then, control proceeds to a step S112.

The video special effect switcher 27 selects a data route to supply the video data as an A-roll from the tape transport 20 through the switch 22, the playback signal processor 26, the video special effect switcher 27, and the D/A converter 31 to the television monitor 32. The video data as an A-roll are also supplied through the switch 22, the playback signal processor 26, the video special effect switcher 27, the recording signal processor 35, and the switch 23 to the tape transport 21, which records the supplied video data in oblique tracks on the magnetic tape in the video tape cassette set in the tape transport 21.

Similarly, the audio mixer 29 supplies audio data as an A-roll from the tape transport 20 through the switch 22, the playback signal processor 26, the audio mixer 29, the D/A converter 33, and the amplifier 34 to the loudspeakers 24L, 34R. The audio data as an A-roll are also supplied through the switch 22, the playback signal processor 26, the audio mixer 29, the recording signal processor 35, and the switch 23 to the tape transport 21, which records the supplied video data in oblique tracks (or longitudinal tracks) on the magnetic tape in the video tape cassette set in the tape transport 21.

While the tape transport 20 is in the playback operation, the time code reading means 88 reads time code data in reproduced data from the tape transport 20. The time code data read by the time code reading means 88 are successively stored into the time code area 78*b* of the RAM 78 by the RAM/ROM control means 93. The calculating means 89 determines the difference between the time code data read by the time code reading means 88 and the time code data of the A-roll transition start point in the editing table stored in the table area 78*d* of the RAM 78, and supplies the differential data to the timing determining means 91.

In the step S112, the timing control means 91 determines whether the differential data from the calculating means 89 are representative of several seconds indicated by the time data stored in the ROM 77 or not. If "YES", then control proceeds to a step S113.

In the step S113, the memory control means 86 refers to the memory readout start point address data registered in the editing table stored in the table area 78*d* of the RAM 78, and supplies a read control signal through the input/output port 79 to the memory 50 based on the address data referred to for thereby reading image data as a B-roll including marginal data from the memory 50. Then, control goes to a step S114.

While the tape transport 20 is in the playback operation, the time code reading means 88 reads time code data in reproduced data from the tape transport 20. The time code data read by the time code reading means 88 are successively stored into the time code area 78*b* of the RAM 78 by the RAM/ROM control means 93. The calculating means 89 determines the difference between the time code data read by the time code reading means 88 and the time code data of the A-roll transition start point in the editing table stored in the table area 78*d* of the RAM 78, and supplies the differential data to the timing determining means 91.

In the step S114, the timing determining means 91 determines whether the differential data from the calculating means 89 indicate "0" or not. If "YES", then control proceeds to a step S115.

In the step S115, the video special effect control means 83 supplies a control signal indicative of the selection of video data as a B-roll through the input/output port 79 to the video special effect switcher 27 to enable the video special effect switcher 27 to select the video data as a B-roll. The mixer control means 84 supplies a control signal indicative of the selection of audio data as a B-roll through the input/output port 79 to the audio mixer 29 to enable the audio mixer 29 to select the audio data as a B-roll. Then, control proceeds to a step S116.

According to the selection and special effect control of the video special effect switcher 27, the video data as an A-roll and the video data as a B-roll which are outputted from the tape transport 20 are processed for a special effect such as of dissolve, wipe, fade-in/fade-out, or the like by the video special effect switcher 27, and then supplied through the D/A converter 31 to the television monitor 32. At the same time, the video data are supplied through the recording signal processor 35 and the switch 23 to the tape transport 21, which records the supplied video data in oblique tracks on the magnetic tape in the video tape cassette set in the tape transport 21.

According to the selection and mixing control of the audio mixer 29, the audio data as an A-roll and the audio data as a B-roll which are outputted from the tape transport 20 are mixed by the audio mixer 29, and then supplied through the D/A converter 33 and the amplifier 34 to the loudspeakers 34L, 34R. At the same time, the audio data are supplied through the recording signal processor 35 and the switch 23 to the tape transport 21, which records the supplied audio data in oblique tracks (or longitudinal tracks) on the magnetic tape in the video tape cassette set in the tape transport 21.

While the above process is being carried out, the time code reading means 88 reads time code data in reproduced data from the tape transport 20. The time code data read by the time code reading means 88 are successively stored into the time code area 78b of the RAM 78 by the RAM/ROM control means 93. The calculating means 89 determines the difference between the time code data read by the time code reading means 88 and the time code data of the A-roll OUT point in the editing table stored in the table area 78d of the RAM 78, and supplies the differential data to the timing determining means 91.

In the step S116, the timing determining means 91 determines whether the differential data from the calculating means 89, i.e., the difference between time code data read by the time code reading means 88 and the time code data of the A-roll OUT point in the editing table stored in the table area 78d of the RAM 78, is representative of "0" or not. If "YES", then control proceeds to a step S117.

In the step S117, the video special effect control means 83 supplies a control signal indicative of the cancel of the selection of video data as an A-roll through the input/output port 79 to the video special effect switcher 27 to enable the video special effect switcher 27 to cancel the selection of the video data as an A-roll. The mixer control means 84 supplies a control signal indicative of the cancel of the selection of audio data as an A-roll through the input/output port 79 to the audio mixer 29 to enable the audio mixer 29 to cancel the selection of the audio data as an A-roll. Then, control proceeds to a step S118 shown in FIG. 14.

In the step S118, the timing determining means 91 determines whether the differential data from the calculating means 89, i.e., the difference between time code data read by the time code reading means 88 and the time code data of the A-roll OUT point in the editing table stored in the table area 78d of the RAM 78, is representative of several seconds indicated by the time data stored in the ROM 77 or not. If "YES", then control proceeds to a step S119.

In the step S119, the tape transport control means 81 supplies a control signal indicative of a playback stop through the input/output port 79 to the tape transport 20 to enable the tape transport 20 to stop the playback operation. Then, control proceeds to a step S120.

In the step S120, the timing determining means 91 determines whether an address value indicated by a read control signal outputted from the memory control means 86 through the input/output port 79 is one address greater than a value indicated by the memory OUT point address data in the editing table stored in the table area 78d of the RAM 78 or not. If "YES", then control proceeds to a step S121. The requirement of one address greater than a value indicated by the memory OUT point address data is imposed because up to image data at the memory OUT point address are to be processed.

In the step S121, the video special effect control means 83 supplies a control signal indicative of the cancel of the selection of a B-roll through the input/output port 79 to the video special effect switcher 27 to enable the video special effect switcher 27 to cancel the selection of the video data as a B-roll. Then, control goes to a step S122.

In the step 122, the timing determining means 91 determines whether an address value indicated by a read control signal outputted from the memory control means 86 through the input/output port 79 is one address greater than an address value indicated by the time code data of the memory readout end point in the editing table stored in the table area 78d of the RAM 78 or not. If "YES", then control proceeds to a step S123.

In the step S123, the memory control means 86 supplies a control signal indicative of stopping reading of stored data through the input/output port 79 to the memory 50 to enable the memory 50 to stop outputting stored data as a B-roll. Control then leaves the A/B-roll editing routine, and goes back to the step S2 of the main routine shown in FIG. 9.

J: Cut editing routine (see FIGS. 15–17):
<Operation sequence of a cut editing routine>

Figure 15:
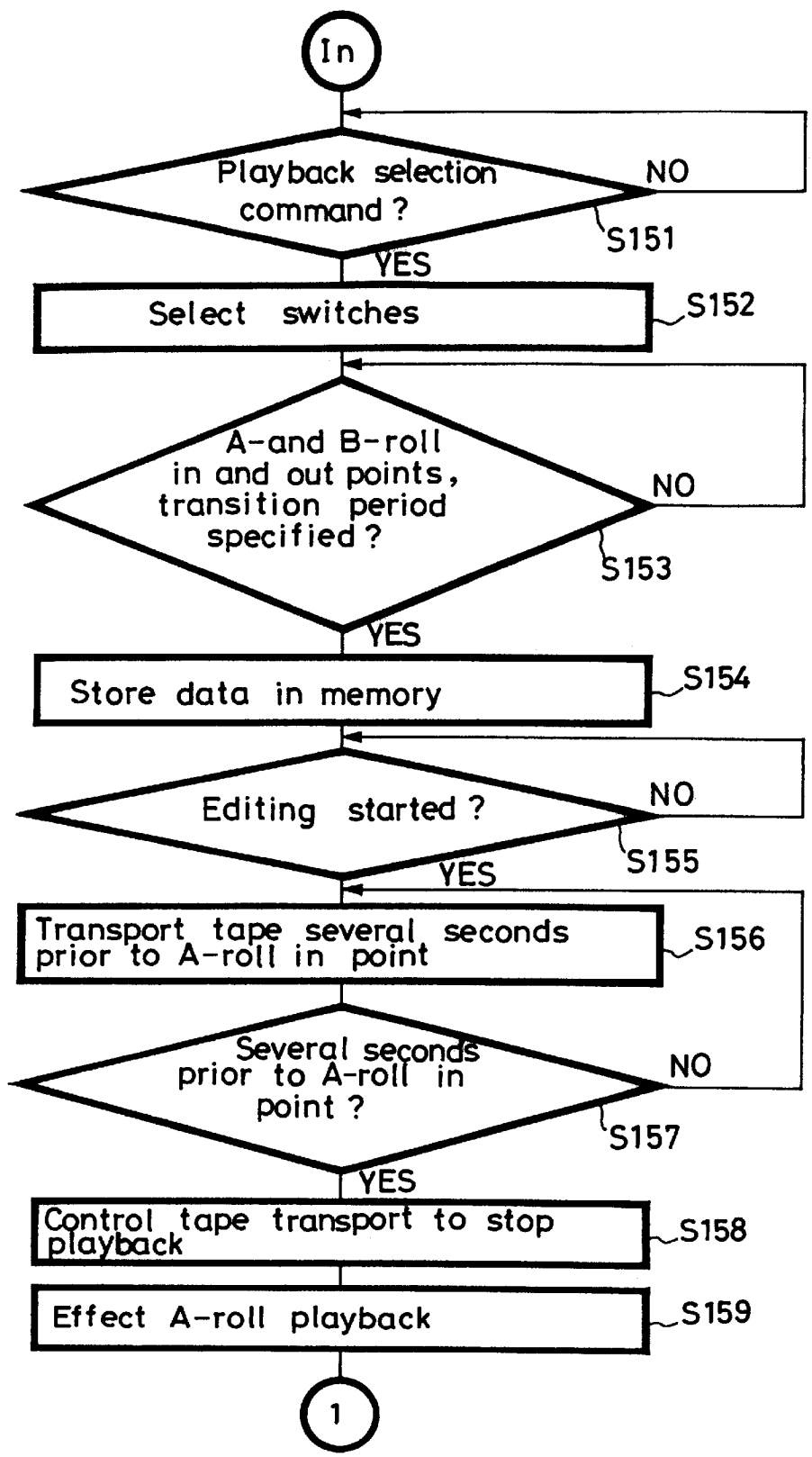
FIG. 15 is a flowchart of a cut editing routine in the main routine shown in FIG. 9.
Figure 16:
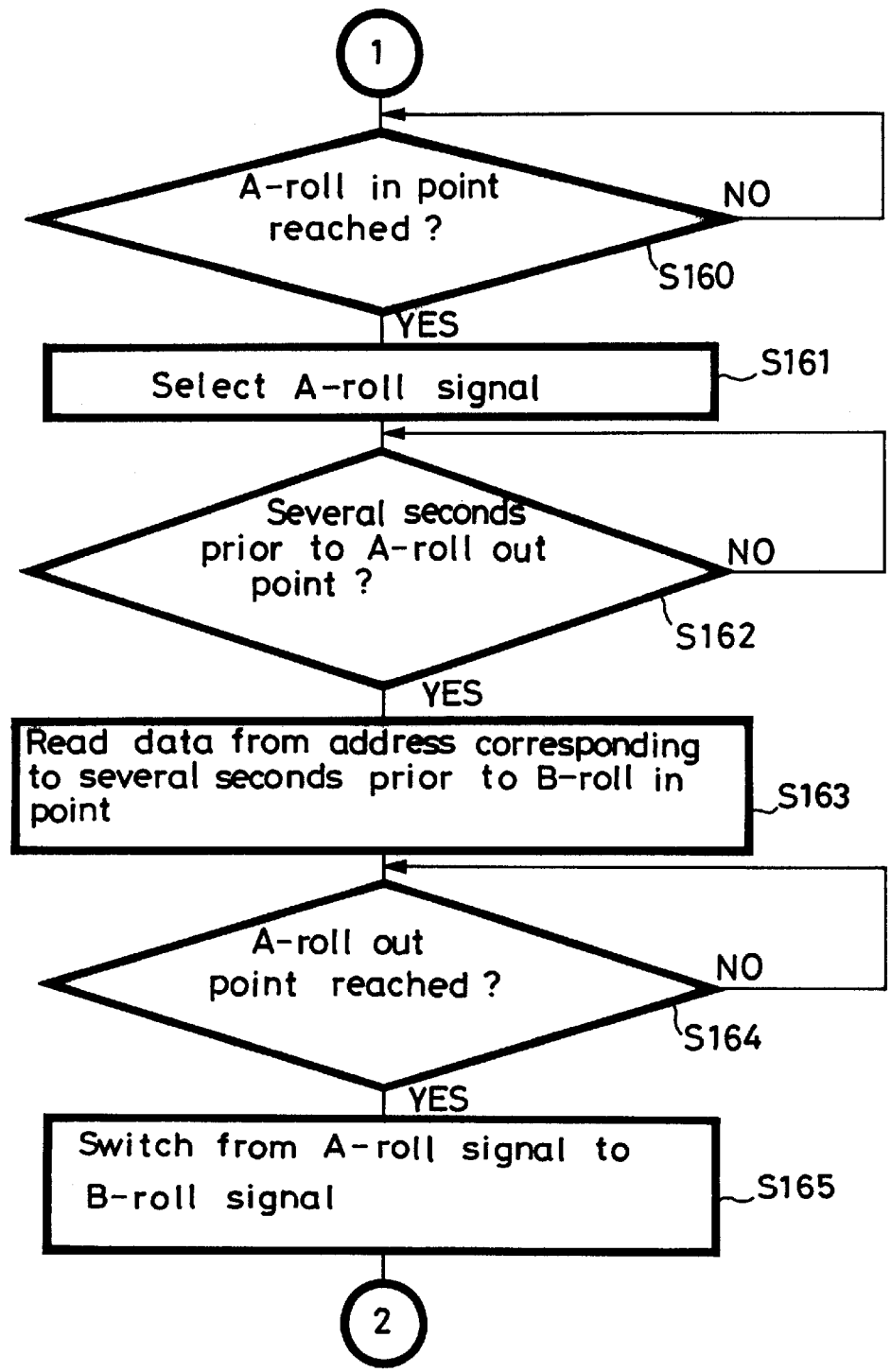
FIG. 16 is a flowchart of the cut editing routine in the main routine shown in FIG. 9.
Figure 17:
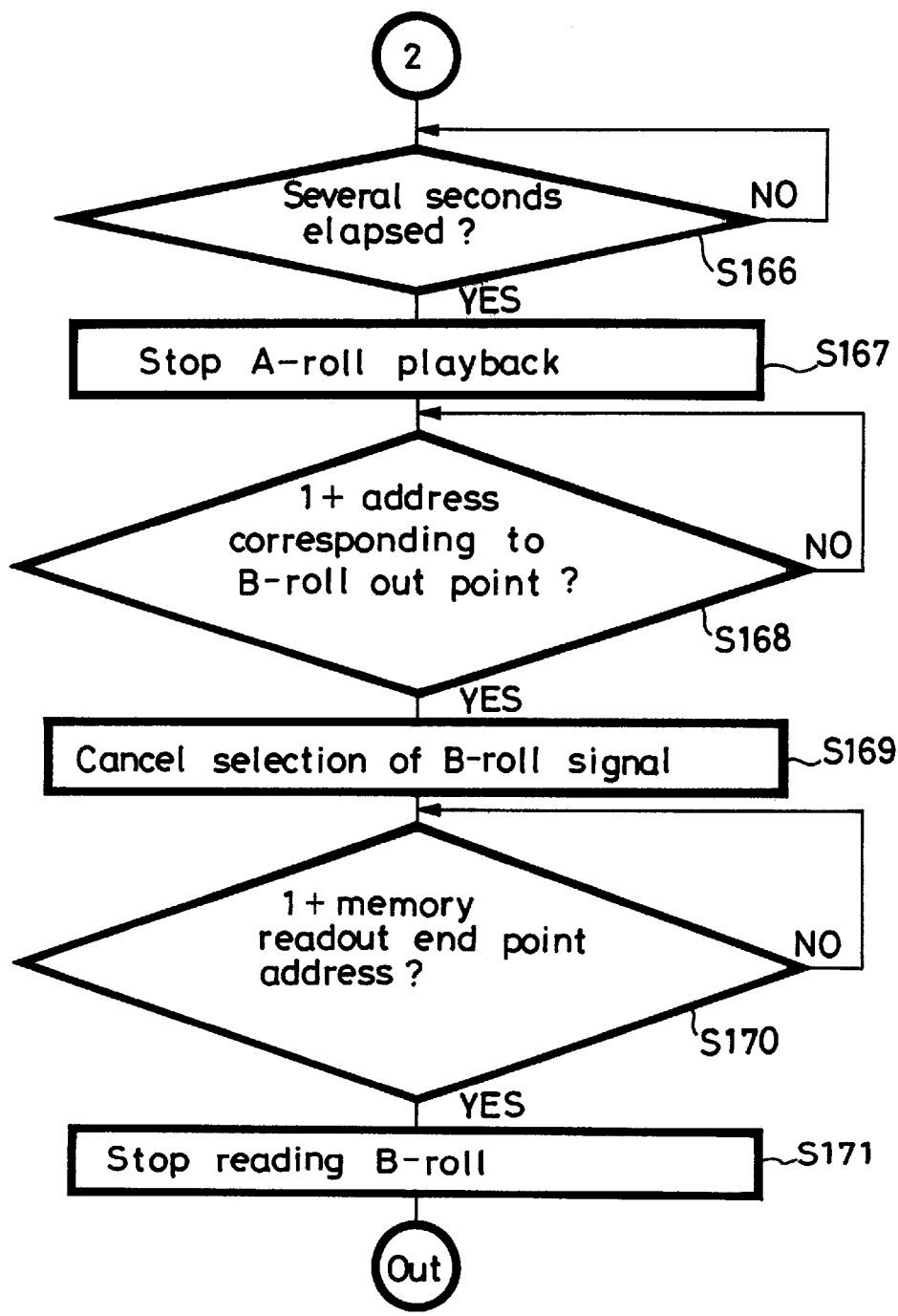
FIG. 17 is a flowchart of the cut editing routine in the main routine shown in FIG. 9.

FIGS. 15 through 17 show details of the step S150 shown in FIG. 9, i.e., the content of a cut editing routine.

In a step S151 shown in FIG. 15, the key determining means 85 determines which of the tape transports 20, 21 is to be used as a playback tape transport based on positional information produced at the time the return key 25N is pressed, and sets one of the tape transports 20, 21 as a playback tape transport and the other, not selected by the operator, as a recording tape transport, based on the result of determination. Then, control proceeds to a step S152.

The determined data are stored as data of the switch connection tables shown in FIGS. 5A and 5B in the table area 78d of the RAM 78 by the RAM/ROM control means 93. The data are selected when the cursor key 25b is pressed, and determined when the return key 25N is pressed. One example of a menu displayed when the above data are to be selected and determined is given as follows:

<SELECTION OF TAPE TRANSPORT>
1. TAPE TRANSPORT A
2. TAPE TRANSPORT B
* PRESS RETURN KEY AFTER HAVING SELECTED WITH CURSOR KEY.

TAPE TRANSPORT SELECTED BY KEY WILL BE PLAYBACK TAPE TRANSPORT AND TAPE TRANSPORT NOT SELECTED WILL BE RECORDING TAPE TRANSPORT.

In the step S152, the switch control means 87 supplies switching control signals to the switches 22, 23 through the input/output port 79 to control connections of the switches 22, 23 based on the contents of the switch connection tables stored in the table area 78d of the RAM 78. Thereafter, control proceeds to a step S153.

In this embodiment, the memory 50 has been selected in the step S51 for the B-roll storing routine, and it has been assumed for illustrative purpose that the tape transport 20 is specified as a playback tape transport, the tape transport 21 as a recording tape transport. Therefore, the switches 22, 23 shown in FIG. 3 and the switches 45, 51, 55, 59 shown in FIG. 4 are connected as shown in FIG. 5B such that the tape transport 20 is selected as a playback tape transport, the tape transport 21 as a recording tape transport, and the memory 50 is selected.

In the step S153, an input mode for generating an editing table is carried out. During this input mode, the key determining means 85 determines whether the return key 25N and the cursor key 25b on the control console 25 have been pressed or not, and the data determining means 94 refers to the editing table stored in the table area 78d of the RAM 78 to determine whether all the IN and OUT points of A- and B-rolls have been specified or not. If "YES", then control proceeds to a step S154.

If the cut editing routine follows the B-roll storing routine, then the time code data of B-roll IN and OUT points, the memory readout start point address data, the memory OUT point address data, and the memory readout end point address data have already been registered in the editing table stored in the table area 78d of the RAM 78. Therefore, unless the operator intentionally modifies the time code data of B-roll IN and OUT points, the memory readout start point address data, and the memory readout end point address data, the data stored in the B-roll storing routine are effective. The memory readout start point address and the memory readout end point address of the image data as a B-roll stored in the memory 50 can be changed in the step S153. A menu is displayed as follows (numerical values are given by way of example only):

| CUT EDITING | |
| --- | --- |
| [A-ROLL IN POINT] | --h--m--s--f |
| [A-ROLL OUT POINT] | --h--m--s--f |
| [B-ROLL IN POINT] | 01h01m01s01f |
| [B-ROLL OUT POINT] | 01h02m01s01f |
| [MEMORY READOUT START POINT ADDRESS] | 000000000000 |
| [MEMORY READOUT END POINT ADDRESS] | 000000009999 |

\* AFTER HAVING SELECTED WITH CURSOR KEY, PRESS RETURN KEY TO SELECT A PARAMETER TO BE SET, AND AFTER HAVING CHANGED THE PARAMETER WITH CURSOR KEY, PRESS RETURN KEY.

Since the above data can be set in the same manner as in the A/B-roll editing mode, a detailed process of setting those data will not be described below.

In the step S154, the RAM/ROM control means 93 registers various data set in the step S153 into corresponding locations in the storage space of the editing table stored in the table area 78d of the RAM 78. Thereafter, control goes to a step S155.

In the step S155, the key determining means 85 determines whether the return key 25N on the control console 25 has been pressed or not. If "YES", then control proceeds to a step S156.

In the step S156, the tape transport control means 81 supplies a control signal indicative of a tape rewinding through the input/output port 79 to the tape transport 20 to enable the tape transport 20 to rewind the magnetic tape. Then, control proceeds to a step S157.

While the tape transport 20 is rewinding the magnetic tape, the time code reading means 88 reads time code data in reproduced data from the tape transport 20. The time code data read by the time code reading means 88 are successively stored into the time code area 78b of the RAM 78 by the RAM/ROM control means 93. The calculating means 89 determines the difference between the time code data read by the time code reading means 88 and the time code data of the A-roll IN point in the editing table stored in the table area 78d of the RAM 78, and supplies the differential data to the timing determining means 91.

In the step S157, the timing determining means 91 determines whether the differential data from the calculating means 89 are representative of several seconds indicated by the time data stored in the ROM 77 or not. If "YES", then control proceeds to a step S158, and if "NO", then control goes back to the step S156.

In the step S158, the tape transport control means 81 supplies a control signal indicative of a playback stop through the input/output port 79 to the tape transport 20 to enable the tape transport 20 to stop the playback operation. Then, control proceeds to a step S159.

In the step S159, the tape transport control means 81 supplies a control signal indicative of a playback start through the input/output port 79 to the tape transport 20 to enable the tape transport 20 to start playback operation. Then, control proceeds to a step S160 shown in FIG. 16.

While the tape transport 20 is in the playback operation, the time code reading means 88 reads time code data in reproduced data from the tape transport 20. The time code data read by the time code reading means 88 are successively stored into the time code area 78b of the RAM 78 by the RAM/ROM control means 93. The calculating means 89 determines the difference between the time code data read by the time code reading means 88 and the time code data of the A-roll IN point in the editing table stored in the table area 78d of the RAM 78, and supplies the differential data to the timing determining means 91.

In the step S160, the timing determining means 91 determines whether the differential data from the calculating means 89 indicate "0" or not. If "YES", then control proceeds to a step S161.

In the step S161, the video special effect control means 83 supplies a control signal indicative of the selection of video data as an A-roll to the video special effect switcher 27 to enable the video special effect switcher 27 to select the video data as an A-roll. The mixer control means 84 supplies a control signal indicative of the selection of audio data as an A-roll to the audio mixer 29 to enable the audio mixer 29 to select the audio data as an A-roll. Then, control proceeds to a step S162.

The video special effect switcher 27 selects a data route to supply the video data as an A-roll from the tape transport 20 through the switch 22, the playback signal processor 26, the video special effect switcher 27, and the D/A converter 31 to the television monitor 32. The video data as an A-roll are also supplied through the switch 22, the playback signal processor 26, the video special effect switcher 27, the recording signal processor 35, and the switch 23 to the tape transport 21, which records the supplied video data in oblique tracks on the magnetic tape in the video tape cassette set in the tape transport 21.

Similarly, the audio mixer 29 supplies audio data as an A-roll from the tape transport 20 through the switch 22, the playback signal processor 26, the audio mixer 29, the D/A converter 33, and the amplifier 34 to the loudspeakers 24L, 34R. The audio data as an A-roll are also supplied through the switch 22, the playback signal processor 26, the audio mixer 29, the recording signal processor 35, and the switch 23 to the tape transport 21, which records the supplied video data in oblique tracks (or longitudinal tracks) on the magnetic tape in the video tape cassette set in the tape transport 21.

While the tape transport 20 is in the playback operation, the time code reading means 88 reads time code data in reproduced data from the tape transport 20. The time code data read by the time code reading means 88 are successively stored into the time code area 78b of the RAM 78 by the RAM/ROM control means 93. The calculating means 89 determines the difference between the time code data read by the time code reading means 88 and the time code data of the A-roll OUT point in the editing table stored in the table area 78d of the RAM 78, and supplies the differential data to the timing determining means 91.

In the step S162, the timing control means 91 determines whether the differential data from the calculating means 89 are representative of several seconds indicated by the time data stored in the ROM 77 or not. If "YES", then control proceeds to a step S163.

In the step S163, the memory control means 86 refers to the memory readout start point address data registered in the editing table stored in the table area 78d of the RAM 78, and supplies a read control signal through the input/output port 79 to the memory 50 based on the address data referred to for thereby reading image data as a B-roll including marginal data from the memory 50. Then, control goes to a step S164.

While the tape transport 20 is in the playback operation, the time code reading means 88 reads time code data in reproduced data from the tape transport 20. The time code data read by the time code reading means 88 are successively stored into the time code area 78b of the RAM 78 by the RAM/ROM control means 93. The calculating means 89 determines the difference between the time code data read by the time code reading means 88 and the time code data of the A-roll OUT point in the editing table stored in the table area 78d of the RAM 78, and supplies the differential data to the timing determining means 91.

In the step S164, the timing determining means 91 determines whether the differential data from the calculating means 89 indicate "0" or not. If "YES", then control proceeds to a step S165.

In the step S165, the video special effect control means 83 supplies a control signal indicative of the selection of video data as a B-roll through the input/output port 79 to the video special effect switcher 27 to enable the video special effect switcher 27 to select the video data as a B-roll. The mixer control means 84 supplies a control signal indicative of the selection of audio data as a B-roll through the input/output port 79 to the audio mixer 29 to enable the audio mixer 29 to select the audio data as a B-roll. Then, control proceeds to a step S166.

According to the selection control of the video special effect switcher 27, the data outputted from the video special effect switcher 27 changes from the video data as an A-roll to the video data as a B-roll. The video data as a B-roll are supplied through the D/A converter 31 to the television monitor 32. At the same time, the video data are supplied through the recording signal processor 35 and the switch 23 to the tape transport 21, which records the supplied video data in oblique tracks on the magnetic tape in the video tape cassette set in the tape transport 21.

According to the selection and mixing control of the audio mixer 29, the audio data as an A-roll and the audio data as a B-roll which are outputted from the tape transport 20 are mixed by the audio mixer 29, and then supplied through the D/A converter 33 and the amplifier 34 to the loudspeakers 34L, 34R. At the same time, the audio data are supplied through the recording signal processor 35 and the switch 23 to the tape transport 21, which records the supplied audio data in oblique tracks (or longitudinal tracks) on the magnetic tape in the video tape cassette set in the tape transport 21.

While the above process is being carried out, the time code reading means 88 reads time code data in reproduced data from the tape transport 20. The time code data read by the time code reading means 88 are successively stored into the time code area 78b of the RAM 78 by the RAM/ROM control means 93. The calculating means 89 determines the difference between the time code data read by the time code reading means 88 and the time code data of the A-roll OUT point in the editing table stored in the table area 78d of the RAM 78, and supplies the differential data to the timing determining means 91.

In the step S166, the timing determining means 91 determines whether the differential data from the calculating means 89, i.e., the difference between time code data read by the time code reading means 88 and the time code data of the A-roll OUT point in the editing table stored in the table area 78d of the RAM 78, is representative of several seconds indicated by the time data stored in the ROM 77 or not. If "YES", then control proceeds to a step S167.

In the step S167, the tape transport control means 81 supplies a control signal indicative of a playback stop through the input/output port 79 to the tape transport 20 to enable the tape transport 20 to stop the playback operation. Then, control proceeds to a step S168.

In the step S168, the timing determining means 91 determines whether an address value indicated by a read control signal outputted from the memory control means 86 through the input/output port 79 is one address greater than a value indicated by the memory OUT point address data in the editing table stored in the table area 78d of the RAM 78 or not. If "YES", then control proceeds to a step S169. The requirement of one address greater than a value indicated by the memory OUT point address data is imposed because up to image data at the memory OUT point address are to be processed.

In the step S169, the video special effect control means 83 supplies a control signal indicative of the cancel of the selection of a B-roll through the input/output port 79 to the video special effect switcher 27 to enable the video special effect switcher 27 to cancel the selection of the video data as a B-roll. Then, control goes to a step S170.

In the step 170, the timing determining means 91 determines whether an address value indicated by a read control signal outputted from the memory control means 86 through the input/output port 79 is one address greater than an address value indicated by the time code data of the memory readout end point in the editing table stored in the table area 78d of the RAM 78 or not. If "YES", then control proceeds to a step S171.

In the step S171, the memory control means 86 supplies a control signal indicative of stopping reading of stored data through the input/output port 79 to the memory 50 to enable the memory 50 to stop outputting stored data as a B-roll. Control then leaves the cut editing routine, and goes back to the step S2 of the main routine shown in FIG. 9.

<Advantages offered by the first embodiment>

According to the first embodiment, as described above, each of the tape transports 20, 21 can be selected as playback or recording tape transport depending on the operation of the control console 25, and material cuts as A- and B-rolls that are recorded in a video tape cassette are established by inputting time codes or specifying start and end points upon playback with the control console 25. Thereafter, the material cut as a B-roll is played back and automatically stored in the memory 50 of the playback signal processor 26 or the IC card 36. Then, the material cut as an A-roll is played back from the video tape cassette, and the material cut as a B-roll read from the memory 50 of the playback signal processor 26 or the IC card 36 is processed by the video special effect switcher 27 and the audio mixer 29. The processed video and audio signals are outputted through the D/A converters 31, 33 and monitored, and also processed for recording by the recording signal processor 35. The processed video and audio signals are then recorded in a video tape cassette set in the tape transport 20 or 21. Therefore, it is not necessary to store the B-roll on a magnetic tape as a storage medium for A/B-roll editing or cut editing, and hence an editing process can be carried out efficiently.

Since the editing apparatus shown in FIG. 3 employs the memory 50 or the IC card 36 as a saving memory, it is possible to construct the editing apparatus as a unitary all-in-one-type small-size editing apparatus, allowing the user to edit materials with one editing VTR.

When a material cut is to be stored into the memory 50 of the playback signal processor 26 or the IC card 36, compressed data thereof are stored. Depending on the ratio of compression, the storage capacity of the memory 50 or the IC card 36 may be smaller, resulting in a reduction in the cost, than would be if the material cut were not compressed.

If there are data that cannot be error-corrected by the error corrector 44 of the playback signal processor 26, then the system controller 24 controls the tape transport 20 or 21 to play back again data that are to be stored in the memory 50 or the IC card 36. Therefore, the user can reliably use a material cut which the user wants to use, and can thus effect an editing process as desired.

As described above, a material cut is saved in the memory 50 of the playback signal processor 26 or the IC card 36. However, both of the memory 50 and the IC card 36 may be used to save material cuts. For example, a material cut as a B-roll may be stored in the memory 50 of the playback signal processor 26, a material cut as a C-roll may be stored in the IC card 37, a material cut as an A-roll may be played back from the tape transport 20 or 21, and A-, B-, and C-roll editing may be carried out using the material cut as an A-roll, the material cut as a B-roll read from the memory 50, and the material cut as a C-roll read from the IC card 36.

Each of the memory 50 and the IC card 36 may be divided into a plurality of storage areas, a plurality of cuts may be stored in the respective storage areas, and more complex editing than the A/B-roll editing and the A-, B-, and C-roll editing.

The editing apparatus shown in FIG. 3 may be constructed as an editing system or a unitary editing machine. If the editing apparatus is constructed as a unitary editing machine, then the video special effect switcher 27 and the audio mixer 29 may be separate from or integral with the editing apparatus. If the video special effect switcher 27 and the audio mixer 29 are separate from the editing apparatus and the editing apparatus is constructed as a unitary editing machine, then terminals for sending/returning video and audio signals need to be connected between the playback signal processor 26 and the D/A converters 31, 33.

While the memory 50 and the IC card 36 are used as recording or storing means for saving data, other storage mediums including a hard disk, a removable hard disk, an optical disk (write-once or phase-change medium), a magnetooptical disk, a silicon disk, and a flexible disk having a storage capacity of at least 20 Mbytes. If one of these storage mediums is used, then the IC card slot 37 shown in FIG. 3 serves as a disk drive for that storage medium.

According to the first embodiment, inasmuch as each of the tape transports 20, 21 can freely be selected as a playback or recording tape transport, the selection of the tape transports has high freedom and the signal routes or paths in the editing apparatus can easily be changed for editing operation.

* 2nd Embodiment:

An editing apparatus according to a second embodiment of the present invention will be described below. According to the second embodiment, a B-roll storing mode is automatically carried out. The editing apparatus according to the second embodiment is of the same structure as the editing apparatus according to the first embodiment. Therefore, those FIGURES which are referred to in the description of the first embodiment will also be referred to in describing the editing apparatus according to the second embodiment.

According to the second embodiment, unlike the first embodiment, no menu-based selection of a process is employed, and an A/B-roll editing mode or a cut editing mode is selected after a B-roll storing mode is automatically effected. The steps of routines shown in FIGS. 19 through 27 of operation sequences of the editing apparatus according to the second embodiment are denoted by reference numerals assigned to the second embodiment, and those steps which are identical to those of the routines shown in FIGS. 10 through 17 of operation sequences of the editing apparatus according to the first embodiment are also denoted by reference numerals in parentheses that have been assigned to the identical steps of operation sequences of the editing apparatus according to the first embodiment. Those identical steps will not be described in detail below. If necessary, reference should be made to the description of those steps, indicated by the reference numerals in parentheses, of the routines of operation sequences of the editing apparatus according to the first embodiment.

K: Editing table (see FIG. 18):

FIG. 18 is an editing table used by the editing apparatus according to the second embodiment, the editing table being stored in the table area 78*d* of the RAM 78 shown in FIG. 7.

The editing table shown in FIG. 18 differs from the editing table shown in FIG. 8 according to the first embodiment in that four data:

(A-ROLL IN POINT TIME)−(ts+ta)
(A-ROLL OUT POINT TIME)+(ta−ts)
(B-ROLL IN POINT TIME)−(ts+ta)
(B-ROLL OUT POINT TIME)+(ta−ts)

are newly added.

The symbol "ts" represents a time that is consumed after the tape transports 20, 21 are given a command from the tape transport control means 81 until they start an operation indicated by the command, e.g., a playback operation or a stop operation. The symbol "ta" represents a time as an "allowance", which is a time prior to an IN point and a time subsequent to an OUT point. Therefore, (ts+ta) is subtracted with respect to an IN point, where the time data ts represent a time required to start a playback process, and (ta−ts) is added with respect to an OUT point, where the time data ts represent a time required for the tape transports 20, 21 to stop after they are given a stop command. The time data ts, ta are stored in advance in the ROM 77 shown in FIG. 7.

Figure 19:
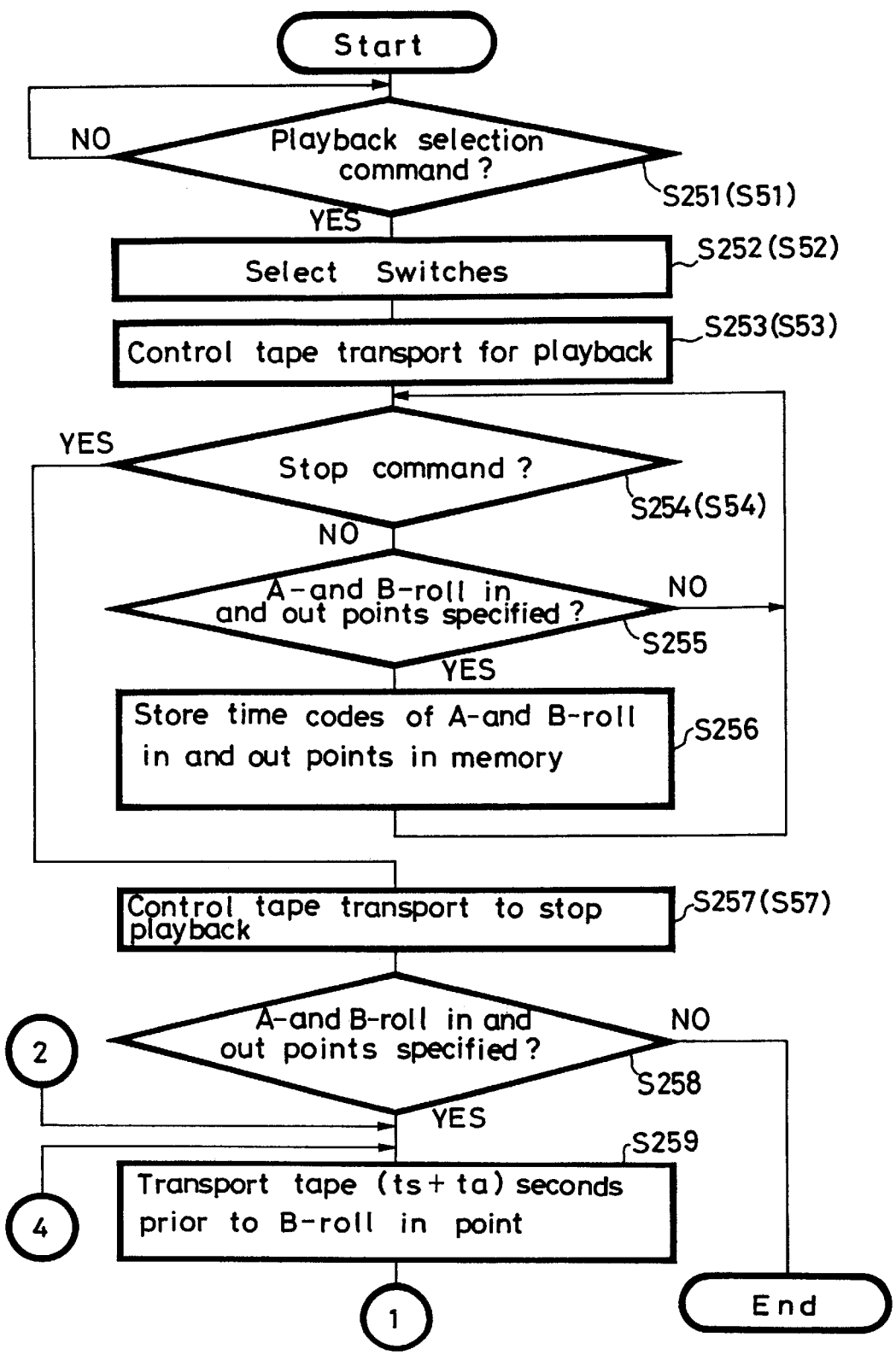
FIG. 19 is a flowchart of a B-roll storing routine in a main routine of operation of the editing apparatus according to the second embodiment.
Figure 20:
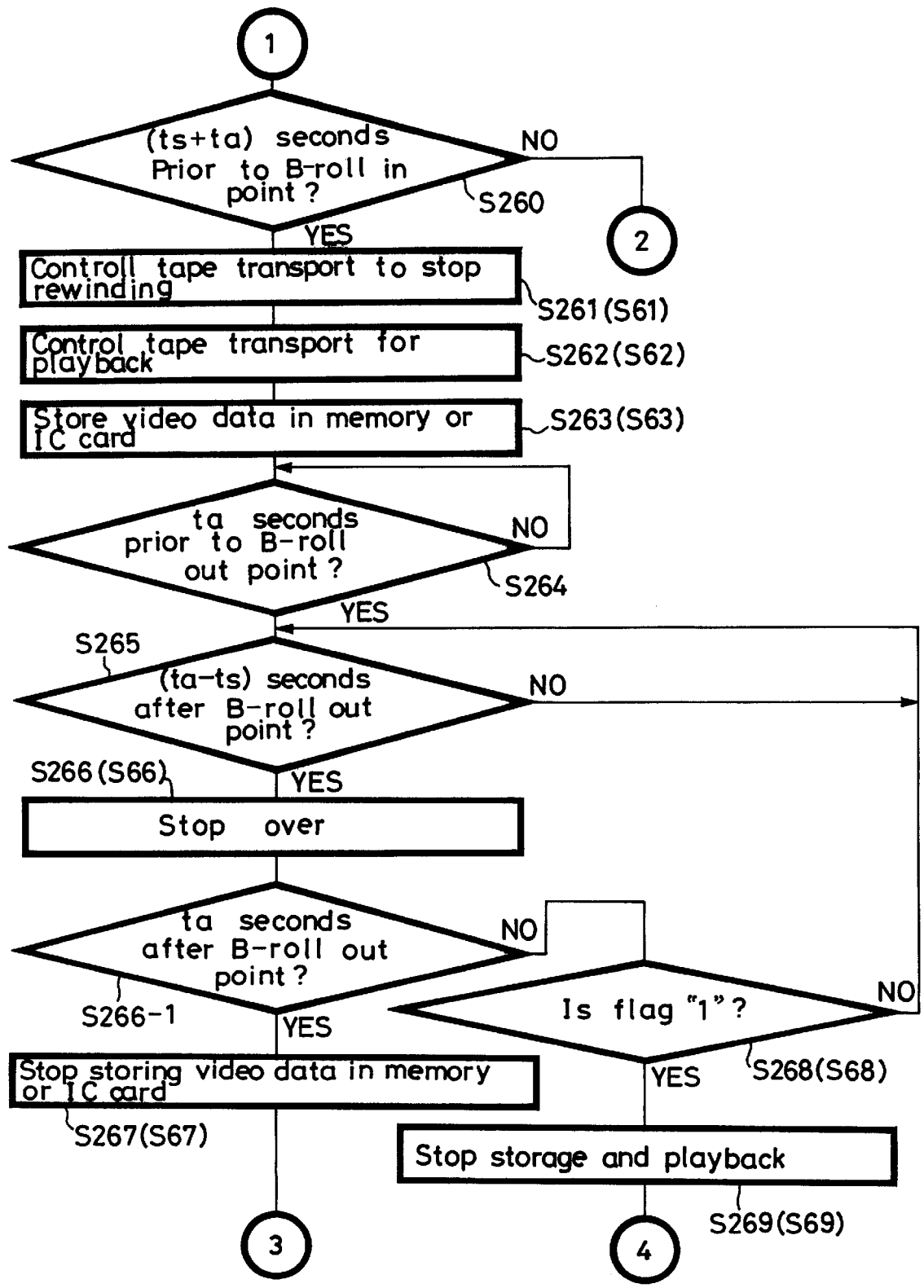
FIG. 20 is a flowchart of the B-roll storing routine in the main routine of operation of the editing apparatus according to the second embodiment.

L: B-roll storing routine (see FIGS. 19 and 20):

FIGS. 19 and 20 show a B-roll storing routine in a main routine of operation of the editing apparatus according to the second embodiment. Those steps of the B-roll storing routine shown in FIGS. 19 and 20 which are indicated by reference numerals of their own and reference numerals in parentheses are identical to those steps of the routine shown in FIGS. 10 and 11 which are indicated by the identical reference numerals in parentheses, and hence will not be described in detail below.

In a step S255, the key determining means 85 determines whether the IN point specifying key 25L and the OUT point specifying key 25M on the control console 25 have been pressed for specifying A- and B-rolls, respectively, or not. If "YES", then control goes to a step S256, and if "NO", then control goes back to a step S254.

In the step S256, the RAM/ROM control means 93 registers time codes read by the time code reading means 88 as time codes of A- and B-roll IN and OUT points into the editing table stored in the table area 78*d* of the RAM 78 when the IN point specifying key 25L and the OUT point specifying key 25M are pressed by the operator. Then, control proceeds to a step S257.

In a step S258, the data determining means 94 refers to the editing table stored in the table area 78d of the RAM 78 to determine whether A- and B-roll IN and OUT points have been specified or not. If "YES", then control proceeds to a step S259. If "NO", then control finishes the B-roll storing routine.

In the step S259, the tape transport control means 81 supplies a control signal indicative of a tape rewinding through the input/output port 79 to the tape transport 20 to enable the tape transport 20 to rewind the magnetic tape. Then, control proceeds to a step S260 shown in FIG. 20. The target position on the magnetic tape is a position where time code data are recorded which are ahead by (ts+ta) in time of the position where the time code data of the B-roll IN point are recorded.

While the tape transport 20 is rewinding the magnetic tape, the time code reading means 88 reads time code data in reproduced data from the tape transport 20. The time code data read by the time code reading means 88 are successively stored into the time code area 78b of the RAM 78 by the RAM/ROM control means 93. The calculating means 89 determines the difference between the time code data read by the time code reading means 88 and the time code data of the B-roll IN point in the editing table stored in the table area 78d of the RAM 78, and supplies the differential data to the timing determining means 91.

In the step S260, the timing determining means 91 determines whether the differential data from the calculating means 89 are representative of a time indicated by (B-roll IN point time)−(ts+ta) in the editing table stored in the table area 78d of the RAM 78 or not. If "YES", then control proceeds to a step S261, and if "NO", then control goes back to the step S259 shown in FIG. 17.

In a step S264, the timing determining means 91 determines whether the differential data from the calculating means 89, i.e., the difference between the time code data read by the time code reading means 88 and the time code data of the B-roll IN point registered in the editing table in the table area 78d of the RAM 78, is representative of a time indicated by the time data ts stored in the ROM 77, i.e., is ta seconds prior to the B-roll IN point, or not. If "YES", then control proceeds to a step S265.

In the step S265, the timing determining means 91 determines whether the differential data from the calculating means 89, i.e., the difference between the time code data read by the time code reading means 88 and stored in the time code area 78b of the RAM 78 and the time code data of the B-roll OUT point registered in the editing table in the table area 78d of the RAM 78, are representative of (ta−ts) seconds or not. If "YES", then control proceeds to a step S266.

In a step S266-1, the timing determining means 91 determines whether the differential data from the calculating means 89, i.e., the difference between the time code data read by the time code reading means 88 and the time code data of the B-roll OUT point registered in the editing table in the table area 78d of the RAM 78, is representative of ta seconds or not. If "YES", then control proceeds to a step S268.

Figure 21:
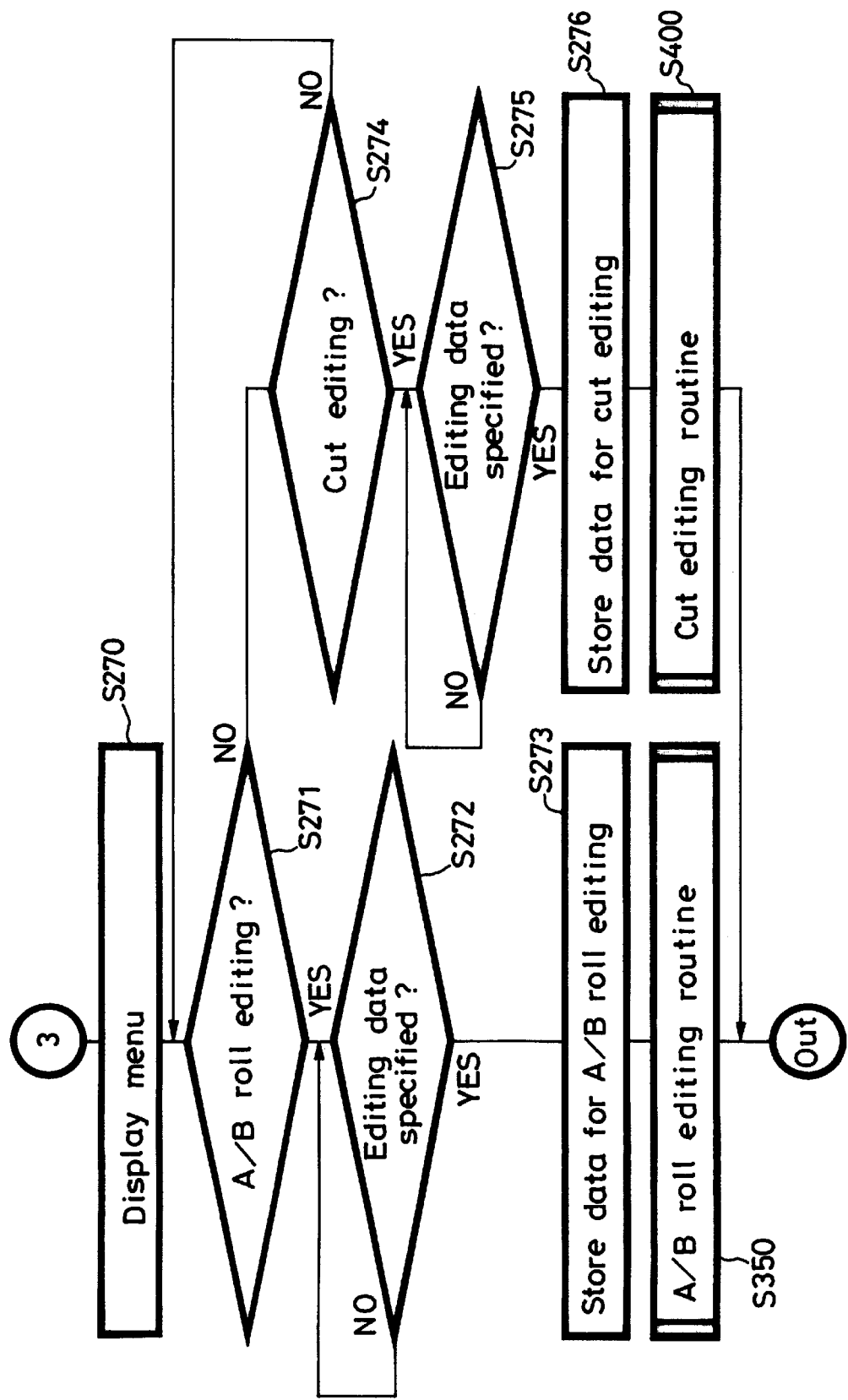
FIG. 21 is a flowchart of an editing mode specifying routine in the main routine of operation of the editing apparatus according to the second embodiment.

M: Editing mode specifying routine after the B-roll storing routine (see FIG. 21):

FIG. 21 shows an editing mode specifying routine after the B-roll storing routine of the editing apparatus according to the second embodiment.

If the memory control means 86 stops storing video and audio data as a B-roll into the memory 50 in a step S269 shown in FIG. 20, then control proceeds to a step S270 shown in FIG. 21.

In the step S270, the RAM/ROM control means 93 reads menu data stored in the ROM 77, and the display control means 80 supplies the menu data read by the RAM/ROM control means 93 through the input/output port 79 to the display 25a to display the menu data. Then, control proceeds to a step S271.

One example of the menu data displayed on the display 25a is given as follows:

1. A/B-ROLL EDITING MODE
2. CUT EDITING MODE
* PRESS RETURN KEY AFTER HAVING SELECTED WITH CURSOR KEY.

In the step S271, the key determining means 85 determines whether the A/B-roll editing mode has been selected or not based on positional information produced at the time the return key 25N is pressed. If "YES", then control goes to a step S272. If "NO", then control goes to a step S274. The A/B-roll editing mode can also be specified when the operator specifies a special effect of dissolve, wipe, or fade-in/fade-out.

In the step S272, the key determining means 85 determines whether the IN point specifying key 25L and the OUT point specifying key 25M on the control console 25 have been pressed for specifying a transition period or not. If "YES", then control goes to a step S273.

In the step S273, the RAM/ROM control means 93 registers time code data of the A-roll transition start point and the B-roll transition end point which have been specified in the step S272 into the editing table stored in the table area 78d of the RAM 78. Then, control goes to a step S350 for the A/B-roll editing routine.

In the step S274, the key determining means 85 determines whether the cut editing mode has been selected or not based on positional information produced at the time the return key 25N is pressed. If "YES", then control goes to a step S275. If "NO", then control goes back to the step S270.

In the step S275, the key determining means 85 determines whether the IN point specifying key 25L and the OUT point specifying key 25M on the control console 25 have been pressed for specifying a transition period or not. If "YES", then control goes to a step S276.

In the step S276, the RAM/ROM control means 93 registers time code data of the A-roll IN and OUT points which have been specified in the step S275 into the editing table stored in the table area 78d of the RAM 78. Then, control goes to a step S400 for the cut editing routine.

Figure 22:
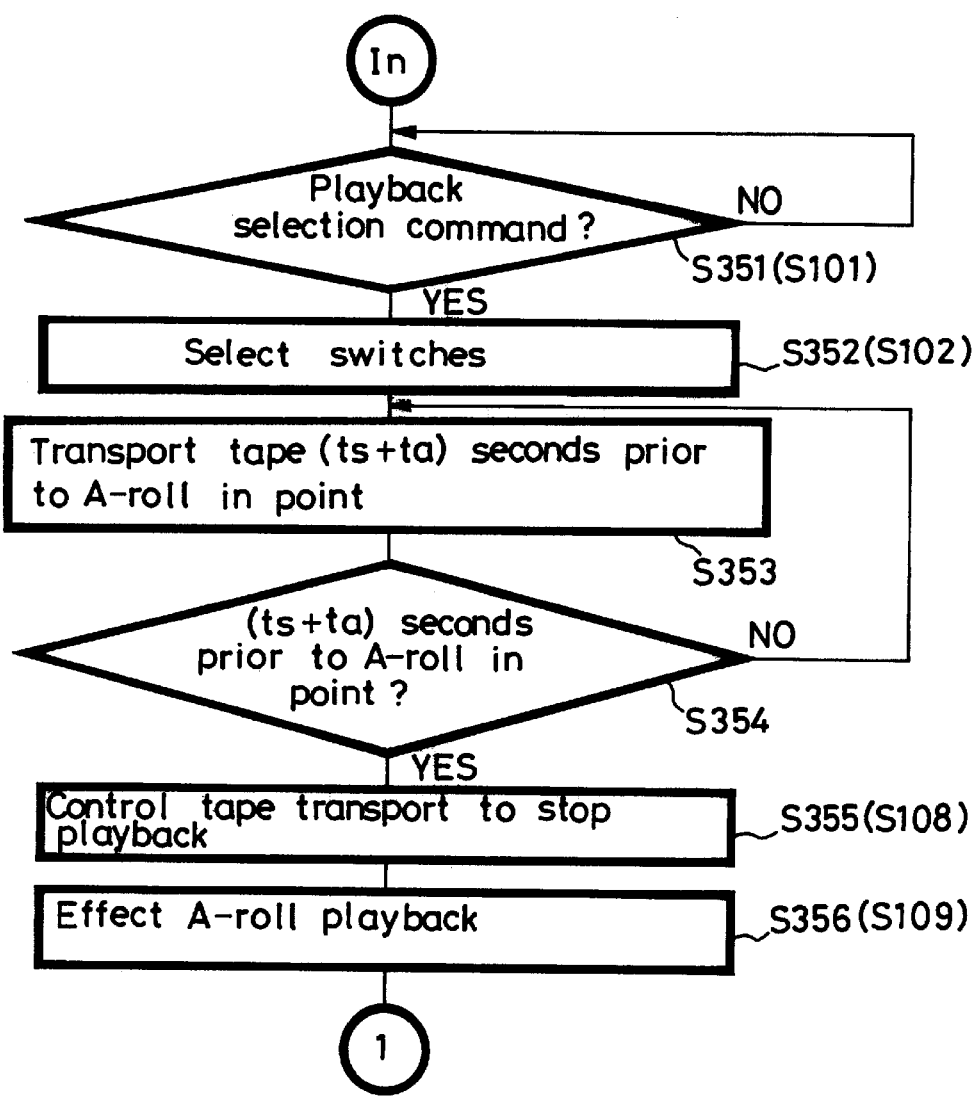
FIG. 22 is a flowchart of an A/B-roll editing routine in the main routine of operation of the editing apparatus according to the second embodiment.
Figure 23:
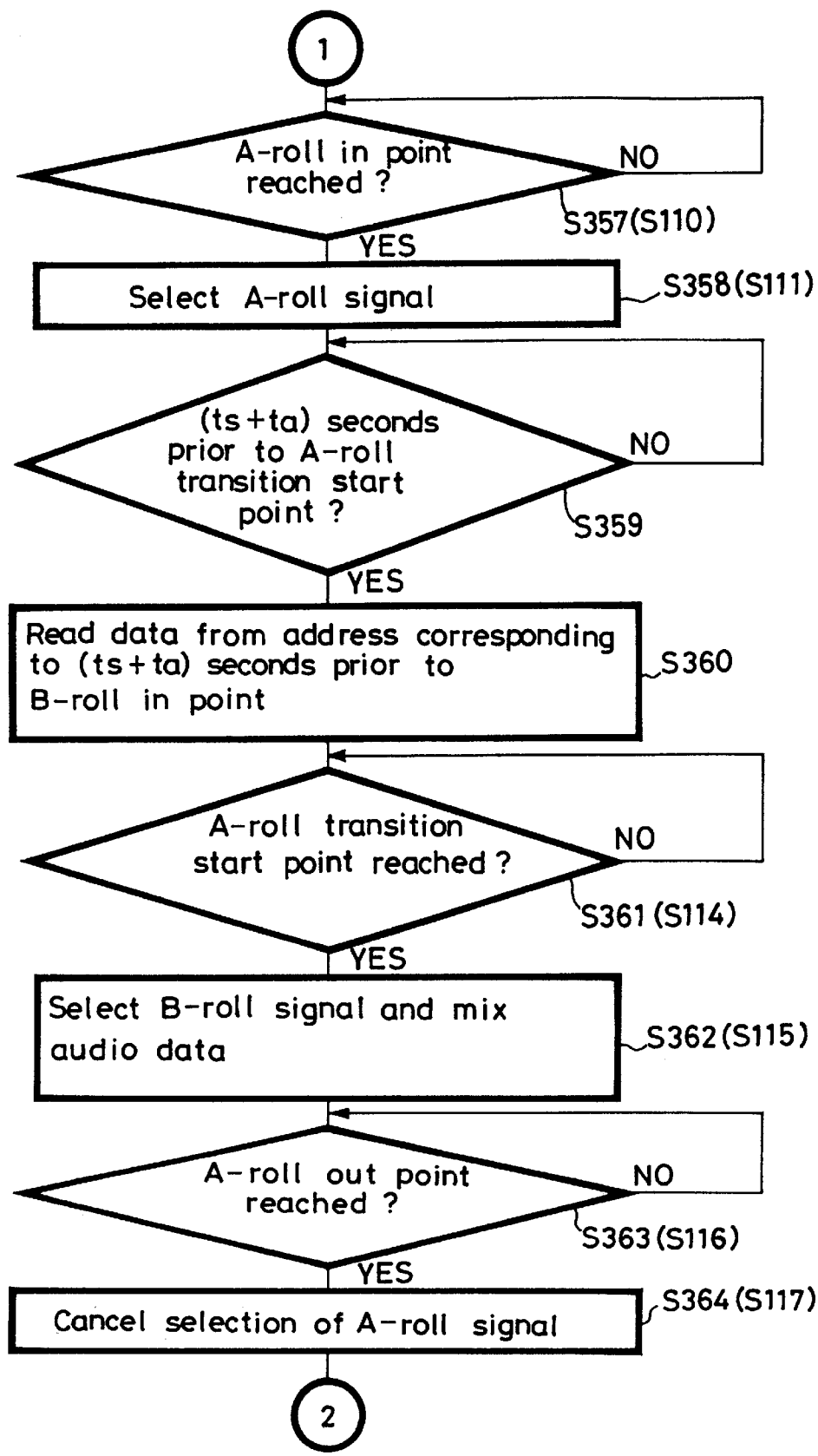
FIG. 23 is a flowchart of the A/B-roll editing routine in the main routine of operation of the editing apparatus according to the second embodiment.
Figure 24:
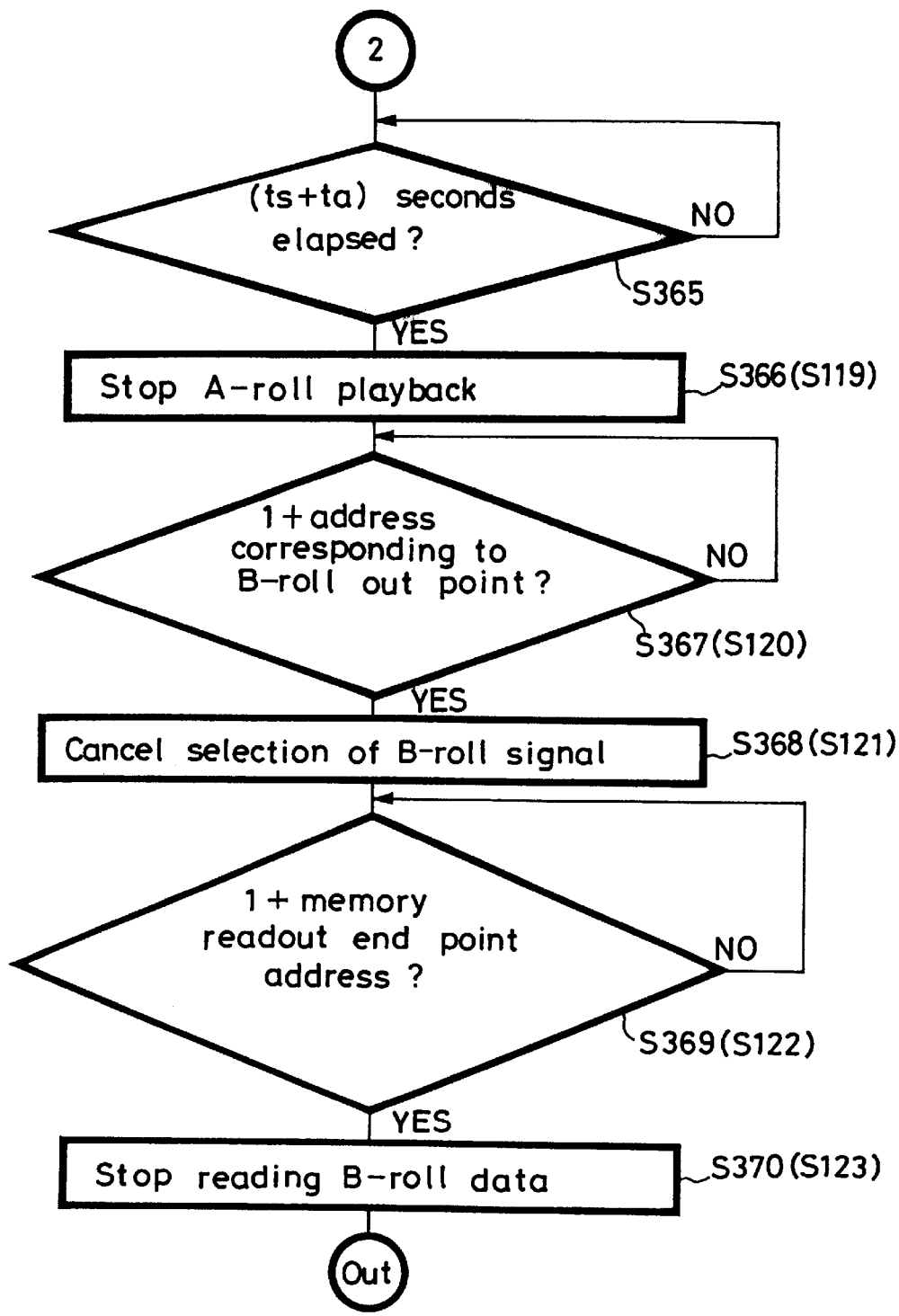
FIG. 24 is a flowchart of the A/B-roll editing routine in the main routine of operation of the editing apparatus according to the second embodiment.

N: A/B-roll editing routine (see FIGS. 22~24):

FIGS. 22 through 24 show details of the step S350 shown in FIG. 21, i.e., the processing sequence of an A/B-roll editing routine. The steps of the routine shown in FIGS. 22 through 24 are essentially the same as those of the routine shown in FIGS. 12 through 14 according to the first embodiment. The steps of the routine shown in FIGS. 22 through 24 are indicated by reference numerals of their own and also reference numerals in parentheses which are assigned to the corresponding steps of the routine shown in FIGS. 12 through 14 according to the first embodiment, and will not be described in detail below.

The routine shown in FIGS. 22 through 24 differs from the routine shown in FIGS. 12 through 14 in that the time data ts, ta are employed. Only those steps which employ the time data ts, ta will be described below.

In a step S353 shown in FIG. 22, the tape transport control means 81 supplies a control signal indicative of a tape rewinding through the input/output port 79 to the tape transport 20 to enable the tape transport 20 to rewind the magnetic tape. Then, control proceeds to a step S354. The target position at this time is (ts+ta) seconds prior to the A-roll IN point.

In the step S354, the timing determining means 91 determines whether the differential data from the calculating means 89, i.e., the difference between the time code data read by the time code reading means 88 and the time code data of the A-roll IN point, is representative of "ts+ta" or not. If "YES", then control proceeds to a step S355, and if "NO", then control goes back to the step S353.

In a step S359 shown in FIG. 23, the timing control means 91 determines whether the differential data from the calculating means 89, i.e., the difference between the time code data read by the time code reading means 88 and the time code data of the A-roll OUT point, is representative of "ts+ta" or not. If "YES", then control proceeds to a step S360.

In the step S360, the memory control means 86 supplies a read/write control signal through the input/output port 79 to the memory 50 for thereby reading video and audio data as a B-roll from an address in the memory 50 which is (ts+ta) seconds prior to the B-roll IN point, i.e., an address indicated by the memory readout start point address data shown in FIG. 18. Then, control goes to a step S361.

In a step S365 shown in FIG. 24, the timing determining means 91 determines whether the differential data from the calculating means 89, i.e., the difference between time code data read by the time code reading means 88 and the time code data of the A-roll OUT point, is representative of "ta–ts" (whether "ta–ts" has elapsed from the A-roll OUT point) or not. If "YES", then control proceeds to a step S366.

Figure 25:
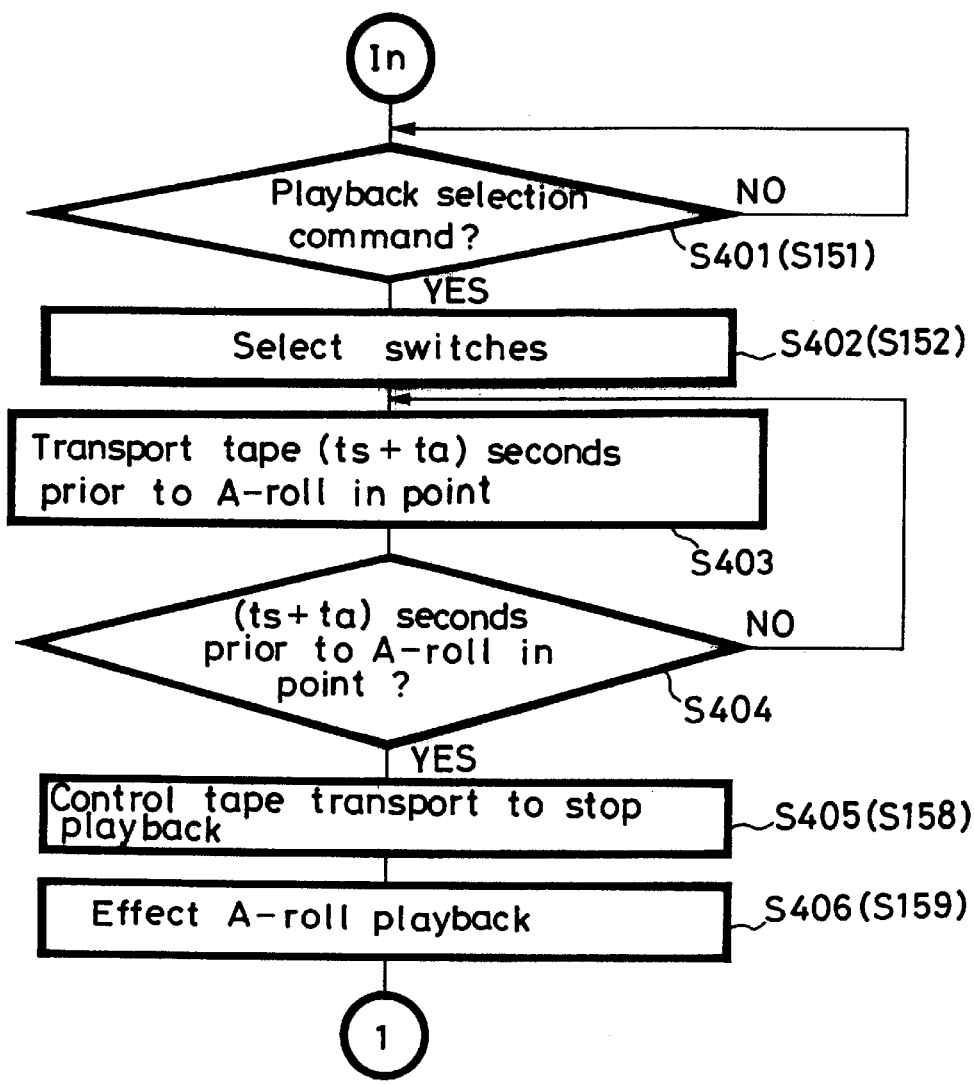
FIG. 25 is a flowchart of a cut editing routine in the main routine of operation of the editing apparatus according to the second embodiment.
Figure 26:
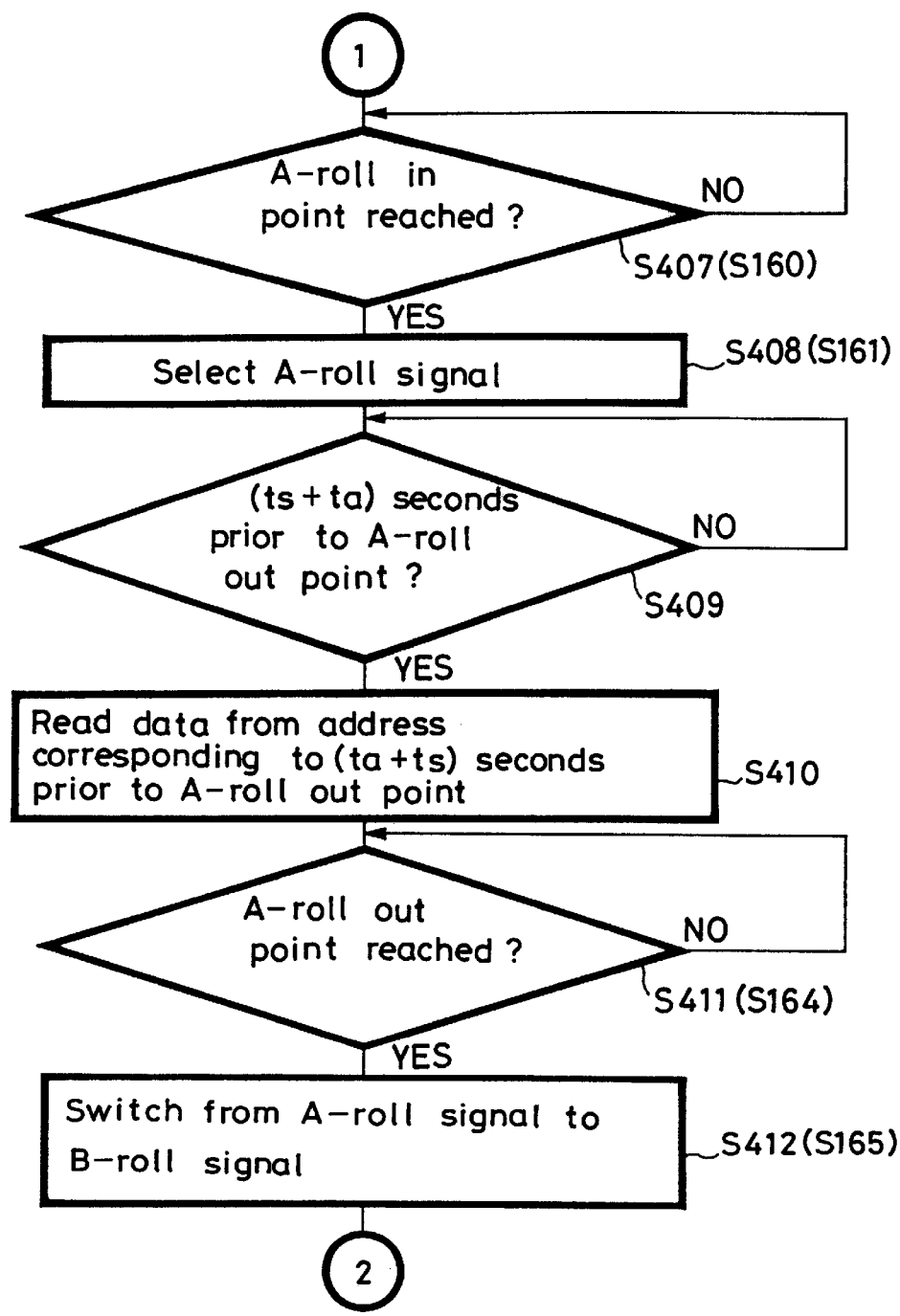
FIG. 26 is a flowchart of the cut editing routine in the main routine of operation of the editing apparatus according to the second embodiment.
Figure 27:
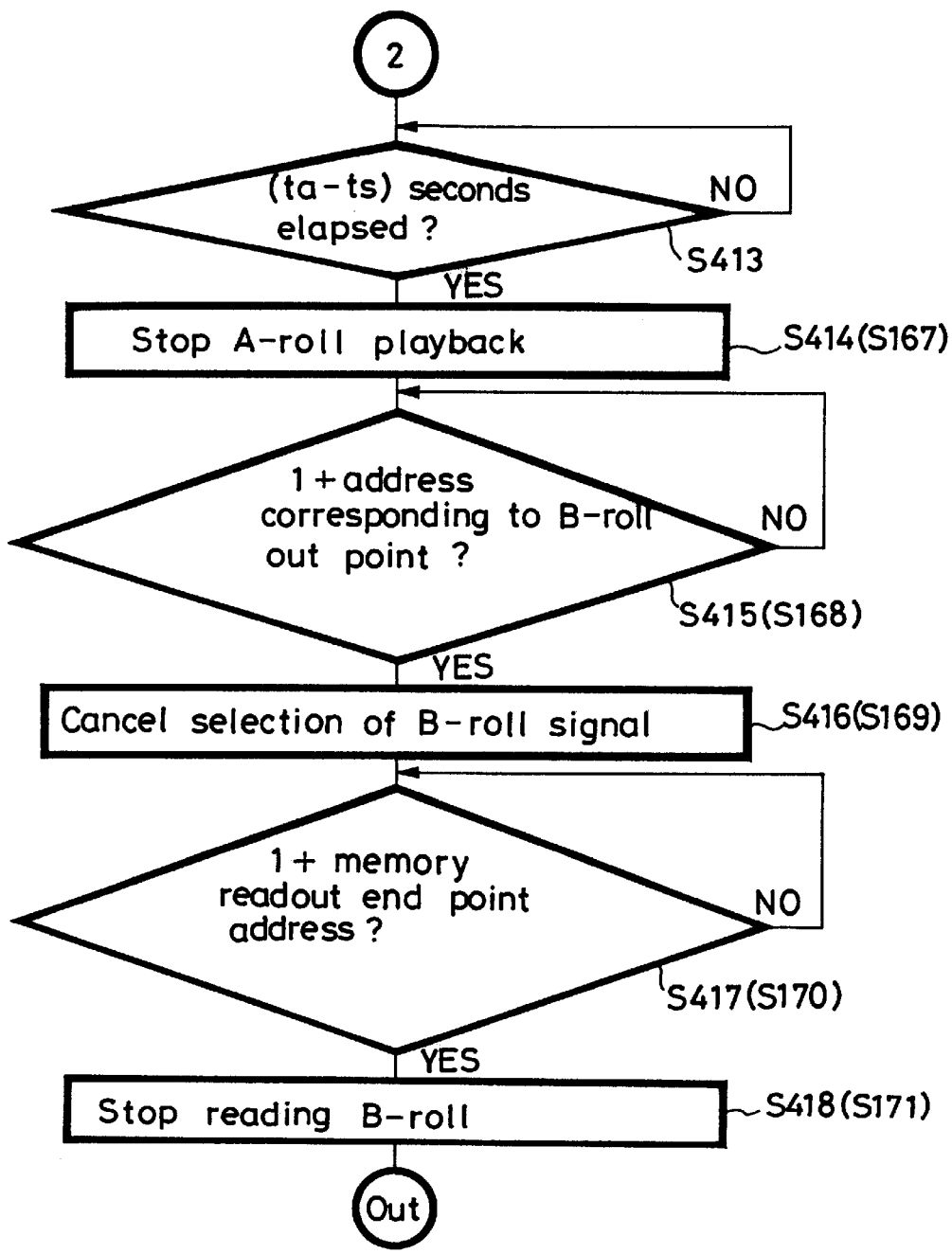
FIG. 27 is a flowchart of the cut editing routine in the main routine of operation of the editing apparatus according to the second embodiment.

O: Cut editing routine (see FIGS. 25~27):

FIGS. 25 through 27 show details of the step S450 shown in FIG. 21, i.e., the processing sequence of a cut editing routine. Those steps of the routine shown in FIGS. 25 through 27 which are identical to those of the routine shown in FIGS. 15 through 17 according to the first embodiment are indicated by reference numerals of their own and also reference numerals in parentheses which are assigned to the corresponding steps of the routine shown in FIGS. 15 through 17 according to the first embodiment, and will not be described in detail below.

The routine shown in FIGS. 25 through 27 differs from the routine shown in FIGS. 15 through 17 in that the time data ts, ta are employed. Only those steps which employ the time data ts, ta will be described below.

In a step S403 shown in FIG. 25, the tape transport control means 81 supplies a control signal indicative of a tape rewinding through the input/output port 79 to the tape transport 20 to enable the tape transport 20 to rewind the magnetic tape. Then, control proceeds to a step S404. The target position at this time is (ts+ta) seconds prior to the A-roll IN point.

In the step S404, the timing determining means 91 determines whether the differential data from the calculating means 89, i.e., the difference between the time code data read by the time code reading means 88 and the time code data of the A-roll IN point, is representative of "ts+ta" or not. If "YES", then control proceeds to a step S405, and if "NO", then control goes back to the step S403.

In a step S409 shown in FIG. 256, the timing control means 91 determines whether the differential data from the calculating means 89, i.e., the difference between the time code data read by the time code reading means 88 and the time code data of the A-roll OUT point, is representative of "ts+ta" or not. If "YES", then control proceeds to a step S410.

In the step S410, the memory control means 86 supplies a read/write control signal through the input/output port 79 to the memory 50 for thereby reading video and audio data as a B-roll from an address in the memory 50 which is (ts+ta) seconds prior to the B-roll IN point, i.e., an address indicated by the memory readout start point address data shown in FIG. 18. Then, control goes to a step S411.

In a step S413 shown in FIG. 27, the timing determining means 91 determines whether the differential data from the calculating means 89, i.e., the difference between time code data read by the time code reading means 88 and the time code data of the A-roll OUT point, is representative of "ta–ts" (whether "ta–ts" has elapsed from the A-roll OUT point) or not. If "YES", then control proceeds to a step S414.

<Advantages offered by the second embodiment>

According to the second embodiment, as described above, no B-roll storing mode is started from the displayed menu, but a B-roll storing mode is automatically carried out, unlike the first embodiment. Therefore, in addition to the advantages of the first embodiment, the second embodiment offers advantages in that the editing efficiency is highly increased, and an editing process is effected with high accuracy using the time data ts, ta.

* 3rd Embodiment:

An editing apparatus according to a third embodiment of the present invention will be described below. According to the third embodiment, the operator uses the control keys on the control console 25 to enter time codes of B-roll IN and OUT points. The editing apparatus according to the third embodiment is of the same structure as the editing apparatus according to the first embodiment. Therefore, those FIGURES which are referred to in the description of the first embodiment will also be referred to in describing the editing apparatus according to the third embodiment. The steps of routines shown in FIGS. 28 and 29 of operation sequences of the editing apparatus according to the third embodiment are denoted by reference numerals assigned to the third embodiment, and those steps which are identical to those of the routines shown in FIGS. 10 and 11 of operation sequences of the editing apparatus according to the first embodiment are also denoted by reference numerals in parentheses that have been assigned to the identical steps of operation sequences of the editing apparatus according to the first embodiment. Those identical steps will not be described in detail below. If necessary, reference should be made to the description of those steps, indicated by the reference numerals in parentheses, of the routines of operation sequences of the editing apparatus according to the first embodiment.

Figure 28:
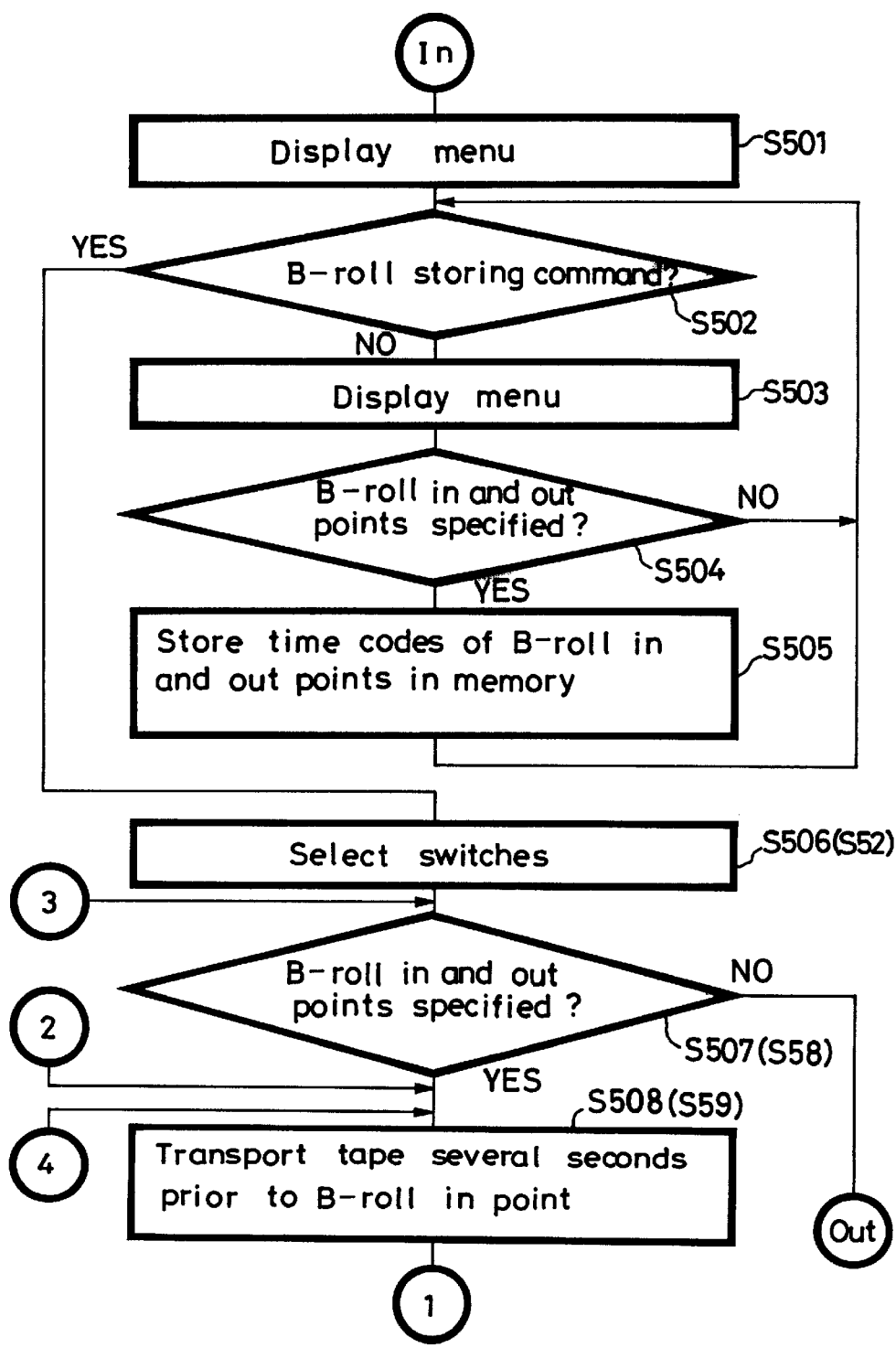
FIG. 28 is a flowchart of a B-roll storing routine in a main routine of operation of an editing apparatus according to a third embodiment of the present invention.
Figure 29:
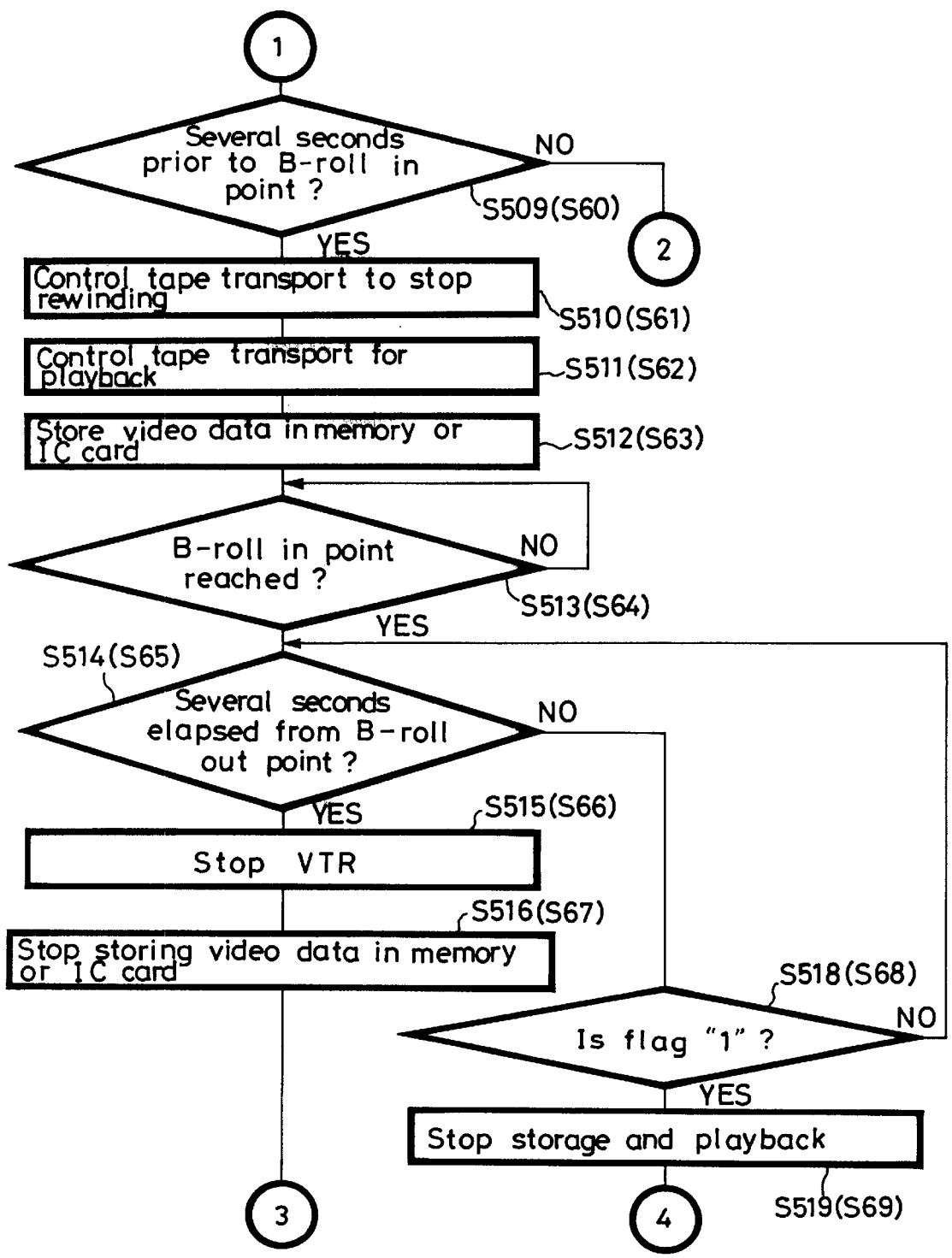
FIG. 29 is a flowchart of the B-roll storing routine in the main routine of operation of the editing apparatus according to the third embodiment.

P: B-roll storing routine (see FIGS. 28 and 29):

FIGS. 28 and 29 show a B-roll storing routine in a main routine of operation of the editing apparatus according to the third embodiment. Those steps of the B-roll storing routine shown in FIGS. 28 and 29 which are indicated by reference numerals of their own and reference numerals in parentheses are identical to those steps of the routine shown in FIGS. 10 and 11 which are indicated by the identical reference numerals in parentheses, and hence will not be described in detail below. Since a B-roll storing mode according to the third embodiment is a mode for allowing the operator to directly enter time code data which may have been put down on a sheet of paper, the B-roll storing routine shown in FIGS. 28 and 29 does not have any step corresponding to the step S57 (see FIG. 10) for stopping the tape transport 20.

If "YES" in the step S3 of the main routine shown in FIG. 9, i.e., if the operator operates control keys on the control console 25 to indicate the execution of a B-roll storing routine, then control goes to a step S501 shown in FIG. 28.

In the step S501, the display control means 80 supplies menu data read from the ROM 77 by the RAM/ROM control means 93 to the display 25*a* on the control console 25 to display the menu data. Then, control proceeds to a step S502.

One example of the menu data displayed on the display 25*a* is given as follows:
 DO YOU WANT TO START B-ROLL STORING MODE?
  1. YES
  2. NO In the step S502, the key determining means 85 determines whether there is a command for starting a B-roll storing mode based on positional information produced at the time the return key 25N is pressed. If "YES", then control jumps to a step S506. In "NO", then control proceeds to a step S503.

In the step S503, menu data read from the ROM 77 by the RAM/ROM control means 93 are supplied to the display 25*a* on the control console 25 to display a menu on the display 25*a*. Then, control proceeds to a step S504. A menu is displayed as follows (numerical values are given by way of example only):

| SETTING OF B-ROLL IN AND OUT POINTS | |
|---|---|
| [B-ROLL IN POINT] | 01h01m01s01f |
| [B-ROLL OUT POINT] | 01h02m01s01f |

* AFTER HAVING SELECTED WITH CURSOR KEY, PRESS RETURN KEY TO SELECT A PARAMETER TO BE SET, AND AFTER HAVING CHANGED THE PARAMETER WITH CURSOR KEY, PRESS RETURN KEY.

The above various data can be set in the same manner as with the A/B-roll editing mode described above in the first embodiment, and hence setting of those data will not be described in detail below.

In the step S504, the key determining means 85 determines whether the IN point specifying key 25L and the OUT point specifying key 25M on the control console 25 have been pressed or not. If "YES", then control goes to a step S505, and if "NO", then control goes back to the step S501. In the step S504, the cursor key 25*b* or the return key 25N on the control console 25 may be pressed only once. This is because the pressing of the cursor key 25*b* or the return key 25N only once may be regarded as indicating the start of entering the time codes of B-roll IN and OUT points.

In the step S505, the RAM/ROM control means 93 registers the time code data entered in the step S504 into corresponding locations in the storage space of the editing table stored in the table area 78*d* of the RAM 78. Thereafter, control goes to a step S506.

<Advantages offered by the third embodiment>

According to the third embodiment, as described above, inasmuch as the operator can directly enter time code data which may have been put down on a sheet of paper, time codes can be entered more accurately than if IN and OUT points are specified using the IN point specifying key 25L and the OUT point specifying key 25M, and an editing environment is produced which is suitable for operators who are accustomed to directly entering time codes.

* 4th Embodiment:

An editing apparatus according to a fourth embodiment of the present invention will be described below. According to the fourth embodiment, when the editing apparatus is in a re-try editing mode, the tape transport 20 is controlled to play back the material again from a position where an error has occurred, and reproduced video and audio data are stored in the memory 50 from a corresponding address therein. The editing apparatus according to the fourth embodiment is of the same structure as the editing apparatus according to the first embodiment. Therefore, those FIGURES which are referred to in the description of the first embodiment will also be referred to in describing the editing apparatus according to the fourth embodiment. The steps of routines shown in FIGS. 30 through 32 of operation sequences of the editing apparatus according to the fourth embodiment are denoted by reference numerals assigned to the fourth embodiment, and those steps which are identical to those of the routines shown in FIGS. 10 and 11 of operation sequences of the editing apparatus according to the first embodiment are also denoted by reference numerals in parentheses that have been assigned to the identical steps of operation sequences of the editing apparatus according to the first embodiment. Those identical steps will not be described in detail below. If necessary, reference should be made to the description of those steps, indicated by the reference numerals in parentheses, of the routines of operation sequences of the editing apparatus according to the first embodiment.

Figure 30:
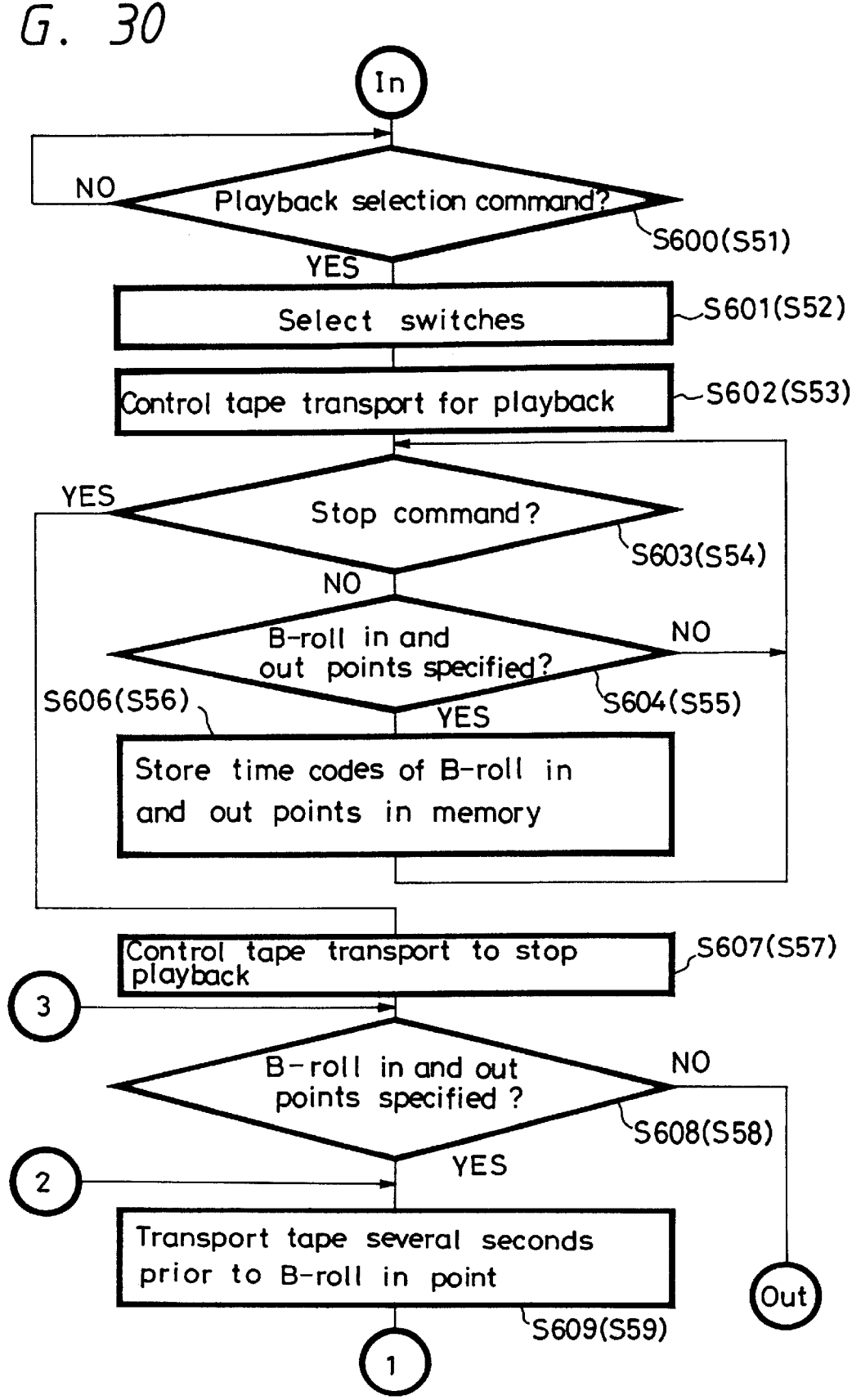
FIG. 30 is a flowchart of a B-roll storing routine in a main routine of operation of an editing apparatus according to a fourth embodiment of the present invention.
Figure 31:
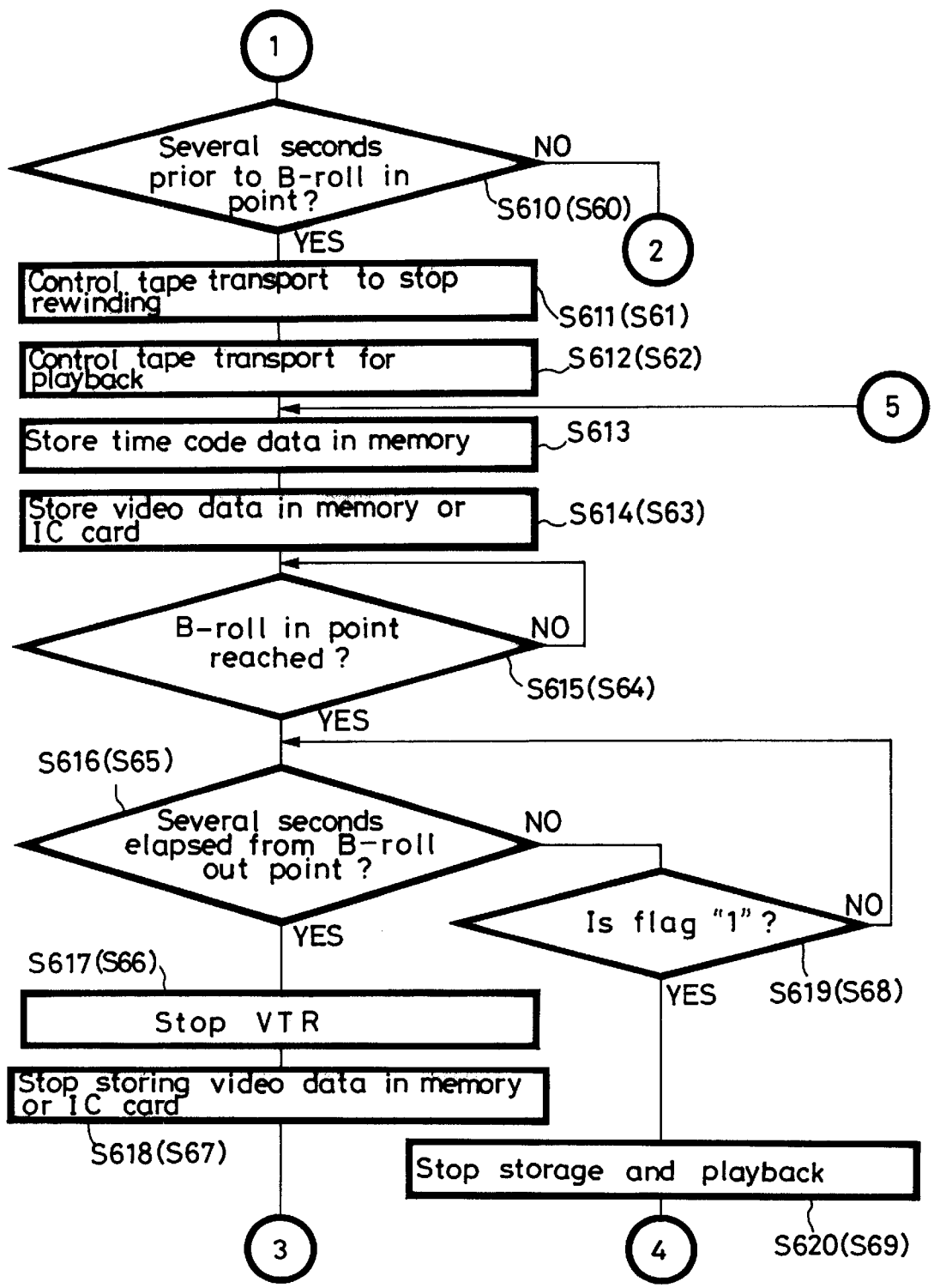
FIG. 31 is a flowchart of the B-roll storing routine in the main routine of operation of the editing apparatus according to the fourth embodiment.
Figure 32:
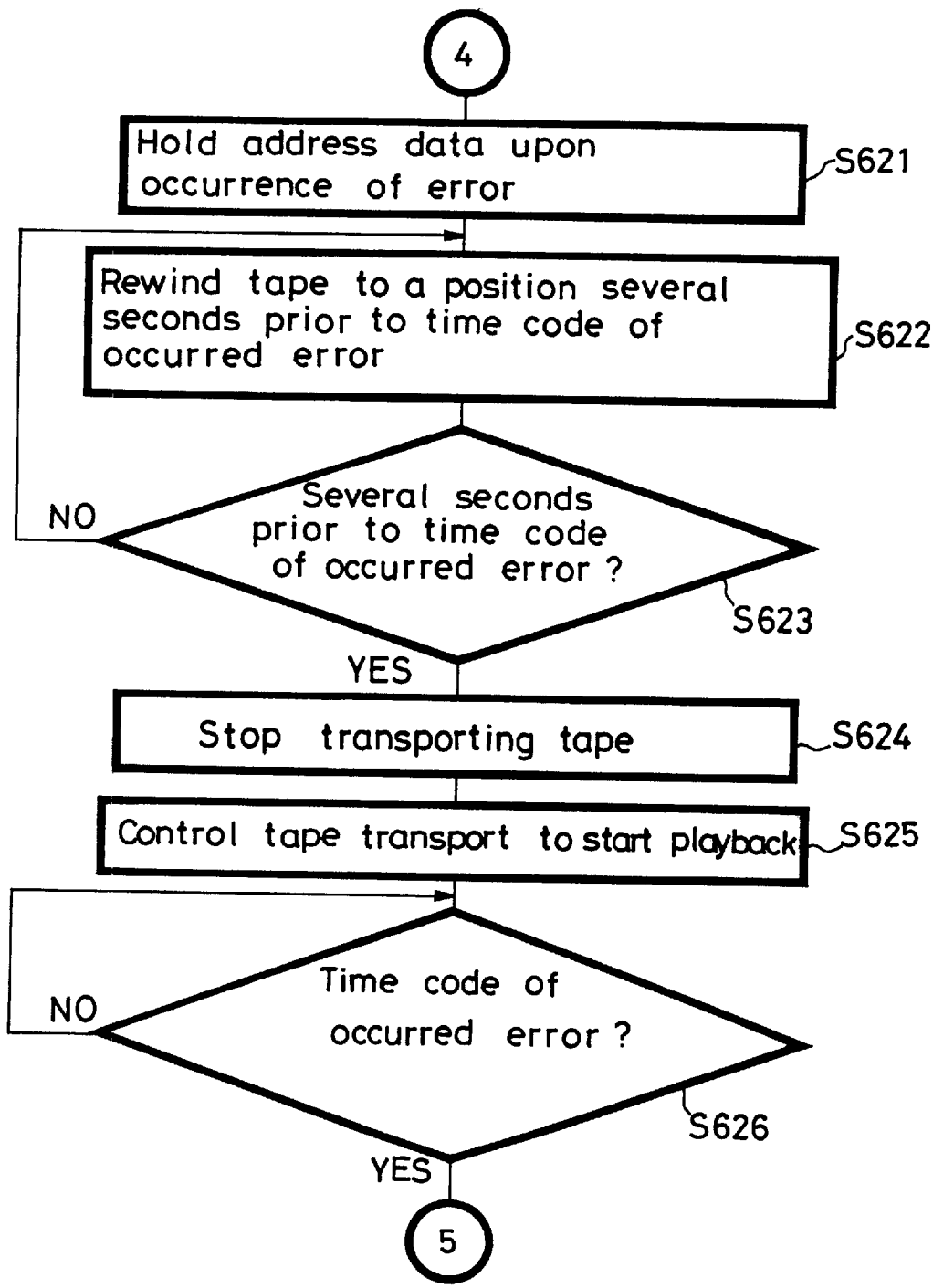
FIG. 32 is a flowchart of the B-roll storing routine in the main routine of operation of the editing apparatus according to the fourth embodiment.

O: B-roll storing routine (see FIGS. 30–32):

FIGS. 30 through 32 show a B-roll storing routine in a main routine of operation of the editing apparatus according to the fourth embodiment. Those steps of the B-roll storing routine shown in FIGS. 30 through 32 which are indicated by reference numerals of their own and reference numerals in parentheses are identical to those steps of the routine shown in FIGS. 10 and 11 which are indicated by the identical reference numerals in parentheses, and hence will not be described in detail below.

In a step S613 shown in FIG. 31, the RAM/ROM control means 93 stores time code data read by the time code reading means 88 into the work area 78*a* of the RAM 78. Then, control proceeds to a step S614.

If "YES" in a step S619, i.e., if the re-try determining means 92 determines that the flag data from the error corrector 44 indicate that an error which cannot be corrected has occurred, then control proceeds to a step S620. In the step S620, the memory control means 86 stops supplying a read/write control signal to the memory 50 to stop data storing operation of the memory 50, and the tape transport control means 81 supplies a control signal indicative of a playback stop to the tape transport 20 to enable the tape transport 20 to stop the playback operation. Thereafter, control proceeds to a step S621 shown in FIG. 32.

In the step S621, the memory control means 86 holds address data at the time the which cannot be corrected has occurred. Then, control goes to a step S622.

In the step S622, the tape transport control means 81 supplies a control signal indicative of a tape rewinding through the input/output port 79 to the tape transport 20 to enable the tape transport 20 to rewind the magnetic tape. Then, control proceeds to a step S623.

While the tape transport 20 is rewinding the magnetic tape, the calculating means 89 determines the difference between the time code data read by the time code reading means 88 and the time code data stored in the work area 78*a* of the RAM 78 upon occurrence of the error, and supplies the differential data to the timing determining means 91.

In the step S623, the timing determining means 91 determines whether the differential data from the calculating means 89 is representative of several seconds indicated by the time data stored in the ROM 77 or not. If "YES", then control proceeds to a step S624. If "NO", then control goes back to the step S622.

In the step S624, the tape transport control means 81 supplies a control signal indicative of a rewinding stop through the input/output port 79 to the tape transport 20 to enable the tape transport 20 to stop the rewinding operation. Then, control proceeds to a step S625.

In the step S625, the tape transport control means 81 supplies a control signal indicative of a playback start through the input/output port 79 to the tape transport 20 to enable the tape transport 20 to start playback operation. Then, control proceeds to a step S626.

While the tape transport 20 is in the playback operation, the calculating means 89 determines the difference between the time code data read by the time code reading means 88 and the time code data stored in the work area 78*a* of the RAM 78 upon occurrence of the error, and supplies the differential data to the timing determining means 91.

In the step S626, the timing determining means 91 determines whether the differential data from the calculating means 89 is representative of "0" or not. If "YES", then control goes back to the step S613 shown in FIG. 31.

<Advantages offered by the fourth embodiment>

According to the fourth embodiment, as described above, unlike the re-try playback mode described in the first embodiment, when an error which cannot be corrected has occurred, the tape transport 20 is controlled to play back the material several seconds prior to the position where the error has occurred, and when the time code data from the tape transport 20 represent a time code produced by the error which cannot be corrected, subsequent video and audio data are stored in the memory 50 from the corresponding location thereof. Therefore, the time required for the B-roll storing mode is shorter than if the B-roll storing mode were executed all over again, resulting in higher editing operation.

Figure 33:
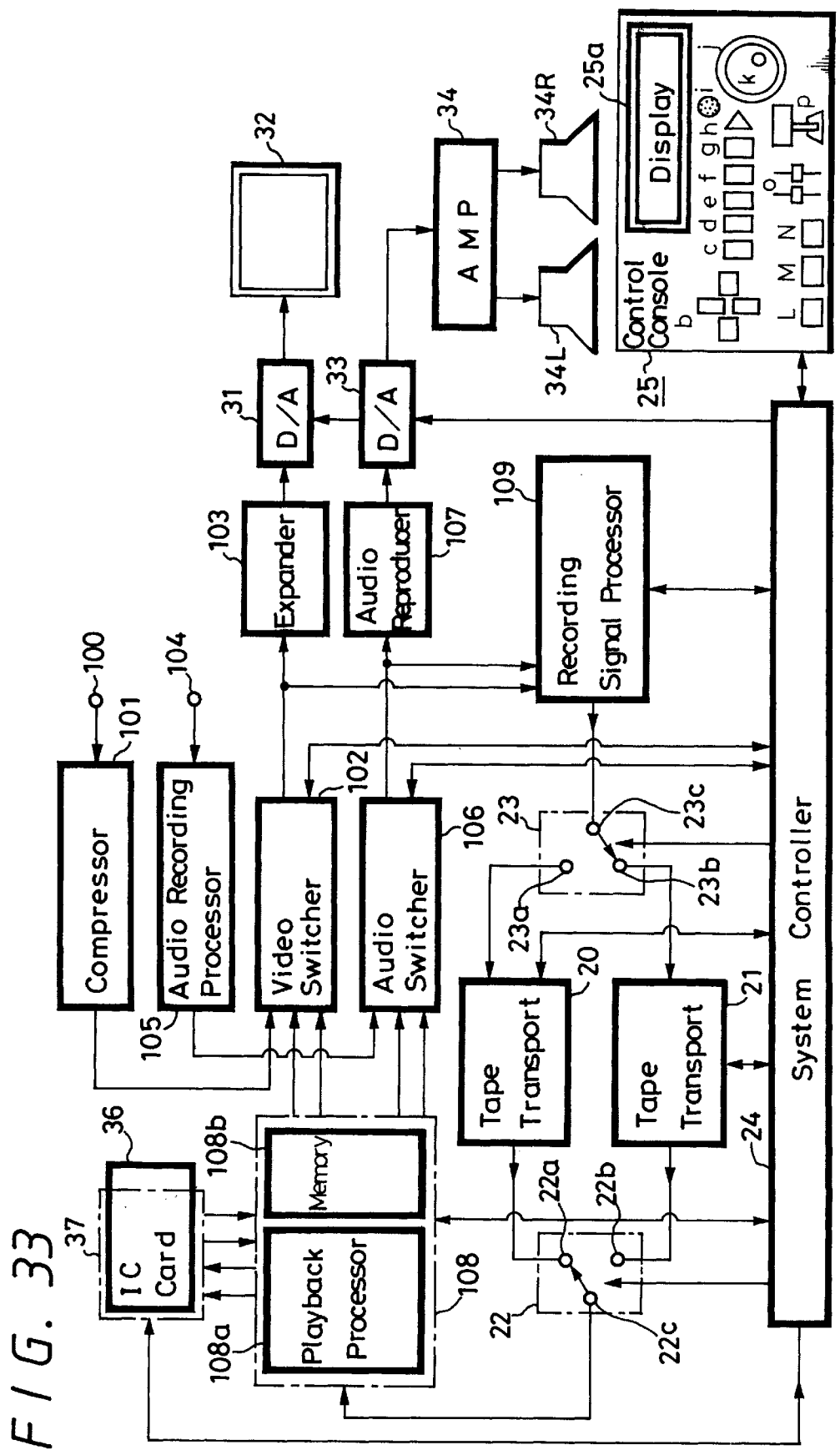
FIG. 33 is a block diagram of an editing apparatus according to a fifth embodiment of the present invention.

* 5th Embodiment:

R: Structure and operation of an editing apparatus (see FIG. 33):

FIG. 33 shows in block form an editing apparatus according to a fifth embodiment of the present invention. Those parts shown in FIG. 32 which are identical to those of the editing apparatus shown in FIG. 3 are denoted by identical reference numerals, and will not be described in detail below.

<Connection and structure>

The editing apparatus shown in FIG. 33 differs from the editing apparatus shown in FIG. 3 in that it has a compressor 101, an audio recording processor 105, an expander 103, and an audio reproducer 107, that a video switcher 102 is added in place of the video special effect switcher 27, that an audio switcher 106 is added in place of the audio mixer 29, a playback signal processor 108 has a playback processor 108*a* which does not include the video data expanders 47, 53 and the audio reproducers 57, 61, and that a recording signal processor 109 does not include the video data compressor 66 and the audio recording processor 68.

The playback processor 108*a* of the playback signal processor 108 includes the amplifier 41, the data extractor 42, the channel decoder 43, and the error corrector 44, and the recording signal processor 109 includes the error-correcting code adder 69, the channel coder 70, and the amplifier 71.

With the video switcher 102 and the audio switcher 106 used in place of the video special effect switcher 27 and the audio mixer 29, the editing apparatus shown in FIG. 33 is capable of carrying out only a cut editing mode, and allows a compressed video signal and an audio signal processed for recording to be switched by the video switcher 102 and the audio switcher 106.

The compressor 101 serves to compress a non-compressed video signal that is supplied from an external source through an input terminal 100. The audio recording processor 105 serves to process, for recording, a non-processed audio signal that is supplied from an external source through an input terminal 104. The expander 103 serves to expand a compressed video signal which has been compressed by the compressor 101 and supplied through the video switcher 102. The audio reproducer 107 serves to reproduce a processed audio signal which has been processed by the audio recording processor 105 for recording and supplied through the audio switcher 106.

The playback processor 108*a* of the playback signal processor 108 extracts data with the data extractor, channel-decodes the data with the channel decoder, error-corrects the data with the error corrector, outputs the processed data, and stores the data in a memory 108*b*. The recording signal processor 109 error-corrects the compressed video signal and the processed audio signal with the error corrector, channel-codes the video and audio signals with the channel coder, and outputs the video and audio signals through the amplifier.

<Operation>

Operation of the editing apparatus shown in FIG. 33 will be described below. It is assumed that a material cut as a B-roll is stored in the memory 108*b*, and a cut editing mode is carried out using a material cut as a A-roll played back by the tape transport 20 and the material cut as a B-roll read from the memory 108*b*.

First, the operator operates the control console 25 to place the tape transport 20 in a playback mode. Specifically, when information indicating that the tape transport 20 is to be placed in a playback mode is supplied from the control console 25 to the system controller 24, the system controller 24 supplies a control signal to the tape transport 20 to place it in a playback mode. At the same time, the system controller 24 supplies switching control signals to the switches 22, 23 to connect the movable contact 22*c* of the switch 22 to the fixed contact 22*a* and the movable contact 23*c* of the switch 23 to the fixed contact 23*b*.

When the tape transport 20 plays back the video tape cassette, a compressed video signal and a processed audio signal produced thereby are supplied through the switch 22 to the playback signal processor 108. The supplied video and audio signals are processed by the playback signal processor 108, and then supplied through the video switcher 102 and the audio switcher 106 (in a through mode) to the expander 103 and the audio reproducer 107.

The compressed video signal supplied to the expander 103 is expanded thereby. The processed audio signal supplied to the audio reproducer 107 is processed, e.g., deinterleaved, thereby. The expanded video signal from the expander 103 and the processed audio signal from the audio reproducer 107 are supplied respectively to the D/A converters 31, 33. The D/A converter 31 outputs an analog video signal, which is supplied to the television monitor 32 and displayed as a monitor image on its screen. The D/A converter 33 outputs an analog audio signal, which is supplied through the amplifier 34 to the loudspeakers 34L, 34R which reproduces the audio signal.

The operator now successively determines a material to be used as an A-roll and a material to be used as a B-roll in the manner already described above.

The system controller 24 supplies a control signal to the tape transport 20 to access the start of the material cut as a B-roll and thereafter play back the material cut as a B-roll. A compressed video signal and a processed audio signal that are played back as the B-roll material cut from the tape transport 20 are supplied to and stored in the memory 108*b* of the playback signal processor 108. At this time, the memory 108b stores video and audio signals from several seconds prior to the IN point of the B-roll to several seconds subsequent to the OUT point of the B-roll.

Then, the system controller 24 supplies a control signal to the tape transport 20 to access the start of the material cut as an A-roll and thereafter play back the material cut as an A-roll. At the same time, the system controller 24 reads the material cut as a B-roll stored in the memory 108b of the playback signal processor 108.

A compressed video signal and a processed audio signal that are played back as the A-roll material cut from the tape transport 20 are supplied through the video switcher 102 and the audio switcher 106, respectively, to the recording signal processor 109. After the video and audio signals have been processed for recording by the recording signal processor 109, they are supplied to the tape transport 21 and recorded along oblique tracks on a magnetic tape in a video tape cassette set in the tape transport 21.

When the time code supplied from the tape transport 20 reaches a time code several seconds prior to the time code of the A-roll OUT point, the system controller 24 supplies a read control signal to the memory 108b to read the compressed video signal and the processed audio signal as the B-roll therefrom. Then, when the time code supplied from the tape transport 20 reaches the time code of the A-roll OUT point, the system controller 24 supplies the video switcher 102 and the audio switcher 106 with a control signal indicative of the selection of the compressed video signal and the processed audio signal as the B-roll to the video switcher 102, and a control signal indicative of the cancel of the selection of the compressed video signal and the processed audio signal as the A-roll. The compressed video signal and the processed audio signal as the B-roll are now supplied through the switch 23 to the tape transport 21 and recorded along oblique tracks on the magnetic tape in the video tape cassette set in the tape transport 21.

Although not specifically described, video and audio signals which may be supplied through the input terminals 100, 104 from an external device may be processed and recorded in the same manner as described above. It is possible to process such video and audio signals from an external device, signals played back by the tape transports 20, 21, signals read from the memory 108b, and signals read from the IC card 36 freely in any combination. While the tape transport 20 has been selected as a playback tape transport and the tape transport 21 as a recording tape transport in the above example, the tape transport 20 may be selected as a recording tape transport and the tape transport 21 as a playback tape transport. A re-try playback mode is the same as with the first and fourth embodiment, and will not be described in detail below.

<Advantages offered by the fifth embodiment>

Since the editing apparatus according to the fifth embodiment employs the video switcher 102 and the audio switcher 106, the editing apparatus can handle a compressed video signal. The editing apparatus includes the compressor 101 and the audio recording processor 105 for processing video and audio signals from an external source, the editing apparatus can utilize and efficiently edit video and audio signals from an external source.

Having described preferred embodiments of the invention with reference to the accompanying drawings, it is to be understood that the inventionn is not limited to those precise embodiments and that various changes and modifications could be effected by one skilled in the art without departing from the spirit or scope of the invention as defined in the appended claims.

What is claimed is:

1. A method of editing material information, comprising the steps of:

selecting a desired one of a B-roll storing operation, an A/B-roll editing operation and a cut editing operation;

enabling a user to select either one of the first tape transport and the second tape transport for playing back information and automatically selecting the other of said first tape transport and said second tape transport for recording information;

playing back first lateral information recorded on a first tape recording medium with the selected playback tape transport;

processing said first material information which has been played back;

temporarily storing the processed first material information in temporary storage medium;

reading said first material information from said temporary storage medium;

playing back second material information recorded on said first tape recording medium with, said playback tape transport;

processing the played back second material information;

editing said first material information read from said temporary storage medium and the processed second material information into edited information;

processing said edited information for recording;

recording the processed edited information on a second tape recording medium with the selected recording tape transport; and controlling the above steps in accordance with the selected one of said B-roll storing operation, said A/B-roll editing operation and said cut editing operation such that the number of tape transports utilized in performing the selected one of said B-roll storing operation, said A/B-roll editing operation and said cut editing operation is no more than two, wherein said first and second material information are obtainable from any portion of the first tape recording medium.

2. A method according to claim 1, wherein said first material information and said second material information comprise a plurality of compressed data, and wherein said step of processing said first material information includes expanding said first material information which has been played back, and wherein said step of processing the played back second material information includes expanding said second material information which has been played back.

3. A method according to claim 1, wherein said step of processing said edited information includes compressing said edited information.

4. A method according to claim 1, further comprising the steps of:

specifying a time code indicating a recorded position of said first material information on said first tape recording medium; and automatically executing said step of playing back first material information when said time code is specified.

5. A method according to claim 1, wherein said step of processing said first material information includes error-correcting said material information which has been played back and generating an error flag when the played back information can not be error corrected, and wherein said step of playing back first material information includes playing back a portion of said first material information in response to said error flag when an error which cannot be corrected by said step of processing said first material information.

6. A method according to claim 1, wherein said step of editing said first material information includes switching to and outputting either one of said first material information read from said temporary storage medium and said second material information which has been processed in said step of processing the played back second material information.

7. An editing apparatus comprising:

mean for selecting a desired one of a B-roll storing operation, an A/B-roll editing operation and a cut editing operation;

first and second tape transports;

means for enabling a user to select either one of said first and second tape transports for playing back information recorded in any portion of a recording medium and for automatically selecting the other of said first and second tape transports for recording information;

playback signal processing means for processing information played back from the selected playback tape transport;

temporary storage means for temporarily storing an output signal from said playback signal processing means;

editing means for receiving an output signal from said temporary storage means and the output signal from said playback signal processing means, and for editing the output signal from said temporary storage means and the output signal from said playback signal processing means so as to form an edited signal;

means including the selected recording tape transport for recording said edited signal on a tape recording medium;

control means for controlling said playback tape transport, said recording tape transport, said playback signal processing means, said temporary storage means, and said editing means so as to perform the selected one of said B-roll storing operation, said A/B-roll editing operation and said cut editing operation such that the number of tape transports utilized in performing the selected one of said B-roll storing operation, said A/B-roll editing operation and said cut editing operation is no more than two.

8. An editing apparatus according to claim 7, wherein said playback signal processing means includes error-correcting means for error-correcting said information played back from said playback tape transport and for generating an error flag when said information played back from said playback tape transport can not be error corrected, and wherein said control means includes means, responsive to said error flag, for controlling said playback tape transport to play back a portion of the information when an error which cannot be corrected by said error-correcting means occurs.

9. An editing apparatus according to claim 8, wherein said control means includes means for controlling said temporary storage means to store only information other than information which cannot be error-corrected by said error-correcting means.

10. An editing apparatus according to claim 7, wherein said temporary storage means includes one of an optical disk, a hard disk, an IC card, a silicon disk, and a semiconductor memory.

11. An editing apparatus comprising:

means for selecting a desired one of a B-roll storing operation, an A/B-roll editing operation and a cut editing operation;

first and second tape transports;

first selecting means for enabling a user to select one tape transport from either of said first and second tape transports and outputting information recorded in any portion of a recording medium played back by said selected one of the tape transports;

playback signal processing means for processing the information which is outputted from said first selecting means;

temporary storage means for temporarily storing an output signal from said playback signal processing means;

editing means for receiving an output signal from said temporary storage means and the output signal from said playback signal processing means, and for editing the output signal from said temporary storage means and the output signal from said playback signal processing means;

recording signal processing means for processing an output signal from said editing means for recording;

second selecting means for automatically selecting the other of said first and second tape transports and supplying an output signal from said recording signal processing means to the respective selected one of the tape transports; and control means for controlling said tape transports, said playback signal processing means, said temporary storage means, said editing means, and said recording signal processing means so as to perform the selected one of said B-roll storing operation, said A/B-roll editing operation and said cut editing operation such that the number of tape transports utilized in performing the selected one of said B-roll storing operation, said A/B-roll editing operation and said cut editing operation is no more than two.

12. An editing apparatus according to claim 11, wherein said editing means includes an external input terminal for receiving an external signal and means for editing the output signal from said temporary storage means, the output signal from said playback signal processing means, and the external signal from said external input terminal.

13. An editing apparatus according to claim 11, further comprising monitor means for monitoring said output signal from said editing means.

14. A video editing method for editing source video signals, the method comprising the steps of:

reproducing a first source video signal from a first tape medium by using a first tape transport;

temporarily storing said reproduced first source video signal in a temporary storage medium;

reproducing a second video signal from said first tape medium by using said first tape transport and reproducing first source video signal from said temporary storage medium, simultaneously;

editing said reproduced first video signal reproduced from said temporary storage medium and said second video signal reproduced from said first tape recording medium to generate an edited video signal;

recording said edited video signal onto a second tape medium by using a second tape transport;

controlling the above steps in accordance with a A/B-roll editing operation such that the number of tape transports utilized in performing said A/B-roll editing operation is no more than two; and enabling at user to select either one of the first tape transport and the second tape transport for reproducing a respective video signal and automatically selecting the other of said first tape transport and said second tape transport for recording a respective video signal;

wherein a recorded portion of said first source video signal recorded on said first tape medium is different from a recorded portion of said second source video signal recorded on said first tape medium; and wherein said first and second source video signals are obtainable from any portion of the first tape medium.

* * * * *